US005601432A

United States Patent [19]
Bergman

[11] Patent Number: 5,601,432
[45] Date of Patent: Feb. 11, 1997

[54] EDUCATIONAL ORGANIZER

[75] Inventor: Marilyn M. Bergman, Narberth, Pa.

[73] Assignee: Mastery Rehabilitation Systems, Inc., Bala Cynwyd, Pa.

[21] Appl. No.: 376,965

[22] Filed: Jan. 20, 1995

[51] Int. Cl.$^6$ ..................................................... G09B 19/00
[52] U.S. Cl. .......................... 434/118; 434/236; 434/365; 345/146; 395/326
[58] Field of Search ..................................... 434/118, 236, 434/258, 307 R, 362, 365; 345/119, 146, 145, 157; 273/429, 454; 395/155, 927, 154, 186; 364/419.2, 551.01

[56] References Cited

U.S. PATENT DOCUMENTS

| | | | |
|---|---|---|---|
| 4,862,390 | 8/1989 | Weiner | 345/146 X |
| 4,975,690 | 12/1990 | Torres | 345/146 X |
| 5,096,423 | 3/1992 | Goldwasser | 434/118 |
| 5,169,342 | 12/1992 | Steele et al. . | |
| 5,302,132 | 4/1994 | Corder . | |
| 5,326,270 | 7/1994 | Ostby et al. | 434/118 X |
| 5,349,658 | 9/1994 | O'Rourke et al. . | |
| 5,367,624 | 11/1994 | Cooper | 395/155 X |
| 5,384,910 | 1/1995 | Torres | 395/156 |
| 5,393,236 | 2/1995 | Blackmer et al. . | |
| 5,395,243 | 3/1995 | Lubin et al. | 434/118 |
| 5,421,730 | 6/1995 | Lasker, III et al. . | |
| 5,425,140 | 6/1995 | Bloomfield et al. | 345/146 X |
| 5,488,685 | 1/1996 | Palmer et al. | 395/155 X |
| 5,493,726 | 2/1996 | Mori | 395/155 X |
| 5,513,308 | 4/1996 | Mori | 395/155 |
| 5,524,195 | 6/1996 | Clanton, III et al. | 395/155 |
| 5,524,201 | 6/1996 | Shwarts et al. | 395/155 X |

FOREIGN PATENT DOCUMENTS 0542660   5/1993   European Pat. Off. .

OTHER PUBLICATIONS

"Laureate" Fall 1994 Catalog by Laureate Learning Systems, Inc., pp. 1–37.

"Tech–NJ – Technology, Educators, & Children with disabilities – New JerseY" by Trenton State College School of Education Department of Special Education, spring 1994, vol. 5, No. 1.

"Essential Steps – Software for Self–Sufficiency" by Bergman–Gordon Associates, Inc., 1991.

"Computer–Enhanced Self–Sufficiency: Part 1." by Marilyn Bergman, Neuropsychology 1991, vol. 5, No. 1, pp. 17–23.

"Distinct Patterns of Use of a Multiple Function Computer Orthotic System by Two Individuals with Traumatic Brain Injury" by Bergman et al, NHIF 11th Annual National Syposium, Dec. 1992.

"The necessary of a clinical perspective in the design of computer prostheses" by Marilyn Bergman, The Journal of Head Trauma Rehabilitation, Jun. 1991, pp. 100–104.

"Computer Orthotic System Benefits Brain Injured Individuals", newsletter from Head Trauma Family Network, Oct. 1992.

(List continued on next page.)

Primary Examiner—Joe Cheng
Attorney, Agent, or Firm—Caesar, Rivise, Bernstein, Cohen & Pokotilow, Ltd.

[57] ABSTRACT

A compensatory assistive device for students with cognitive impairment (including but not limited to traumatic brain injury, stroke, electrocution, anoxia, mental retardation, dementia, amnesia, and learning disabilities) and/or physical disabilities (such as cerebral palsy) is provided via an interactive computer system that provides an easy-to-use, multi-subject, school planner using a graphical user interface configured with particular color associations, pointer travel limitations, simplified option selections and active view-screen limitations.

42 Claims, 89 Drawing Sheets

OTHER PUBLICATIONS

"Customization of a Multiple Function Computer Orthotic System for Two Individuals With Differing Patterns of Chronic TBI" by Bergman et al, Abstract from JCEN, vol. 14, (1), Jan. 1992.

"A Computer Orthotic System to Support Multiple Functions for an Individual with TBI" by Bergman et al, JCEN, vol. 13, (1), Feb. 1991, p. 105.

"Design and Implementation of a Text Writer: A Case Study of Computer Enhanced Self–Sufficiency in an Adult with Chronic TBI" by Bergaman, NHIF, Nov. 1990, pp. 102–103.

"Essential Steps – Software for Self–Sufficiency" sale brochure by MNEMOSYNE, 1992.

IBM Technical Disclosure Bulletin, vol. 36, No. 4, Apr. 1, 1993, NY;US, pp. 433–435, "Automated Mouse Pointer Movement Function".

IBM Technical Disclosure Bulletin, vol. 37, No. 11 Nov. 1, 1994, NY;US, p. 515 "Space/Time Saving Reference Month".

IBM Technical Disclosure Bulletin, vol. 37, No. 04a Apr. 1994, NY;US, pp. 299–300, "Repulsive Pointer Grab with Hide and Lower Characteristics".

Andy's School System 6:54 pm, Sun, Jan 15, 1995 — Winter

| Notes | Homework | Vocabulary | Rules | Writer |

SCIENCE – Sunday, January 15, 1995

| Type of Assignment | Due Date |
|---|---|
| Test/Quiz | 12/8/94 Step |
| Test/Quiz | 12/15/94 Step |
| Test/Quiz | 12/20/94 Step |
| Project | 12/23/94 |
| Test/Quiz | 12/30/94 Step |
| Test/Quiz | 1/4/95 Step |

Project on the Photosynthesis of plants. This should be either a report with pictures and diagrams, or a multimedia presentation with movie clips, graphic pictures and sound. The main objective is to learn how plants feed themselves. Pick a partner to work with on this project. Do not pick someone you have worked with in the past. Do Pick Assignment
PICK then CLICK

[New] [Modify] [Done] [Exit]
[History] [Sort] [Print] [Class]

6:54 pm, Sun, Jan 15, 1995 – Winter

SCIENCE Homework

○ Handout          ● Project
○ Reading Assignment  ○ Book Report
○ Test/Quiz        ○ Other
○ Essay/Paper

JANUARY, 1995

| Mo | Tu | We | Th | Fr | Sa | Su |
|----|----|----|----|----|----|----|
|    |    |    |    |    |    | 1  |
| 2  | 3  | 4  | 5  | 6  | 7  | 8  |
| 9  | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |    |    |    |    |    |

— 60

Month ↑ — 70
Year ↑ — 72

Pick due date

PICK
then CLICK

— 66
— 64

Info: This is in the future — 68

FIG. 7C

SCIENCE Homework    6:54 pm, Sun, Jan 15, 1995 - Winter

Project - Due Date: 01/27/95

Derive the laws of thermodynamics from first principals

Adding A Step

JANUARY, 1995

| Mo | Tu | We | Th | Fr | Sa | Su |
|----|----|----|----|----|----|----|
|    |    |    |    |    |    | 1  |
| 2  | 3  | 4  | 5  | 6  | 7  | 8  |
| 9  | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |    |    |    |    |    |

↑ Month
↑ Year

Pick due date for step

PICK then CLICK

Info: This is in the future

FIG. 7D

SCIENCE Homework          6:54 pm, Sun, Jan 15, 1995 - Winter

Project - Due Date: 01/27/95

Derive the laws of thermodynamics from first principals

Adding A Step

Due Date: 01/25/95

Assignment

Example step for project

Enter Assignment
step then mark
complete or add
another step.

Add Step    Complete    Cancel

*FIG. 7E*

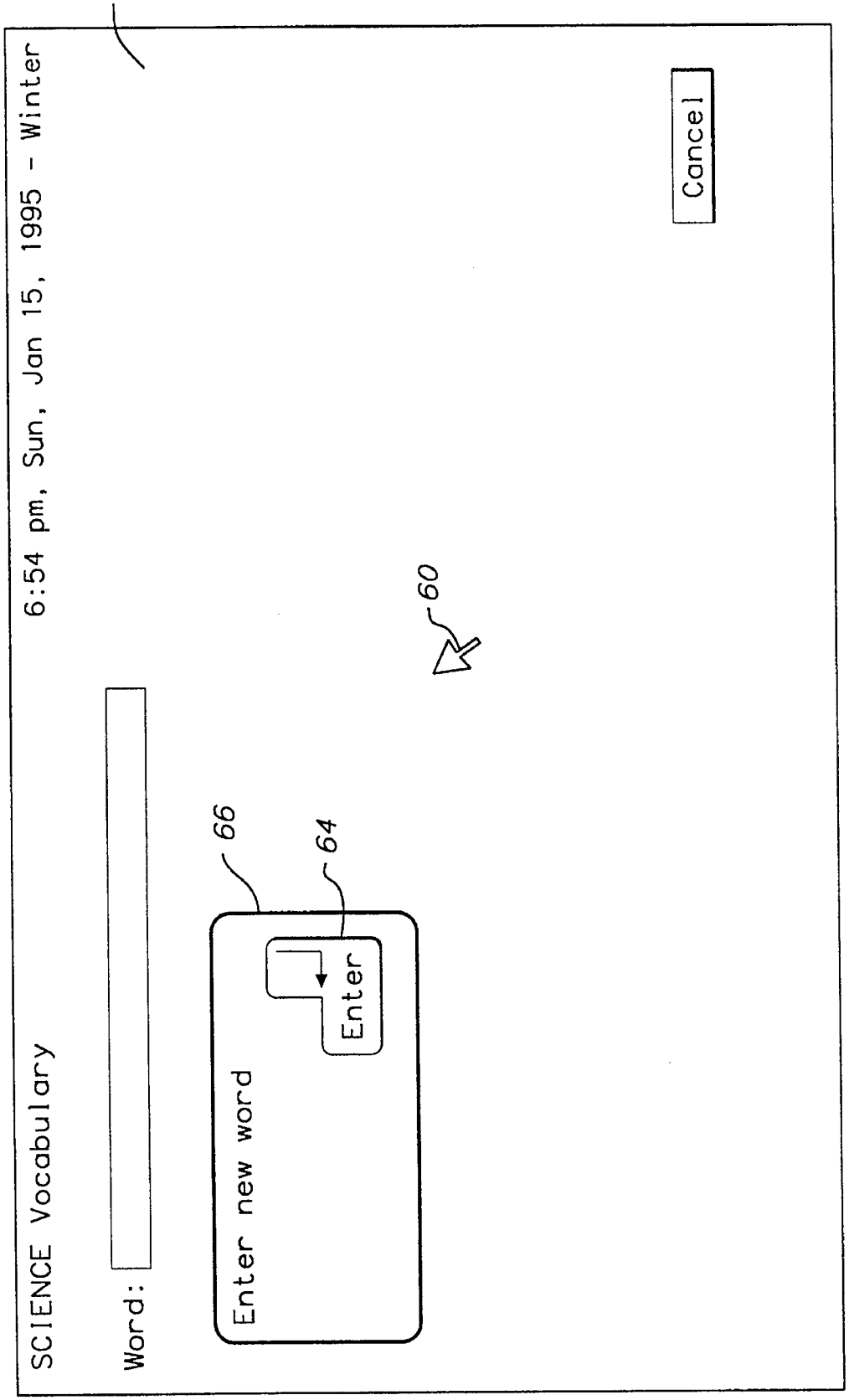

```
SCIENCE Writer                 6:54 pm, Sun, Jan 15, 1995 - Winter

Last Update: 12/19/94

Description: [ The Solar System ]

The Solar System contains nine planets.  They are spread out far apart from each other.  It woul
take a long time to reach the farthest planet, Pluto.

This is a new paragraph.  How does it look in the writers module for the ESTEPs system?  Please
let us know if there are any problems.
                                                    — 60

⎛ Confirmation or change ⎞
    ⎝ document text          ⎠ — 66

[Spelling]  [Complete]  [Cancel]
```

FIG. 13B

Andy's Backup System          6:54 pm, Sun, Jan 15, 1995 – Winter /12

- Check to see that the phone is free and
  will be available for 5-15 minutes. (Be sure
  that the phone is not used during the
  backup process.)                                    Done.

- Connect the phone wire to the "Line"
  connector on the modem.                             Done.

- The system is now preparing the files for
  backup – Please wait, this may take a few
  minutes....                               /60

Andy's Class Rules        6:54 pm, Sun, Jan 15, 1995 - Winter

Class Rules

1. Be quiet while teacher is talking.
2. Make sure you take clear and precice notes. Write down all important information that is put on the blackboard.
3. No chewing gum.

60

Cancel

Complete

FIG. 26

Andy's System Maintenance     6:54 pm, Sun, Jan 15, 1995 - Winter ~12

| User Information | Classes | System | Modules | System Log |

| Funtion Accessed | Start Date | Start Time | End Date | End T |
|---|---|---|---|---|
| Test Module - Add Mode | 09/01/94 | 12:00:30 PM | 09/01/94 | 12:15: |
| Test Module - Add Mode | 09/01/94 | 2:54:23 PM | 09/01/94 | 2:56:3 |
| Test II Module - Edit Mode | 09/01/94 | 10:00:00 AM | 09/01/94 | 10:15: |
| Journal Entry | 09/15/94 | 2:03:00 AM | 09/15/94 | 11:01: |

● Order by Funtion Accessed, Date Started & Time Started
○ Order by Date Started & Time Started Info: Return to Main Menu Exit —60

THE GLOBAL VARIABLES ARE
IMPLEMENTATION SPECIFIC FOR
DATABASE DRIVERS, DATE FORMAT, ETC.

RETURN TO STARTUP

*FIG. 31*

JOURNALS:

SCHOOL BUTTONS CLICKED - 4

SCHOOL TAB CLICKED

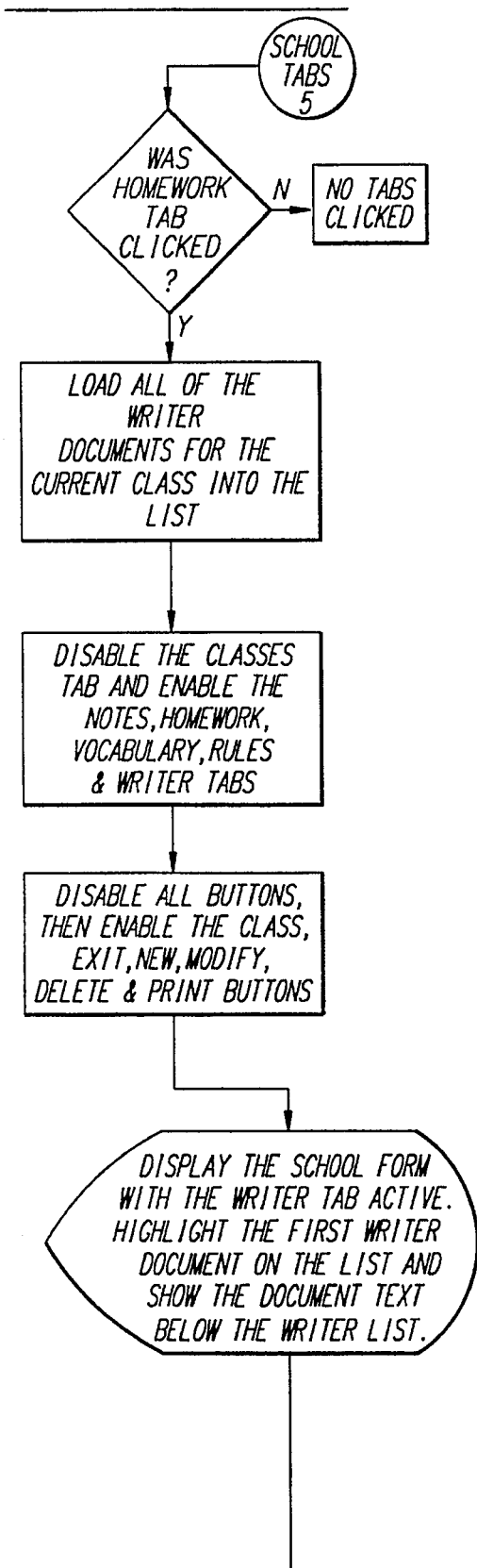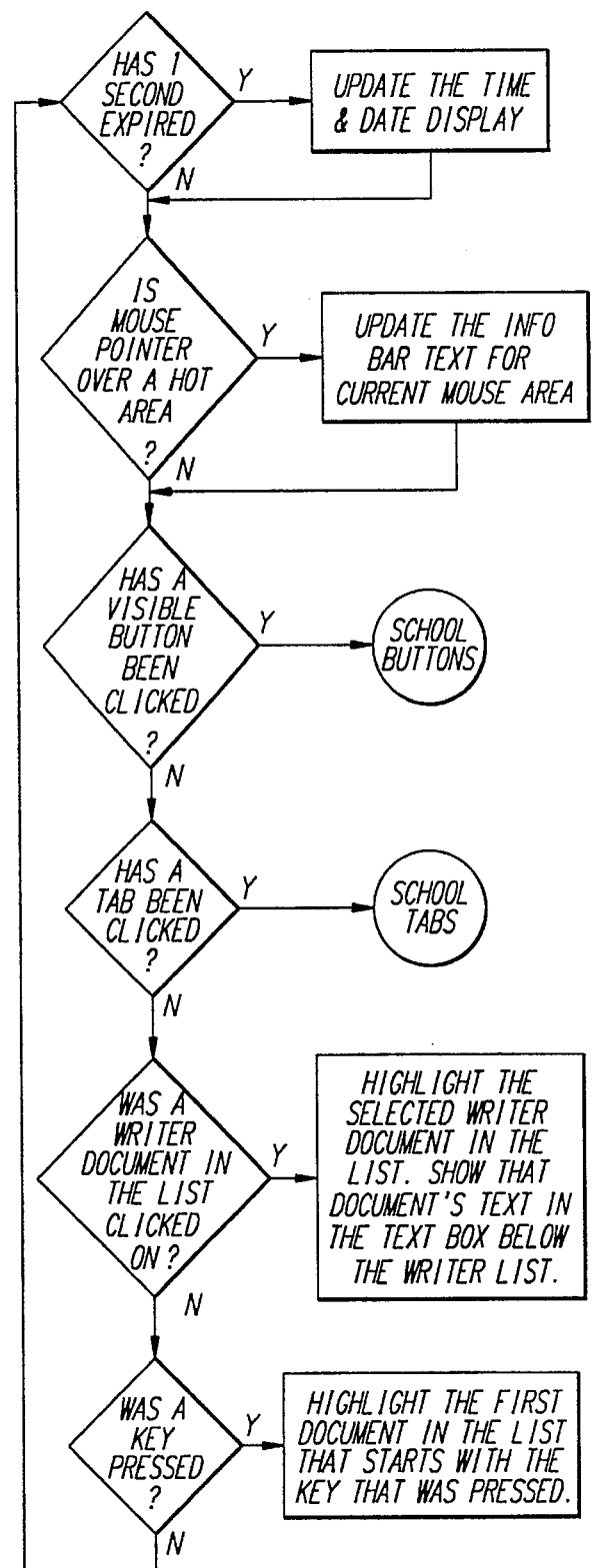
FIG. 69

EDUCATIONAL ORGANIZER

FIELD OF THE INVENTION

The invention pertains to devices that provide cognitively-impaired students with a compensatory assistance apparatus. In particular, the invention pertains to a graphically interactive computer system that allows the student to read and respond to lessons, schedules, etc., while permitting access to an instructor for supervision purposes and access to a remotely-located storage/servicing entity via a modem line.

BACKGROUND OF INVENTION

Providing the cognitively-impaired student with an easy and fun way of learning and organizing tasks relies on the use of orthosis (the correction of mental or physical distortion) devices rather than prosthesis (replacement of missing body parts) devices. In other words, the learning disabled student is provided with prompts, cues, or other indicia which minimize or simplify a particular mental or physical distortion experienced by the student in order to facilitate the student's response to a particular task without the use of medical devices coupled to the student.

Desk-top personal computers provide the ideal technologic opportunity for implementation of an assistive device to enable cognitively or physically disabled students to accomplish an unlimited number of tasks. Examples of this are the software packages provided by Laureate Learning Systems, Inc., of Winooski, Vt. Laureate Learning Systems, Inc. provide talking software that allows the disabled student to develop abilities, develop language skills, treat aphasia (a total or partial loss of the power of using or understanding words, usually caused by brain damage or injury) and traumatic brain injury, and reading difficulties. Any computer system having a keyboard, mouse and/or touch-screen can support these software packages.

Other exemplary software packages dedicated to the development of learning disabled students is provided in the *TECH-NJ Technology, Educators, & Children with Disabilities-New Jersey,* Spring 1994, Vol. 5, No. 1.

The closest art available is a specially designed cognitive orthotic software system sold under the trademark "Essential Steps" by the Assignee of the present invention. This software system provides users with acquired brain injury and other cognitive impairments a comprehensive, easy-to-use computer that, among other things: manages time, schedules appointments and activities, budgets and manages money, provides a daily journal in an easily reviewable format, logs and reviews telephone calls, maintains a personal telephone directory and supports self-care and personal grooming. This system uses on-screen cues and directions, guided sequences, single keystroke functions, arousal alert, voice output for cueing and voice input for responding. However, this system, among other things, is not designed for assisting cognitively impaired students with school-related activities, allows the student only a limited number (and a limited size) of files to save, and does not allow the student to partition tasks into steps having their own completion dates. Finally, this system does not use a graphical user interface for simplifying the user response to avoid having the user memorize command strings.

OBJECTS OF THE INVENTION

Accordingly, it is the general object of this invention to overcome the disadvantages of the prior art.

It is an object of this invention to provide a compensatory assistive device for students with cognitive impairment (including but not limited to traumatic brain injury, stroke, electrocution, anoxia, mental retardation, dementia, amnesia, and learning disabilities), and/or physical disabilities (such as cerebral palsy).

It is yet another object of this invention to provide an easy-to-use computer orthotic software system that eliminates the need for the student user to memorize command strings (e.g., to boot the system, print documents) and storage hierarchies (e.g., directories, files).

It is still yet a further object of this invention to provide an easy-to-use computer orthotic software system that can be easily modified thereby allowing customization for the varied and specific needs of the disabled student.

It is even yet a further object of this invention to provide an easy-to-use computer orthotic software system that is operable on a standard personal computer which can be used in a network, in a notebook computer, and/or linked by modem for support and backup.

It is another object of this invention to provide a computer orthotic software system having highly simplified functions with on-screen instructions and cues, consistent screen design, single "click" selection with pointing devices and use of color associations.

It is yet a further object of this invention to provide an organized and structured school organizer for direct use by students without the need for assistance.

SUMMARY OF THE INVENTION

These and other objects of the instant invention are achieved by providing a compensatory assistive apparatus for a user (e.g., a student) with cognitive impairment (including but not limited to traumatic brain injury, stroke, electrocution, anoxia, mental retardation, dementia, amnesia, and learning disabilities), and/or physical disabilities (such as cerebral palsy) which allows the user to make entries and files therein. The apparatus comprises a first computer having a monitor and a graphical user interface that displays only one application on the monitor at any time. The graphical user interface requires the exiting of the application before entering another application. Within each application that is displayed on the monitor there is a predetermined number of user prompts and working information at predetermined locations on the monitor using predetermined colors. The graphical user interface uses a movable pointer which the graphical user interface restricts in displacement in all directions in the displayed application so that the movable pointer always remains in the view of the user. Furthermore, the graphical user interface displays a guidance icon that graphically instructs the user what the user must do to respond. In addition, the graphical user interface automatically saves all files and entries created by the user to the first computer without user intervention. The apparatus has an input means for inputting data to the first computer and for controlling the pointer. The apparatus also has an output means for outputting data from the first computer.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 6 is the Homework function for a science class of the educational organizer;

FIGS. 7A–7E is the New subfunction of the Homework function in FIG. 6;

FIGS. 9A–9D is the New subfunction of the Vocabulary function in FIG. 8;

FIGS. 13A–13B are the Modify subfunction of the Writer function in FIG. 11;

Figure 24:
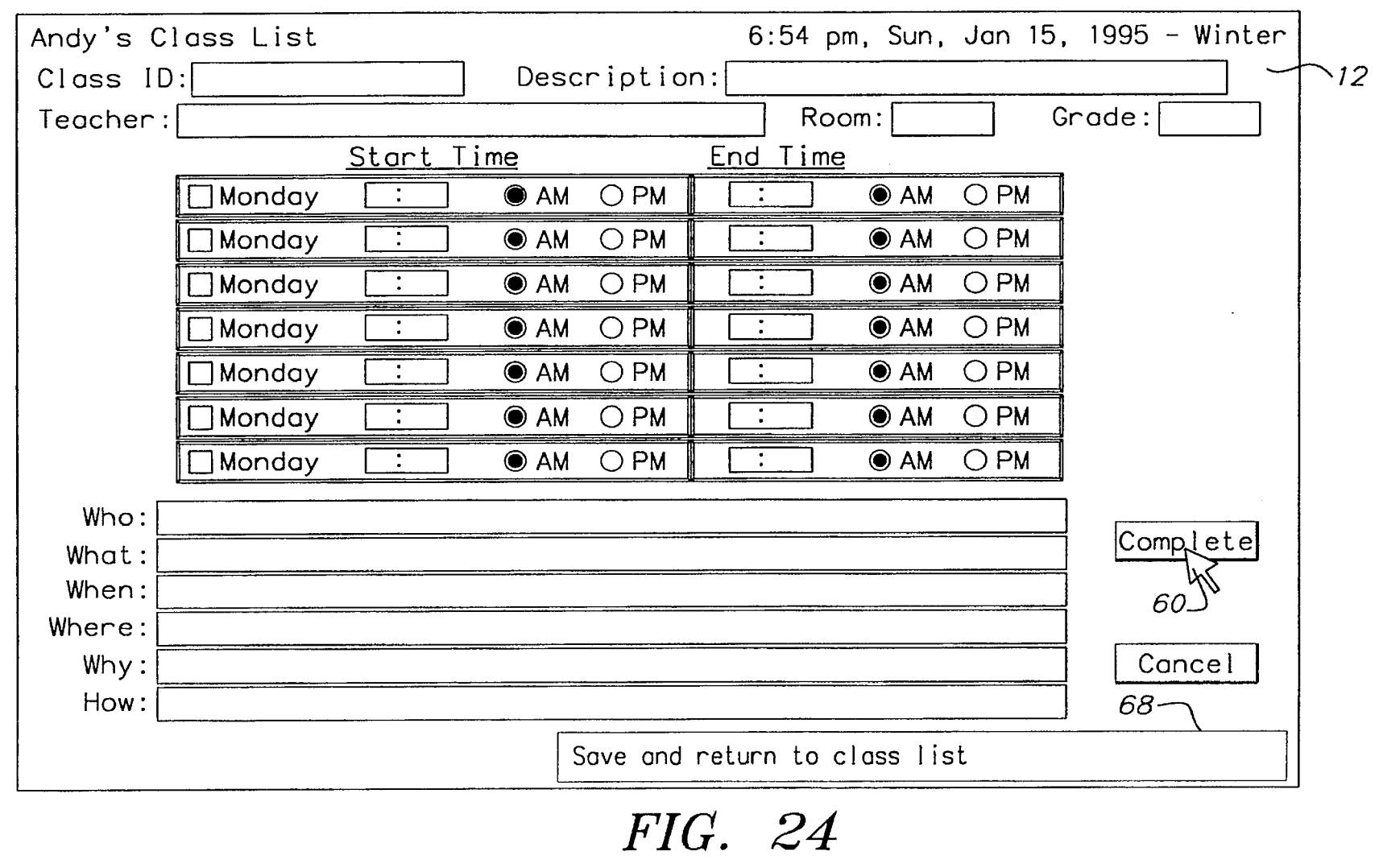

FIG. 24 is the New subfunction of the Classes function in FIG. 23;

Figure 25:
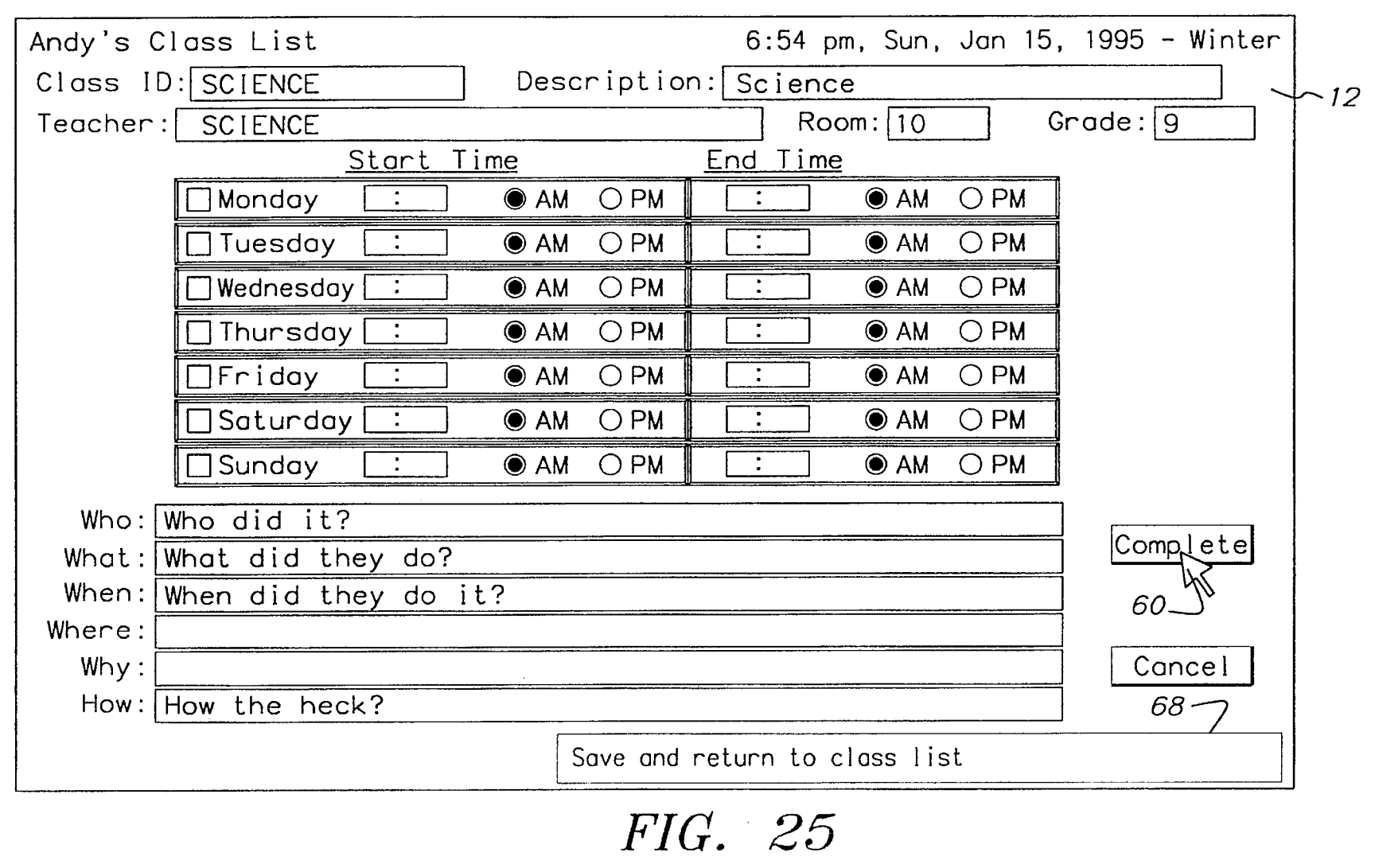

FIG. 25 is the Modify subfunction of the Classes function in FIG. 23;

FIG. 26 is the Rules subfunction of the Classes function in FIG. 23;

FIG. 29 is the System Log function of the Maintenance Menu; and

FIGS. 30 through 75 are the flow charts for the educational organizer.

DETAILED DESCRIPTION OF THE PREFERRED EMBODIMENT

Figure 1:
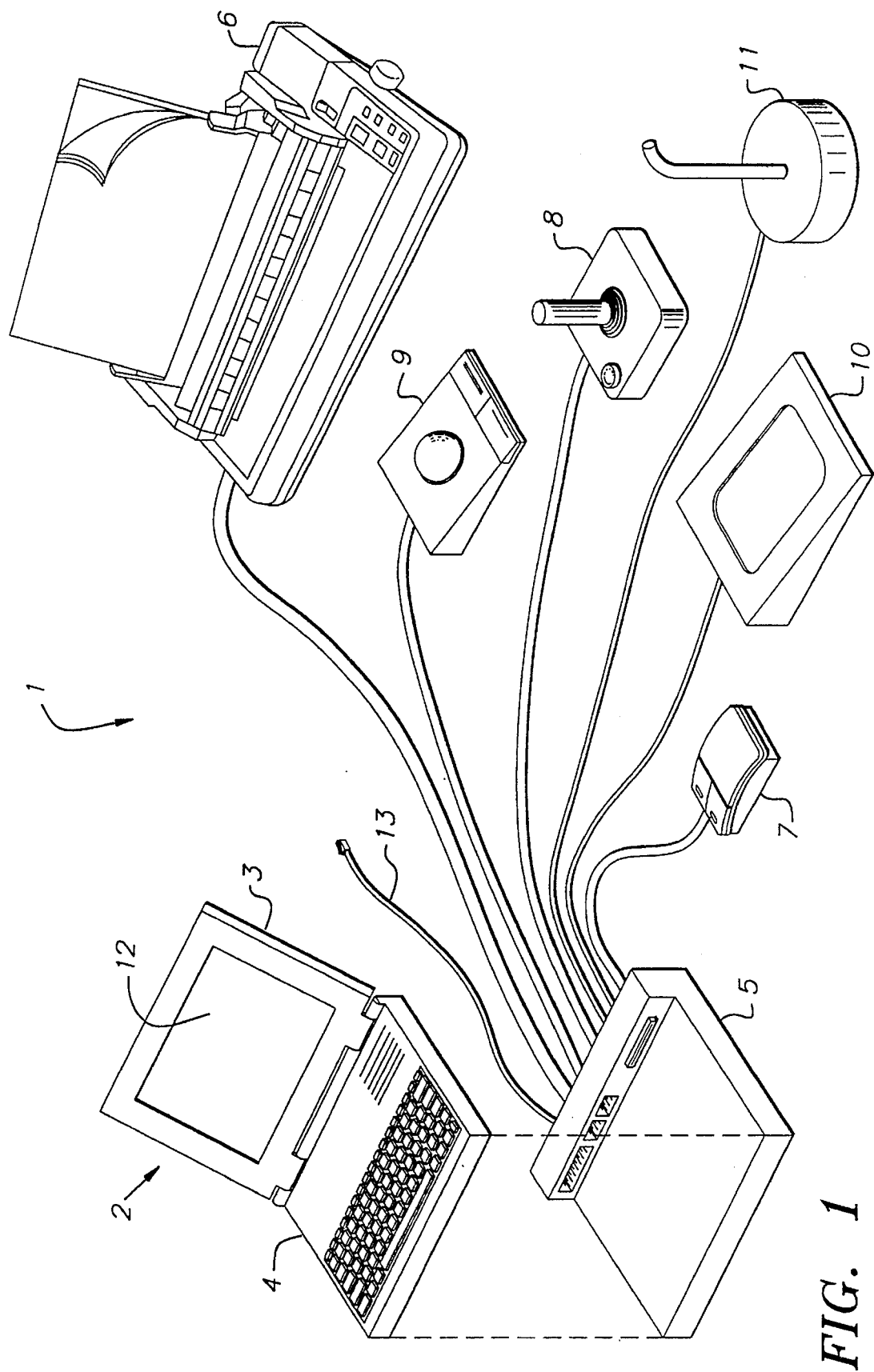
FIG. 1 depicts a personal computer system in which the educational organizer can be employed.

Referring now in detail to the various figures of the drawing wherein like reference characters refer to like parts, there is shown at 1 in FIG. 1, a personal computer station which utilizes the educational organizer 20 (FIGS. 2A–2D). The personal computer station 1 comprises a conventional notebook computer 2 (e.g., Austin Notebook Computer, Macintosh Powerbook) having a graphical user interface (e.g., WINDOWS). The notebook computer 2 has a monitor 3 and a keyboard 4 and which is coupled to an associated docking station 5 (e.g., EDS20SN Expansion Docking Station manufactured by IPC/AUSTIN Direct, Inc.). The docking station 5 permits the notebook computer 2 to be coupled to a variety of I/O (input/output) devices such as a printer 6, a mouse 7, a joystick 8, a track ball 9, a touch pad 10 or even a sip-puff device 11 depending on the disability of the user. Another alternative input device is where the monitor 3 has a screen display 12 that is touch-sensitive, i.e., a "touch screen". The importance of the docking station 5 is that, among other things, it alleviates the user from having to couple, manually, I/O devices to his/her notebook computer 2 directly; the user need only couple the notebook computer 2 to the docking station 5 and turn on his/her computer 2 in order to initialize the educational organizer. The personal computer station 1 is also linked by modem line 13 to an external computer station (not shown).

It should be pointed out at this juncture that the notebook computer 2/docking station 5 could be replaced with a desk-top computer (not shown) whereby the I/O devices would be directly coupled to the desk-top computer. It should also be noted that subsequent use of the phrase "primary user station" refers to that location where the primary user is coupled to the external computer station by the modem line 13. On the other hand, when the primary user is in a classroom setting, typically the student is using the notebook computer 2 as a stand-alone and is not coupled to the modem line 13. It should also be noted that the primary user station could also be part of a computer network.

The educational organizer 20 (FIGS. 2A–2D) is a multi-subject planner appropriate for the student having the cognitive impairment, i.e., the primary user, who is able to read and record in written language. In addition, the educational organizer 20 is also designed for use by secondary users, i.e., the teacher, therapist or parent who programs the higher level functions; and the tertiary users, i.e., the providers/administrators. The student, teachers, parents or therapists can set up a schedule for school subjects, with complete flexibility in setting the number and names of subjects, instructors, classroom locations, class times and divisions for taking notes in each subject. For each subject the educational organizer provides "files" for keeping classroom notes, recording, planning and executing homework, building a subject-specific vocabulary, behavioral rules, and writing and recording text. The educational organizer 20 is also designed for tertiary users: remotely-located users who are coupled to each primary user station by way of modem. The tertiary users comprise the educational organizer administrators and programmers and serve as the central back-up station for all users. As will also be discussed later, a Maintenance Menu 22 (FIGS. 23–29) is provided for use by only the secondary and the tertiary users for controlling the operation of the educational organizer 20 at every station; the primary users have no access to the Maintenance Menu 22. Alternatively, the secondary users and the tertiary users could have respective Maintenance Menus (not shown), dedicated to their respective uses in controlling the operation of the educational organizer 20; again, the primary user would have no access to either of these two Maintenance Menus.

Figure 2A:
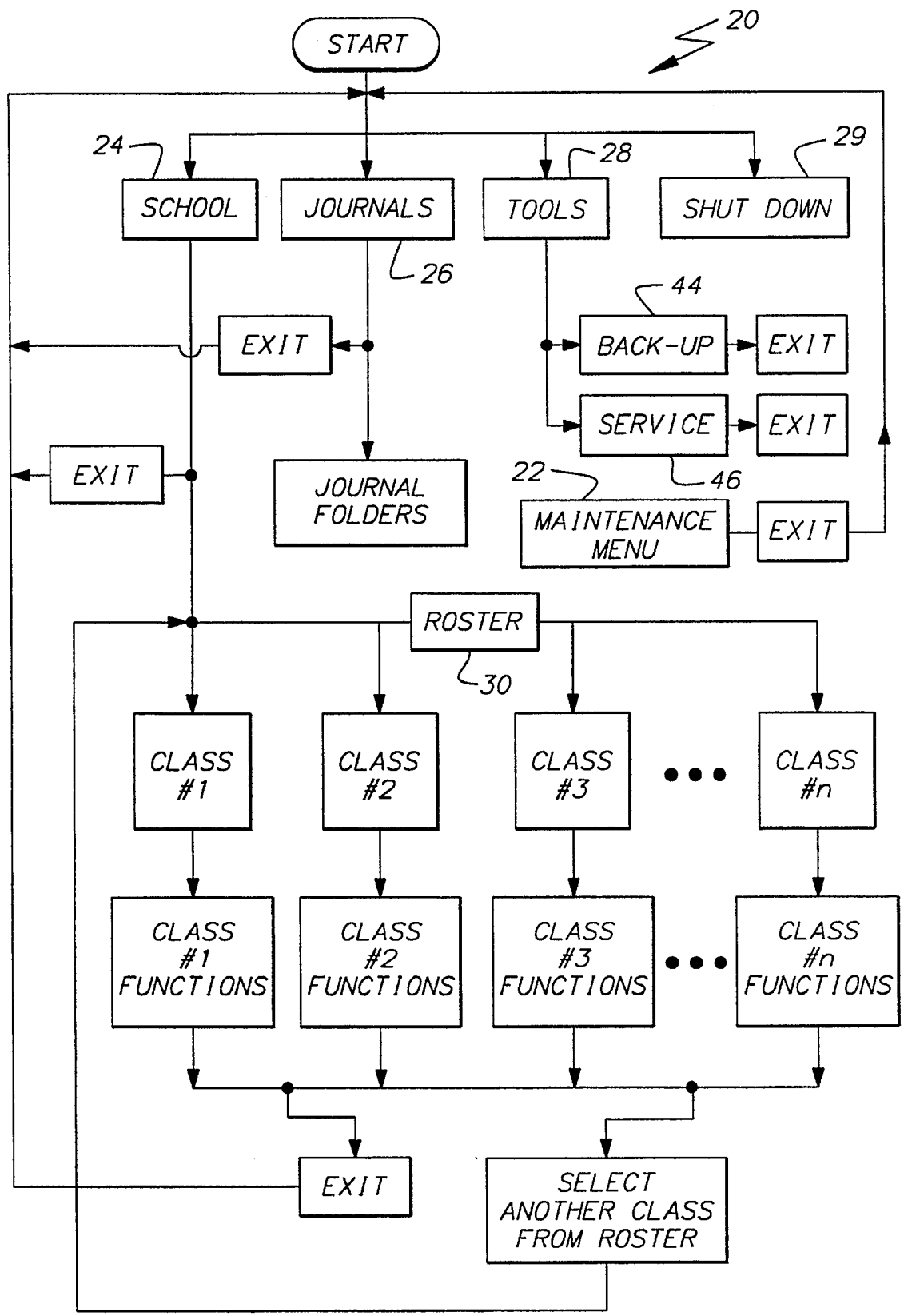
FIG. 2A is overview of the educational organizer.
Figure 3:
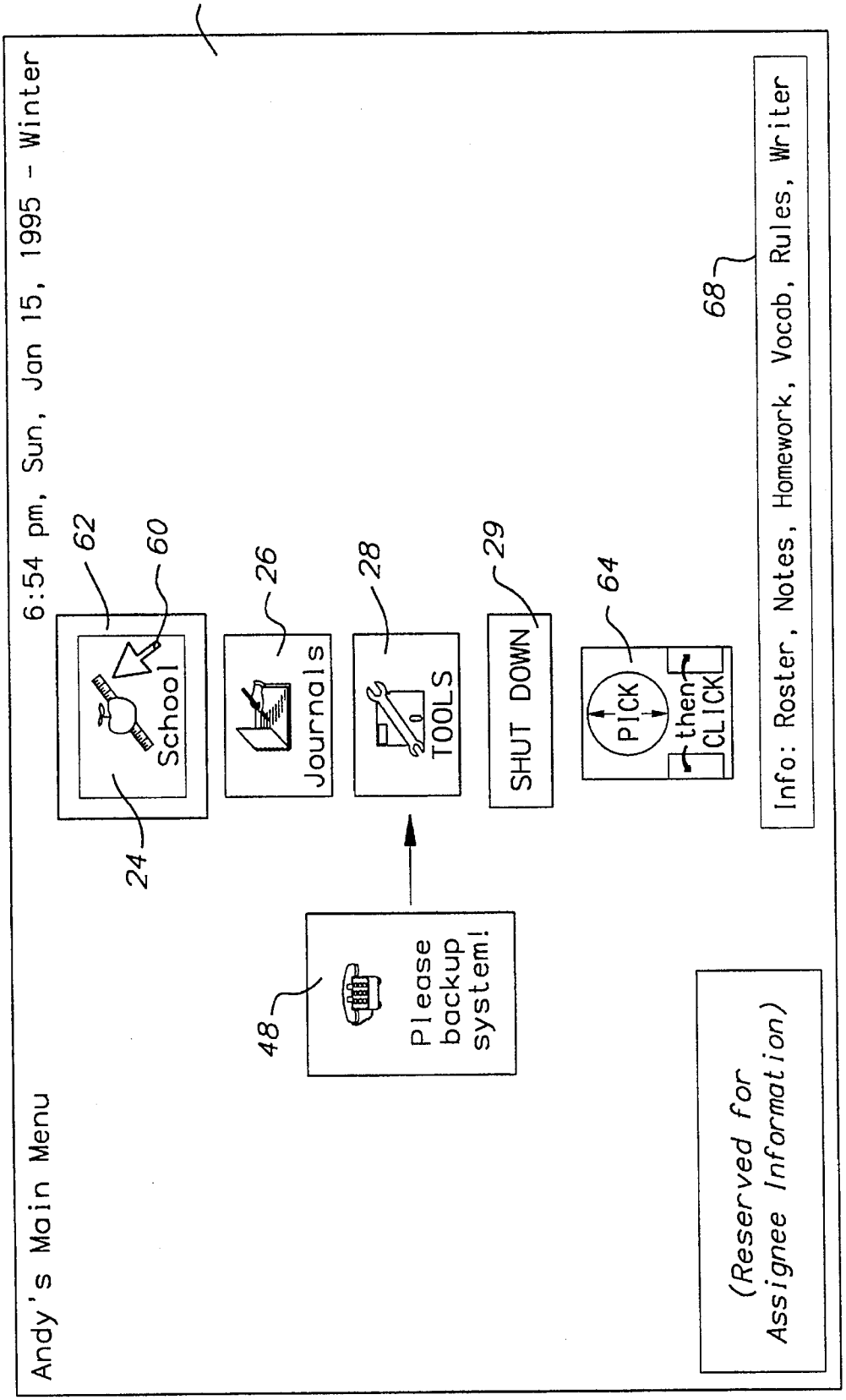
FIG. 3 is the Main Menu of the educational organizer.

In particular, as shown in FIG. 2A, the primary user has the choice of selecting options for School 24, Journals 26, Tools 28 or Shut Down 29 from the Main Menu (FIG. 3). Except for the Tools option 28 and the Shut Down option 29, the user can immediately exit and return to the Main Menu. It should be noted that these four Main Menu options (24–29) are not meant to be exhaustive but only illustrate an exemplary number of Main Menu options available in the educational organizer 20.

The selection of the Schools option 24 permits the user to select from a Roster 30 of classes (e.g., math, science, social studies, etc. as indicated by Class #1-Class #n in FIG. 2A). Each of the classes has a respective class function that is dedicated to that particular class, as will be discussed later. Upon completion of a class function (FIG. 2B), the user can then either select another class or exit to the Main Menu.

Figure 2B:
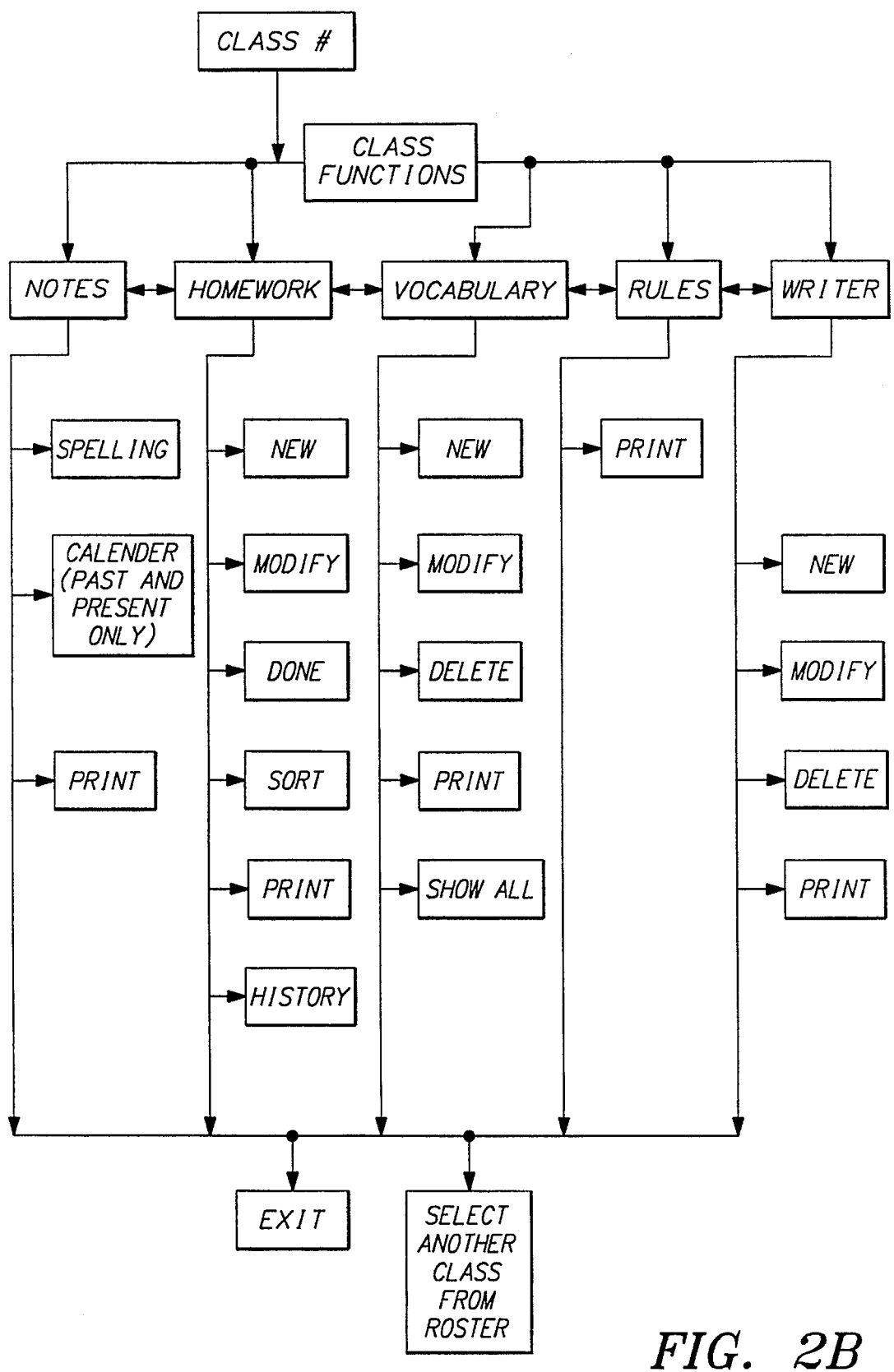
FIG. 2B is a block diagram of the Class function in the Roster.
Figure 2C:
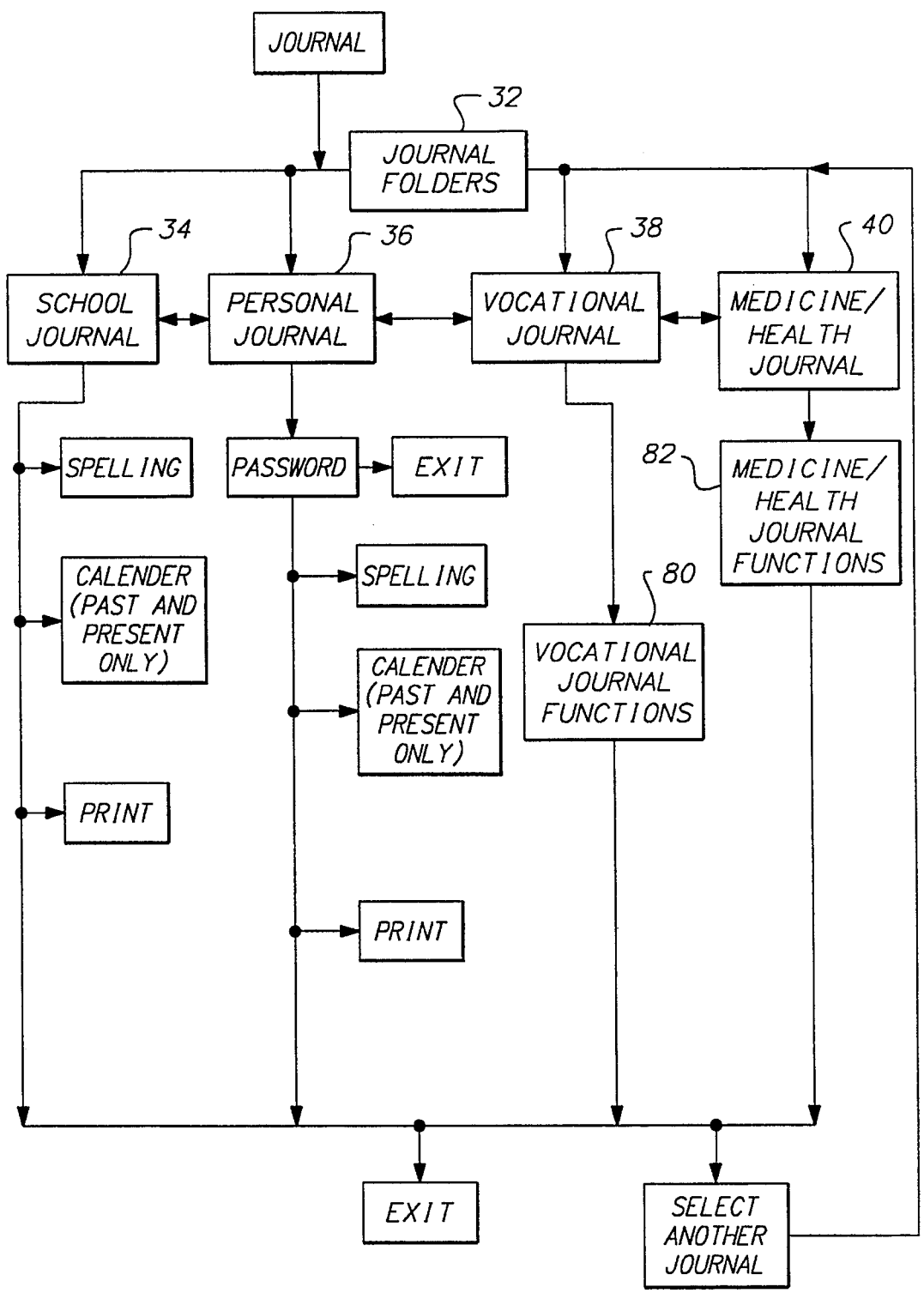
FIG. 2C is a block diagram of the Journals option.
Figure 2D:
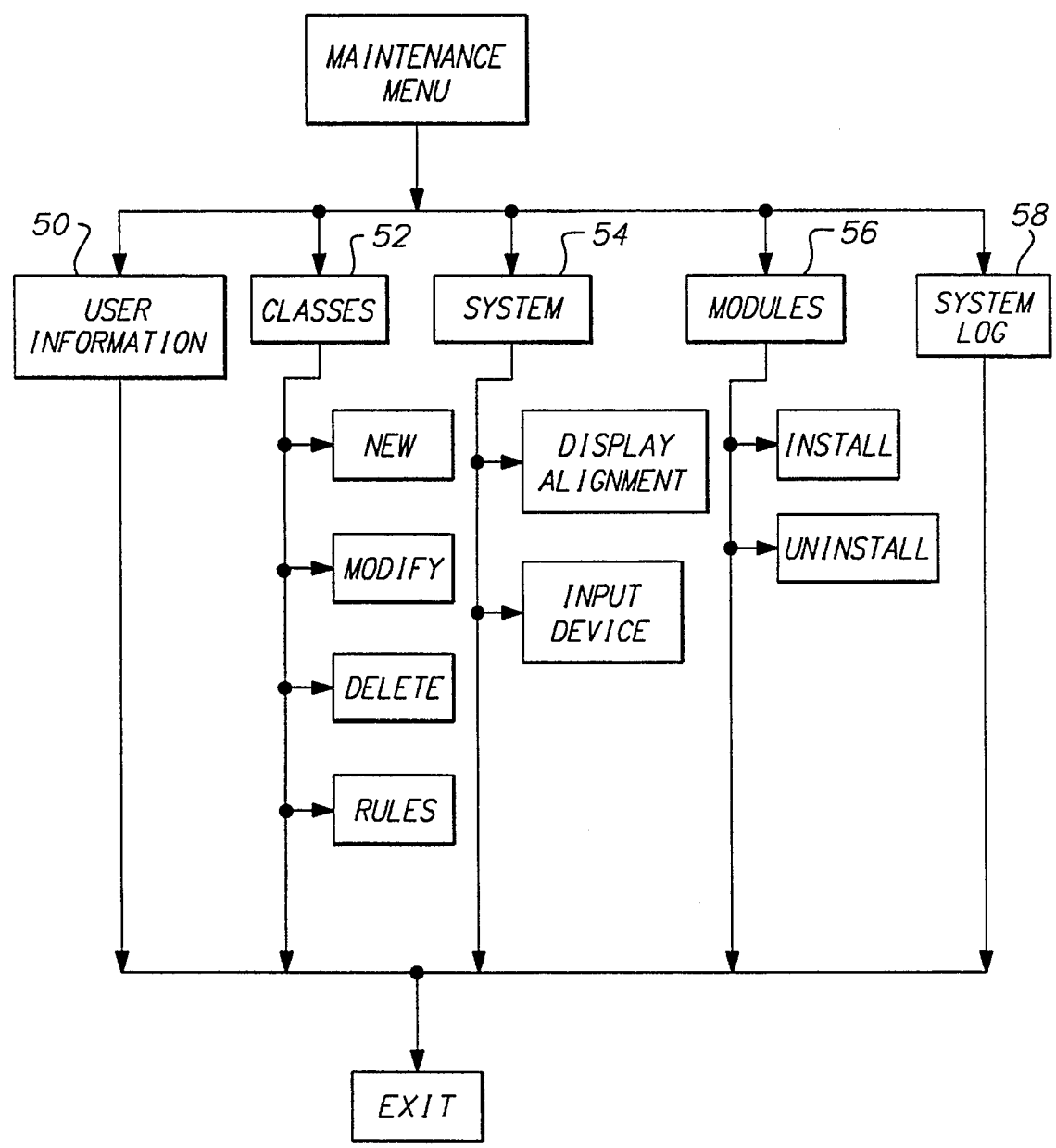
FIG. 2D is a block diagram of the Maintenance Menu.
Figure 14:
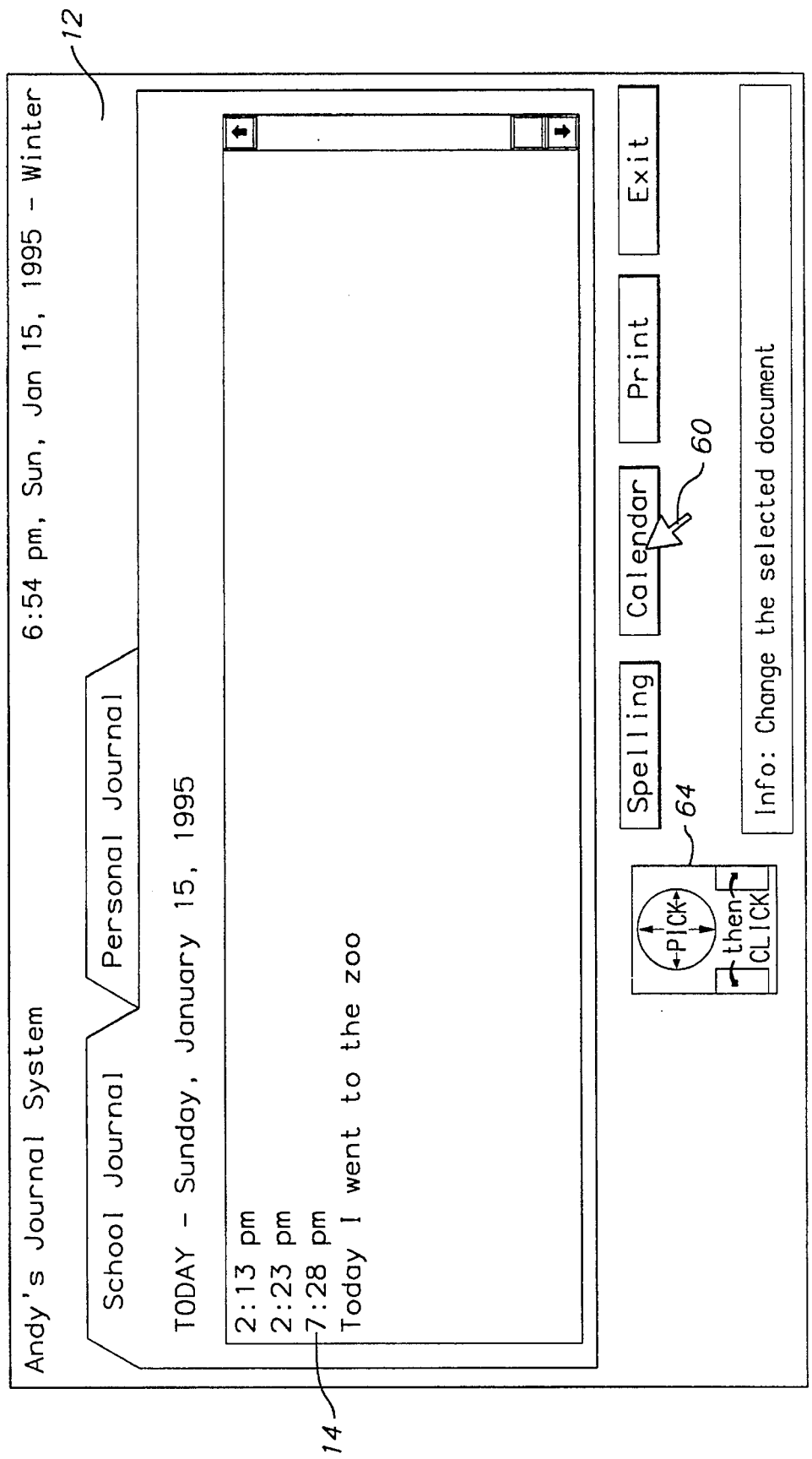
FIG. 14 is the School Journal function of the educational organizer.
Figure 17:
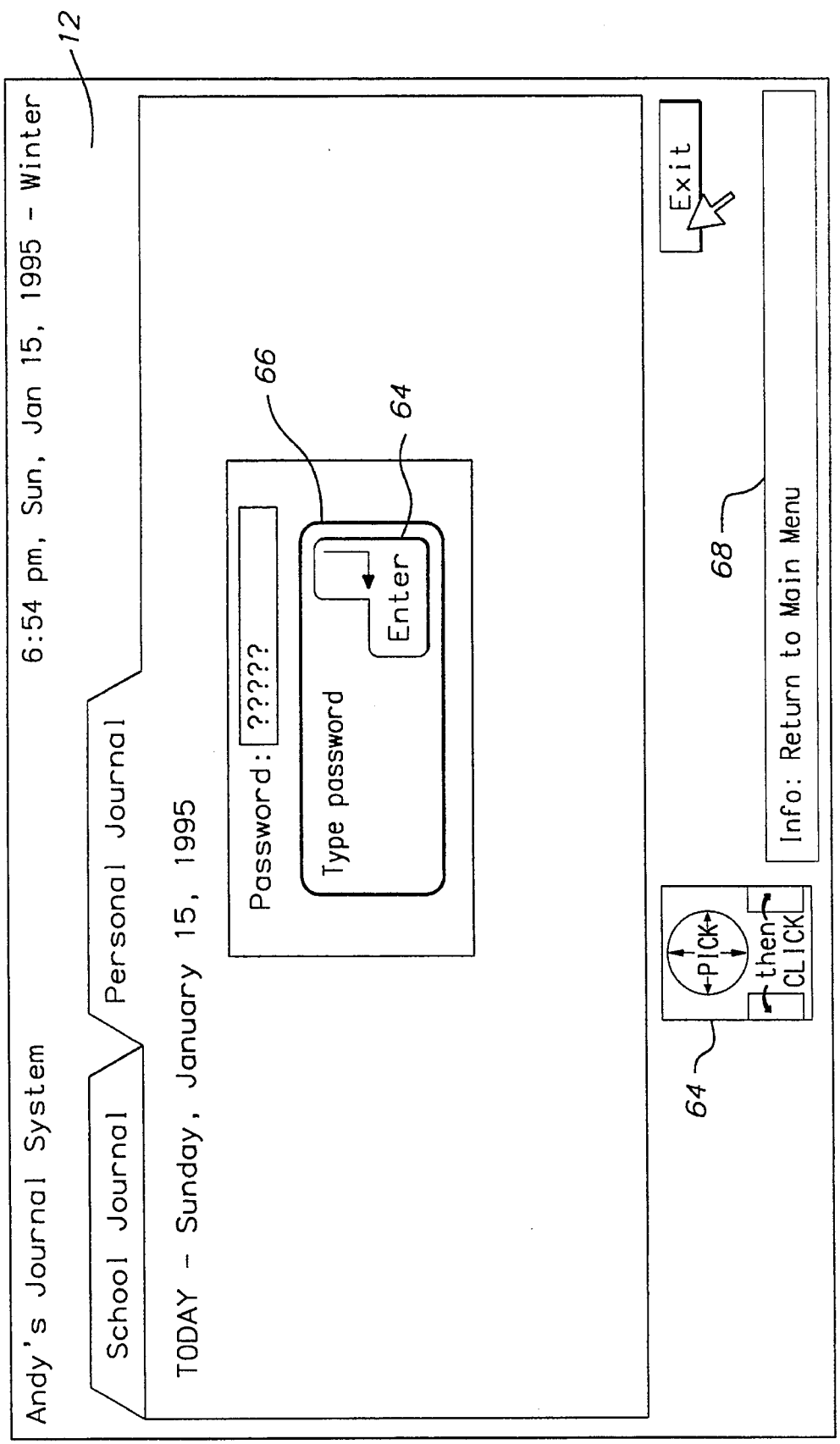
FIG. 17 is the Personal Journal function of the educational organizer.

The selection of the Journals option 26 (FIG. 2C) permits the user to select from journal folders 32 comprising a School Journal 34 (FIG. 14), a Personal Journal 36 (FIG. 17), a Vocational Journal 38 (FIG. 2C) and a Medicine/Health Journal 40 (FIG. 2C). Again, it should be noted that these journals are not meant to be exhaustive but only illustrate an exemplary number of journal folders 32 for the educational organizer 20. Entry into one of these journals permits the user to enter text adjacent a time-entry prompt 42 (FIG. 14), much like a diary, as will be discussed later. One important feature of these journals is that the user is limited to making entries for past dates or the present date only (all future dates are unavailable), as will also be discussed later. Upon completion of the Journals option 26, the user can then either select another journal or exit to the Main Menu.

It should be noted at this juncture that upon exiting either the School option 24 or the Journal option 26, all user entries (including files, documents, etc.) are automatically saved to the primary user station notebook computer 2 without the need for user intervention.

Figure 19:
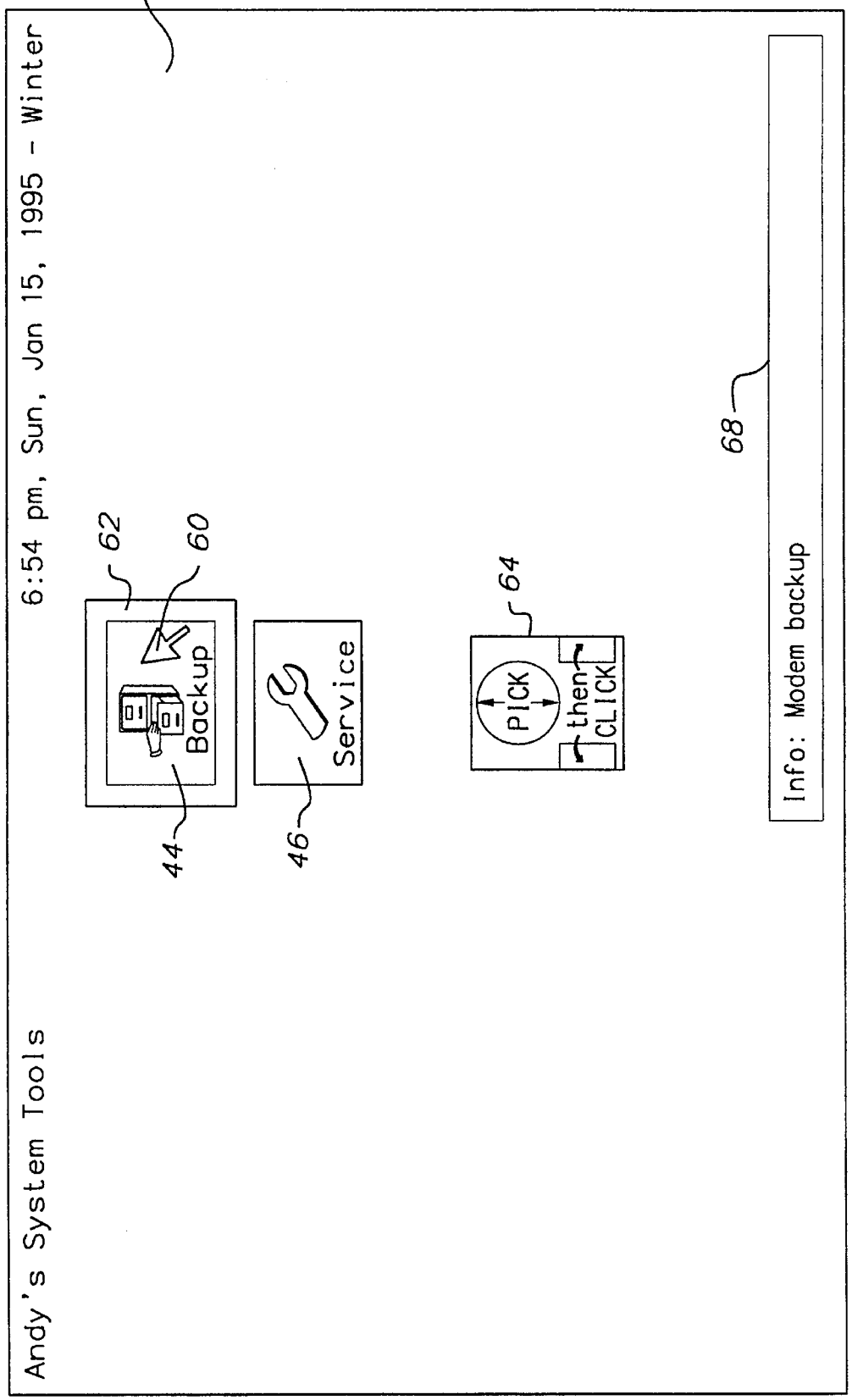
FIG. 19 is the Tools menu of the educational organizer.
Figure 20A:
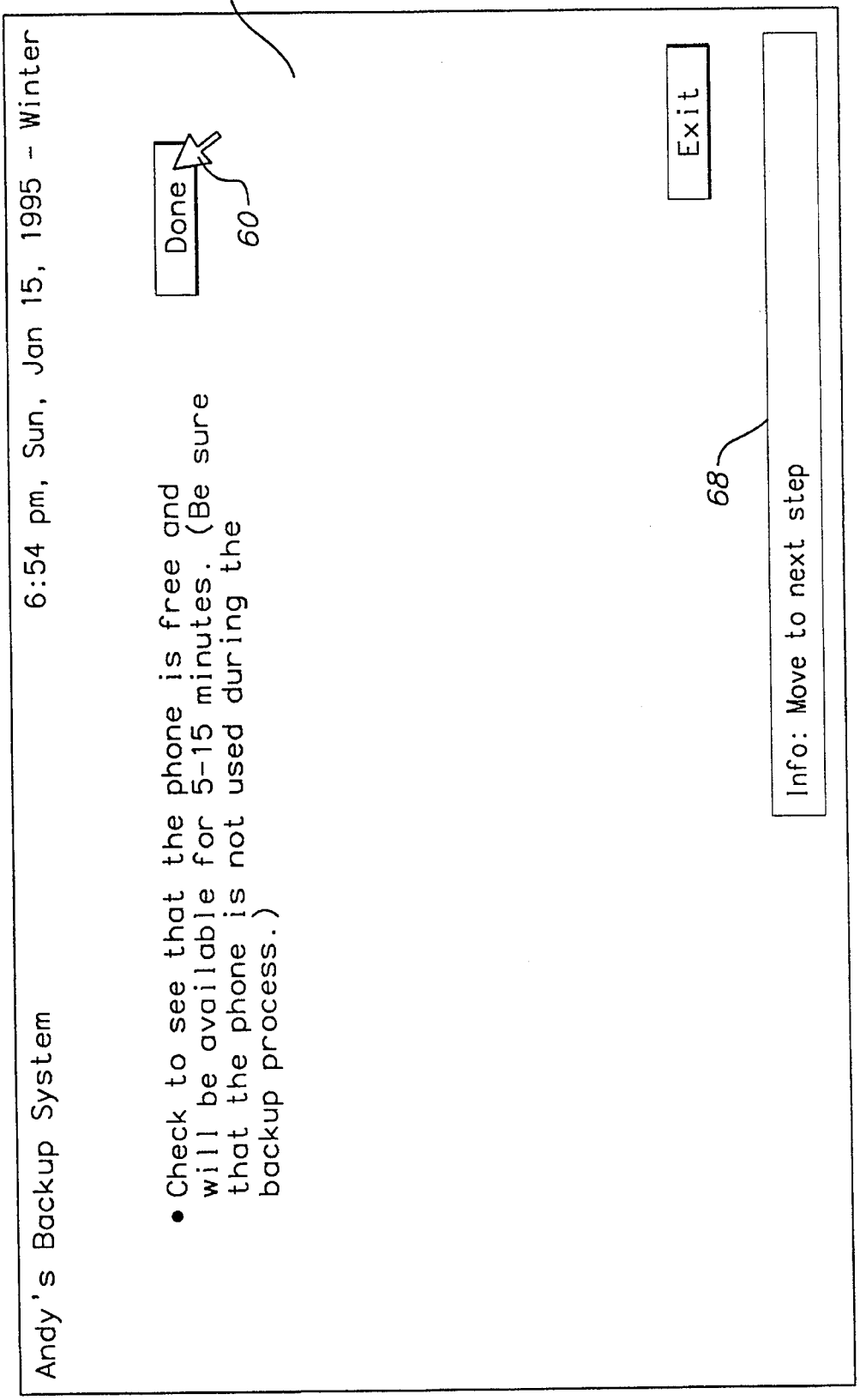
FIGS. 20A–20C is the Back-Up function of the Tools menu in FIG. 19.
Figure 20B:
Figure 20C:
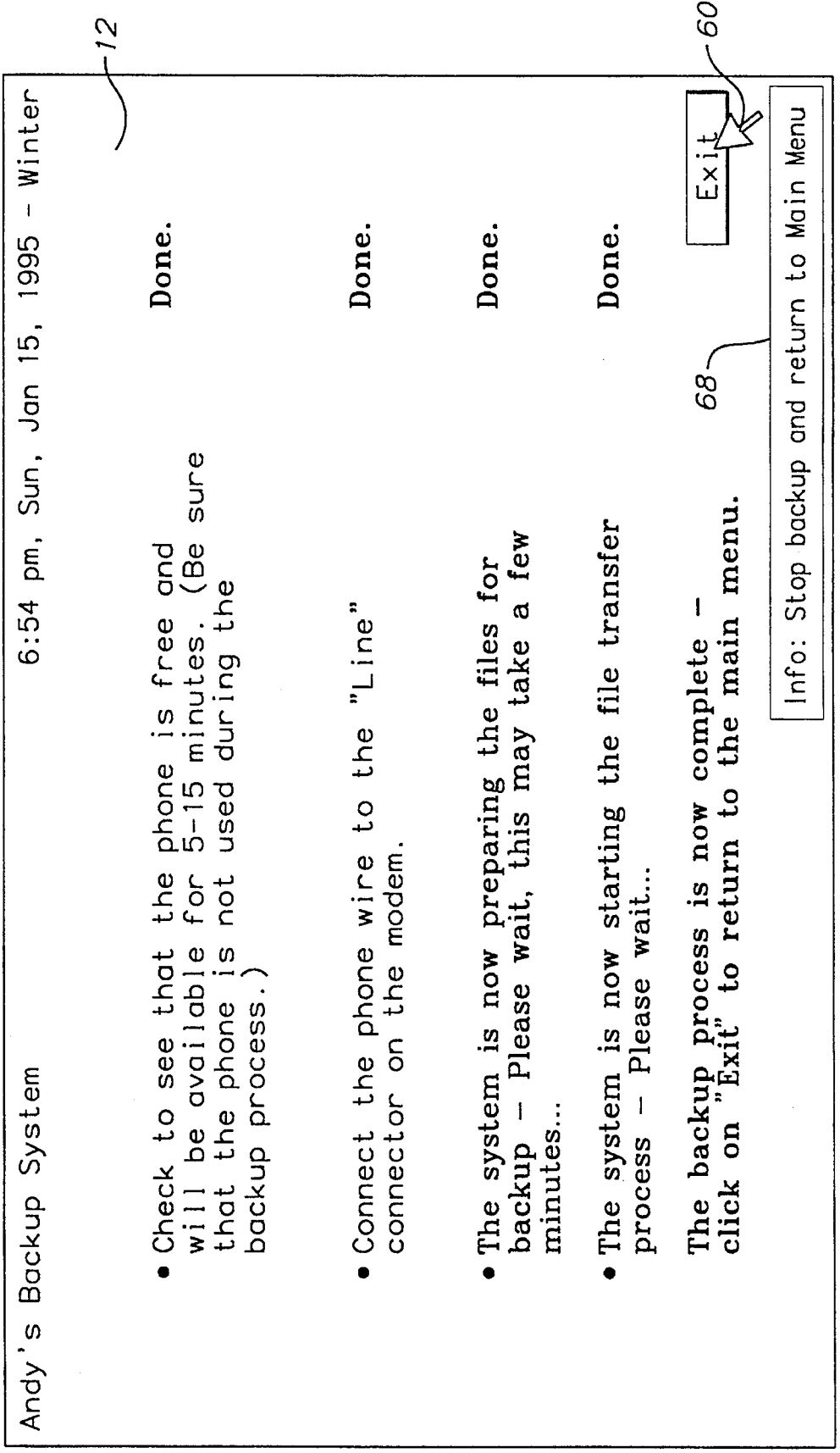
Figure 21:
FIG. 21 is the Service function of the Tools menu in FIG. 19.

The selection of the Tools option 28 (FIG. 2A) permits the user to select from a Back-Up option 44 and a Service option 46 (FIG. 19). The Back-Up option 44 guides the user through the process of saving all of his/her files to a remote location over the modem line 13 (FIGS. 20A–20C) and allows the user to indicate which steps of the process are complete by activating a Done press button. Unlike the automatic saving feature of all the user's files at the primary user's station, the user must actively save all of his/her files to the remote location. Failure to use the Back-Up option 44 after a predetermined number of days (e.g., seven days) following the last Back-Up option 44 selection causes a BACK-UP REMIND indication 48 to appear on the Main Menu (FIG. 3). This predetermined number of days is adjustable via the Maintenance Menu 22. The Service option 46 guides the user through the process of preparing his/her station for a remote login. In this manner, the tertiary user, using a second computer located at the remote location, can provide input to the primary user station's Maintenance Menu 22. Upon completion of either the Back-Up option 44 or the Service option 46 the user exits to the Main Menu.

The Shut Down option 29 permits any user the ability to exit from the Main Menu so that the display 12 returns to the typical DOS prompt at which time the user can shut off the notebook computer 2 power switch.

Figure 22:
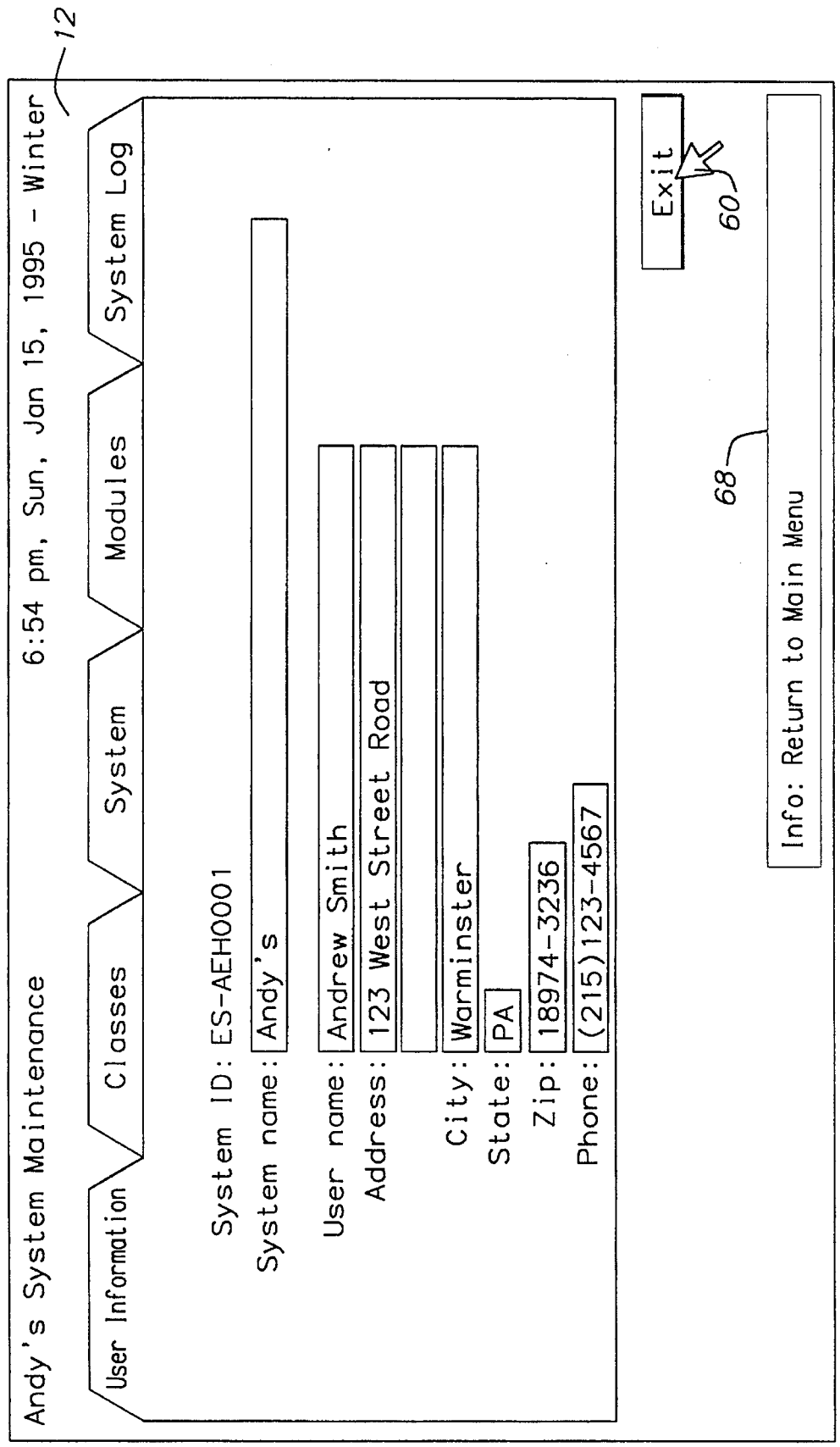
FIG. 22 is the User Information function of the Maintenance Menu.

The Maintenance Menu 22 (FIG. 2D) permits only secondary and tertiary users the capability to modify the educational organizer 20 at every primary user station. The Maintenance Menu 22 comprises a User Information option 50 (FIG. 22), a Classes option 52 (FIG. 23), a System option 54 (FIG. 27), a Modules option 56 (FIG. 28) and a System Log 58 (FIG. 29) option. As can be seen, there is no entry point available to the primary users since they are prevented from accessing this menu. As will be discussed later, these options give the secondary/tertiary users the ability to, among other things, configure, and monitor the use of, the educational organizer 20 by the primary user or any user. Upon completion of any of these options (44–52), the secondary/tertiary user exits to the Main Menu.

The educational organizer 20 largely comprises software (FIGS. 30 through 75) that provides for controlling the monitor display 12, thereby providing the disabled user with the effective yet easy-to-use visual cues and/or even audio cues. This software also modifies the graphical user interface to permit the student to use only simple responses (e.g., a single click of the mouse 7) without confusing the student (e.g., limiting the travel of the pointer indicator 60 [e.g., arrowhead-FIG. 3, text bar-FIG. 5, hourglass-FIG. 20B] so that it never leaves the field of view of the screen) for accomplishing a task that normally would require the operator to "select, drag and drop" an icon, template, etc. Therefore, the educational organizer 20 software is compatible with any number of operating systems (e.g., DOS, WINDOWS, Macintosh System 7, XWINDOWS, etc.) that support some type of graphics function. As such, use of the educational organizer 20 will be discussed below with respect to a personal computer system 10 using WINDOWS with the understanding that this is exemplary only and that any other type of computer operating system having a graphical user interface can support the educational organizer 20. In addition, any subsequent reference made to "a window" is herein defined as "a single application program" and not restricted to a WINDOWS graphical user interface.

The educational organizer 20 limits the typical WINDOWS capability. In a conventional WINDOWS window, > ... [a] typical WINDOWS graphical user interface (GUI) partitions the monitor screen into different areas, one for each program. The partitions, marked off with borders and a title, are called Windows. Each application writes only inside its own window. The user can shrink, enlarge or move the windows at will. p. 5, *Programmer's Introduction to Windows* 3.1 by Brian Myers and Chris Donner, copyright 1992.

However, the educational organizer 20 is designed so that the primary user can never open a second window (i.e., a second application) while a first window (i.e., a first application) is displayed on the screen 12; the primary user is guided by the educational organizer 20 through the window presently displayed on the screen 12 and when the user has completed the required tasks in the displayed window (or chooses to exit that window), the user is allowed to exit the displayed window and select a new window (i.e., a second application). In other words, transparent to the primary user, the primary user is restricted to closing a window before opening another window. Hence, there is no maximizing nor minimizing of windows in the educational organizer 20. Furthermore, just as the primary user cannot control the size of the window, neither can the primary user control the location of the window, i.e., the window remains fixed in location on the monitor. In fact, much of the WINDOWS capability that is normally available for switching among, or in/out of, WINDOWS via the keyboard 4/mouse 7 is disabled. This is to insure the consistency of organization and design in order to facilitate and enhance rapid transfer of training and generalization. In addition, disabling such WINDOWS functions also prevents the user from inadvertently causing a failure or inadvertently closing/leaving a window.

As with other WINDOWS programs, the user of the educational organizer 20 controls the operation of the educational organizer 20 primarily with on-screen push buttons having distinct colors (e.g., in FIG. 6, the following press buttons have the indicated colors: New-olive, Modify-chocolate, Done-purple, Exit-red, History-magenta, Sort-blue, Print-green and Class-aqua) or radio buttons (e.g., FIG. 7A). These buttons are menu selections and function selections within individual applications. As stated previously, instead of the double click of the mouse 7, a single click simplifies operation for physically handicapped users. Text input is entered from the keyboard 4. To simplify operation of the software for physically handicapped users, the keyboard 4 controls are unnecessary except for text entry, but arrow keys can control pointer 60 movement on certain menus in order to accommodate users who prefer keyboard 4 control. For example, in moving to another word variation in the Spelling option (FIG. 16B) the user can select a word by pointing and clicking once with the mouse 7 or by just striking the up-arrow or down-arrow on the keyboard 4. The appearance of the on-screen pointer 60 can be controlled by other manufacturers driver software in order to enhance the visual aspects of the application.

Before a description of the individual windows is covered, it is necessary to identify common visual indicia displayed in most, if not all, of the windows. As stated previously, the visual display 12 of the monitor 3 by the educational organizer 20 software is arranged to make the software easier for users with cognitive impairment. The spatial layout of menus, dialog boxes, text boxes, help and information bars (all of which can be termed "working information") leads to reduced and orderly visual scanning.

The colors used throughout the educational organizer 20 are consistent with the functions of the controls. For example, red push buttons always indicate "Exit" to Main Menu, green push buttons always indicate "Print", etc. The selected menu item is outlined in a red frame 62 (School option 22 in FIG. 3) to indicate it as selected as well as to indicate the location of the pointer 60. Distinct colors for the different push buttons are intended to simplify differentiation between controls in different menus. Color also serves to attract attention, enhance arousal, and sustain concentration.

Furthermore, in menu screens the pointer 60 is restricted to the area in which selections can be made, thereby reducing the possibility of losing the pointer 60. For example, in FIG. 3, travel of the pointer 60 is limited to either the School option 24, the Journals option 26 or the Tools option 28; the pointer 60 cannot be anywhere else, regardless of where the mouse 7 is currently located.

The screen layout of controls and text boxes is simple, highly structured, and consistent throughout the educational organizer 20 to improve intuitive understanding of functions and controls not only in individual modules (e.g., the Homework function, FIGS. 7A–7E) but across modules (e.g., the Class functions of FIG. 2B: Notes, Homework, Vocabulary, Rules and Writer) as well. The screen layout is also modifiable to accommodate visual scanning requirements. For example, in the case of left neglect the menus throughout the educational organizer 20 are shifted to the right of the screen 12 while maintaining the entire screen 12 in a lighted condition. The screen position of the menus and other working information can be standard, as in the included diagrams, or a center column for macular-spared vision loss (extreme tunnel vision), or left or right columns for neglect.

The Main Menu (FIG. 3) differs from the others, as it is intended to be the primary user's "home base" from where the user always starts. The primary user is not meant to abandon the program without returning to the Main Menu, and as a result, it has a different appearance.

Several features are consistent throughout the educational organizer 20. A guidance icon 64 having a contour representative of the active I/O device (e.g., mouse 7, joystick 8, etc.) that the user controls the pointer 60 with, and having an associated text "Pick and Click" (e.g., FIG. 3), is usually always present on the screen 12. It is included to take into account the needs of all users. This icon 64 is located near the appropriate menu from which selections are to be made, and serves to remind the user at all times about the basic operation of the program. It is configurable to different I/O devices and can be removed should it become superfluous. As shown in FIG. 3, the mouse-like contour of the guidance icon 64 informs the user that he/she can pick one of the options by moving the mouse 7 in a vertical direction and then clicking either the left or right mouse 7 button. Text may be included within the icon 64 to further assist the user. As such, the guidance icon 64 graphically and linguistically instructs the user what he/she must do to respond. It should be noted, that unlike the typical WINDOWS icon which represents a minimized window, the guidance icon 64 in the educational organizer 20 does not represent a second window that the primary user can open; rather, the guidance icon 64 provides only instruction to the primary user as to what actions are permitted in responding. In addition, an instruction box 66 may surround the guidance icon 64 to provide more detailed guidance, especially where there is a sequence of steps involved in responding (e.g., FIG. 16A).

Figure 9B:
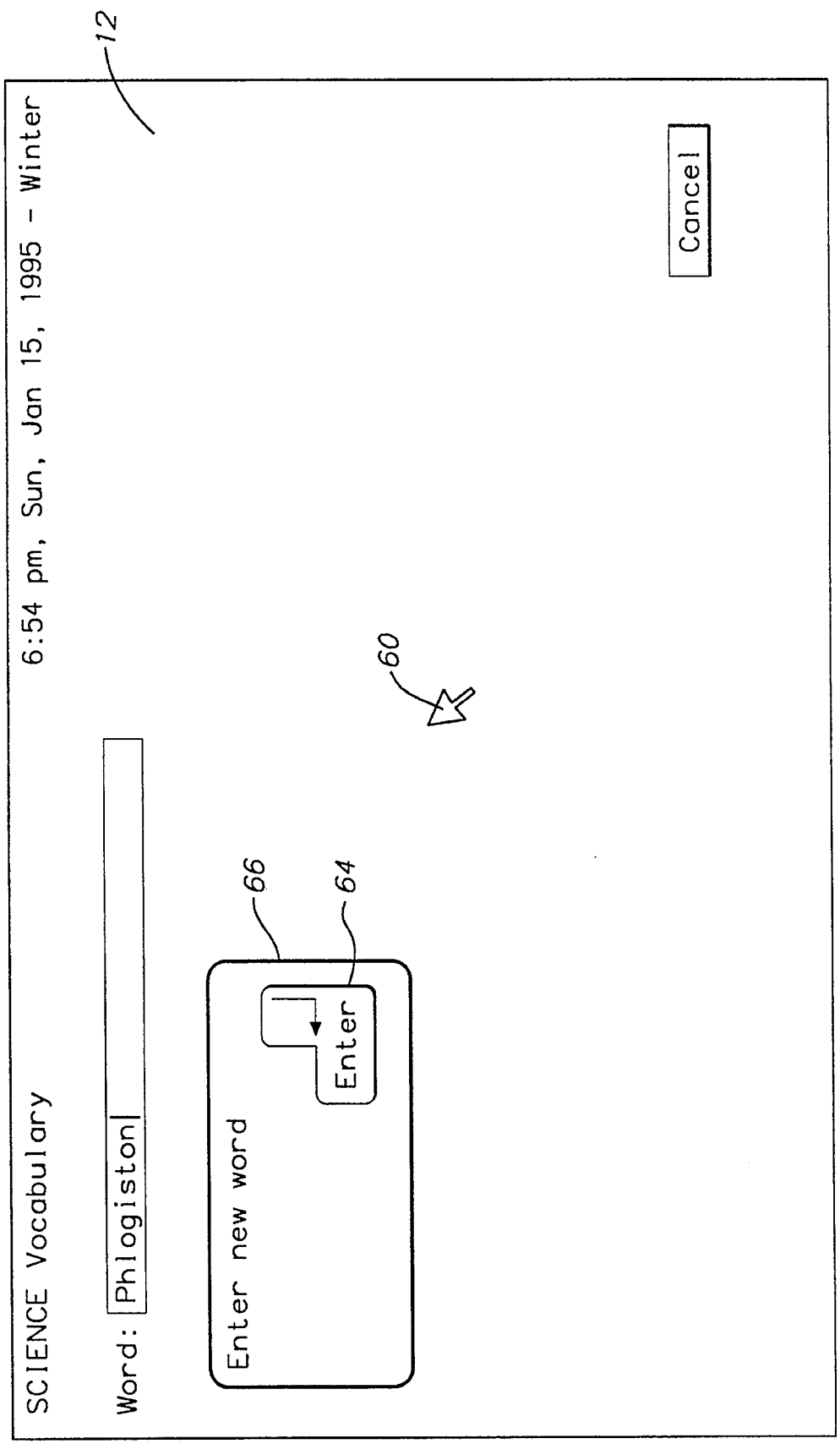
Figure 9C:
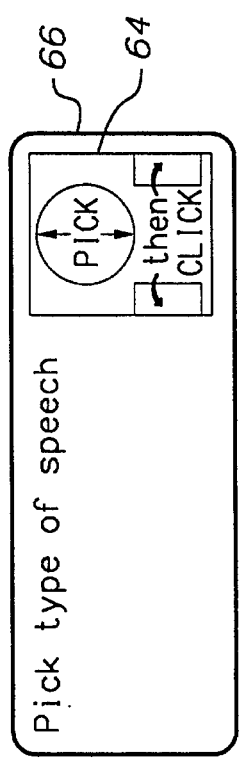

In other instances, the guidance icon 64 (FIG. 9A) has an entry key appearance and is displayed within the instruction box 66 to clearly indicate to the user that a keyboard entry must be used in this situation and not the mouse 7, track ball 9, etc.

The name of the current menu or modules is personalized to the user and appears in the upper left hand corner of the screen (FIG. 3). The current time, day of the week, date, and season are always in the upper right hand corner of the screen (FIG. 3). At the bottom right of the screen is the Information Help Text Box 68, a field where explanatory text is displayed. This text changes to correspond with the position of the pointer 60 to provide context-sensitive help on the selection of the pointer 60. This Help Box 68 provides ongoing support, thereby reducing perplexity, confusion, and reactive emotional distress. For example, when the user selects the School option 24, the Information Help Text Box 68 immediately presents the user with a list of all of the available options under School options 24 (Roster, Notes, Vocabulary, Rules and Writer, FIGS. 2A–2B). The location of the Information Help Text Box 68 is intended to provide relevant information at a predictable location on the screen 12, thereby reducing visual scanning and memory demands. Lastly, the lower left corner of the screen 12 is reserved for information pertinent to the Assignee of the present invention.

Figure 16A:
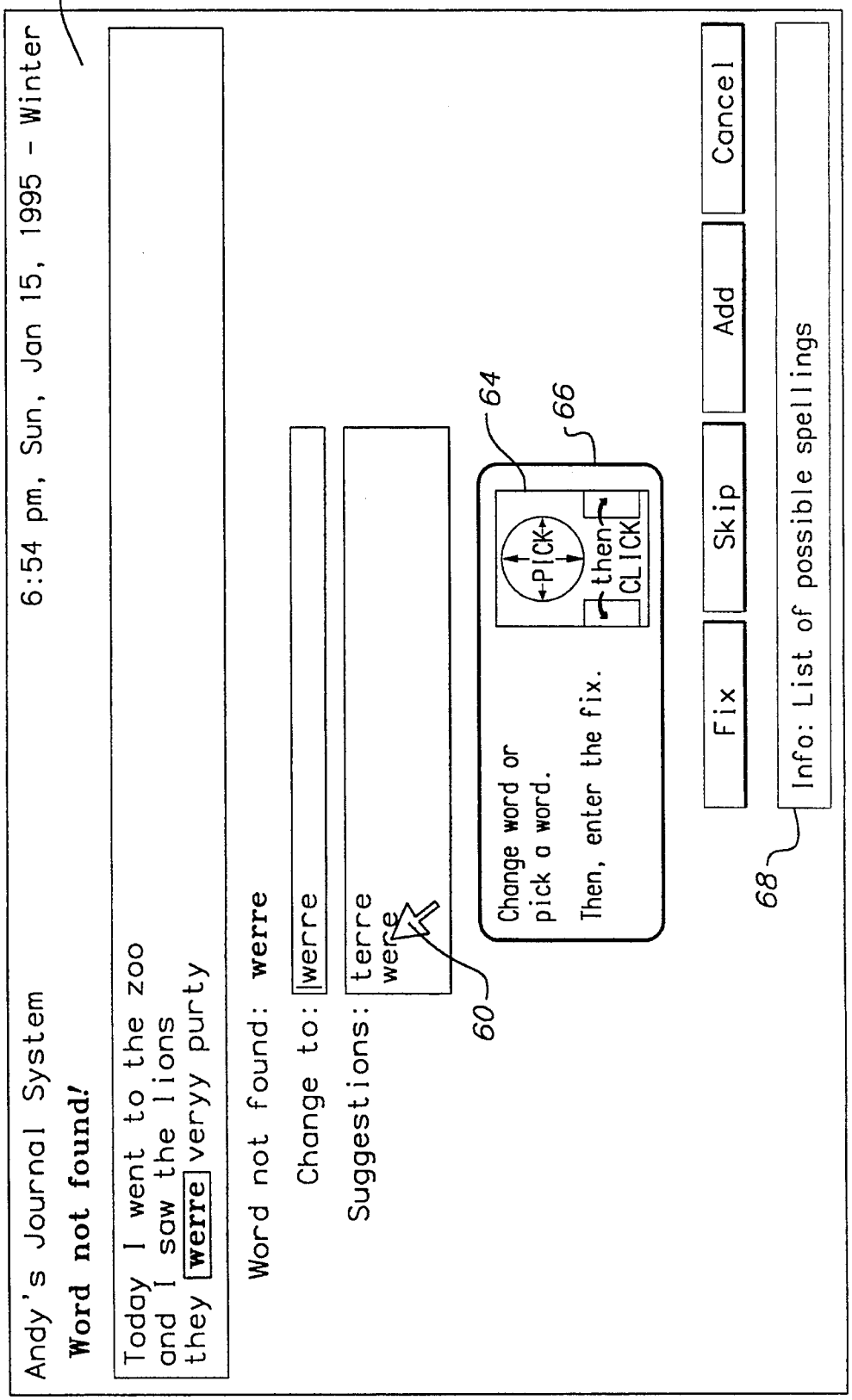
FIGS. 16A–16B are the Spelling subfunction of the School Journal in FIG. 14.

The menus of the individual modules (e.g., Class Functions, FIG. 5) appear as file folders with tabs along the top of the screen 12, in order to evoke associations with school. Menu selections may have different controls formed by colored press buttons (Subfunctions, e.g., FIG. 6) along the bottom of the screen 12. Many of these subfunctions work similarly. For example, the Spelling subfunction permits a text to be spell-checked by allowing the user to select a Fix, Skip, Add or Cancel operation (FIG. 16A). These four operations are available everywhere the Spelling subfunction is available in the educational organizer 20.

Figure 4:
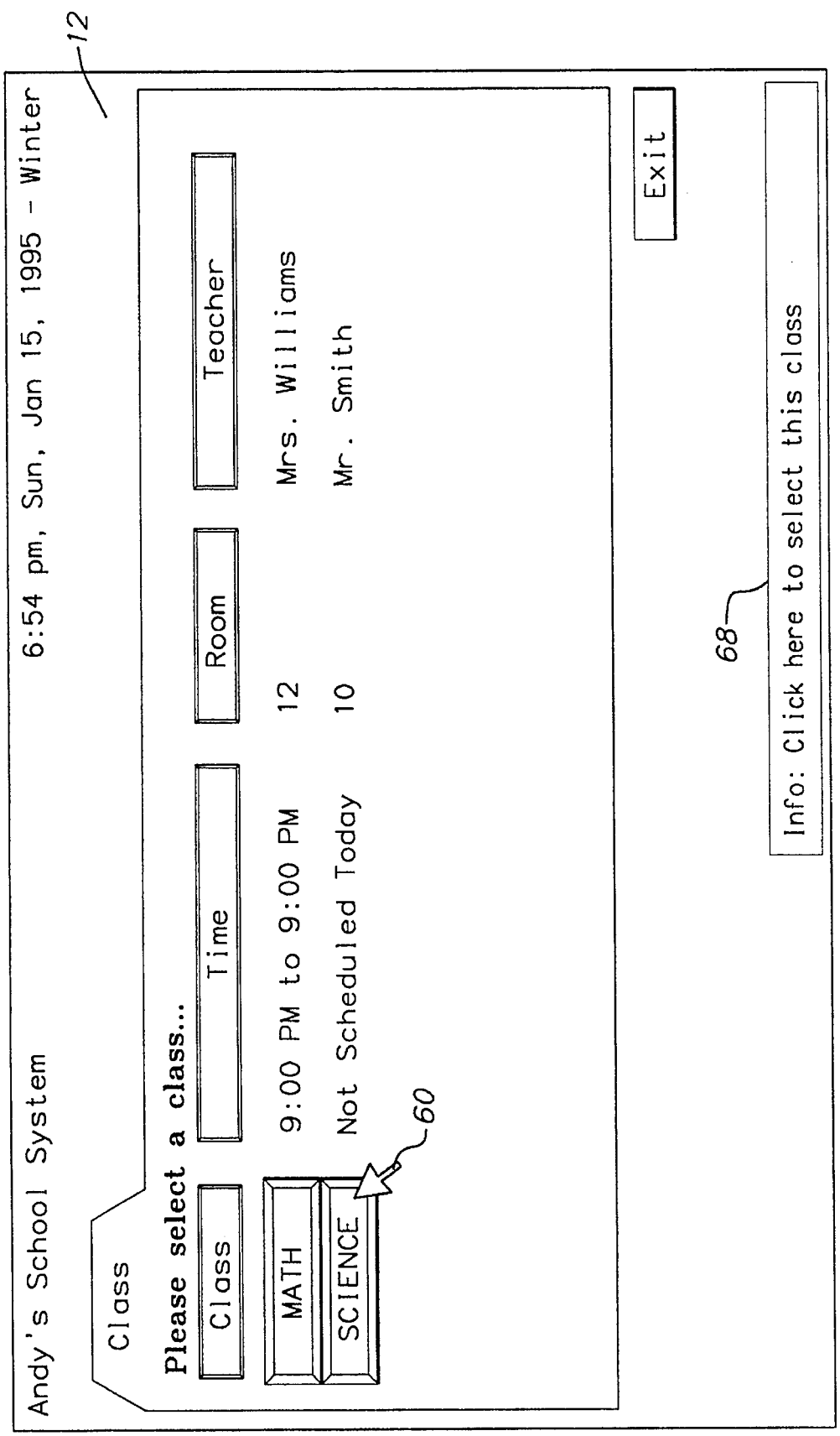
FIG. 4 is the roster menu of the educational organizer.

Selection of the School Option 24 from the Main Menu brings the user to a Roster 30 menu (FIG. 4) that lists all of the user's classes including time, room number and teacher. The user can select a particular class by clicking the mouse 7 key on an indicated class. Upon clicking on a particular class, the user is brought to the class functions (FIG. 5, Notes, Homework, Vocabulary, Rules and Writer) level from which the user can select. The default condition is the Notes function. The primary user can enter any one of the other functions simply by placing the pointer 60 on the tab of the desired file folder.

Figure 5:
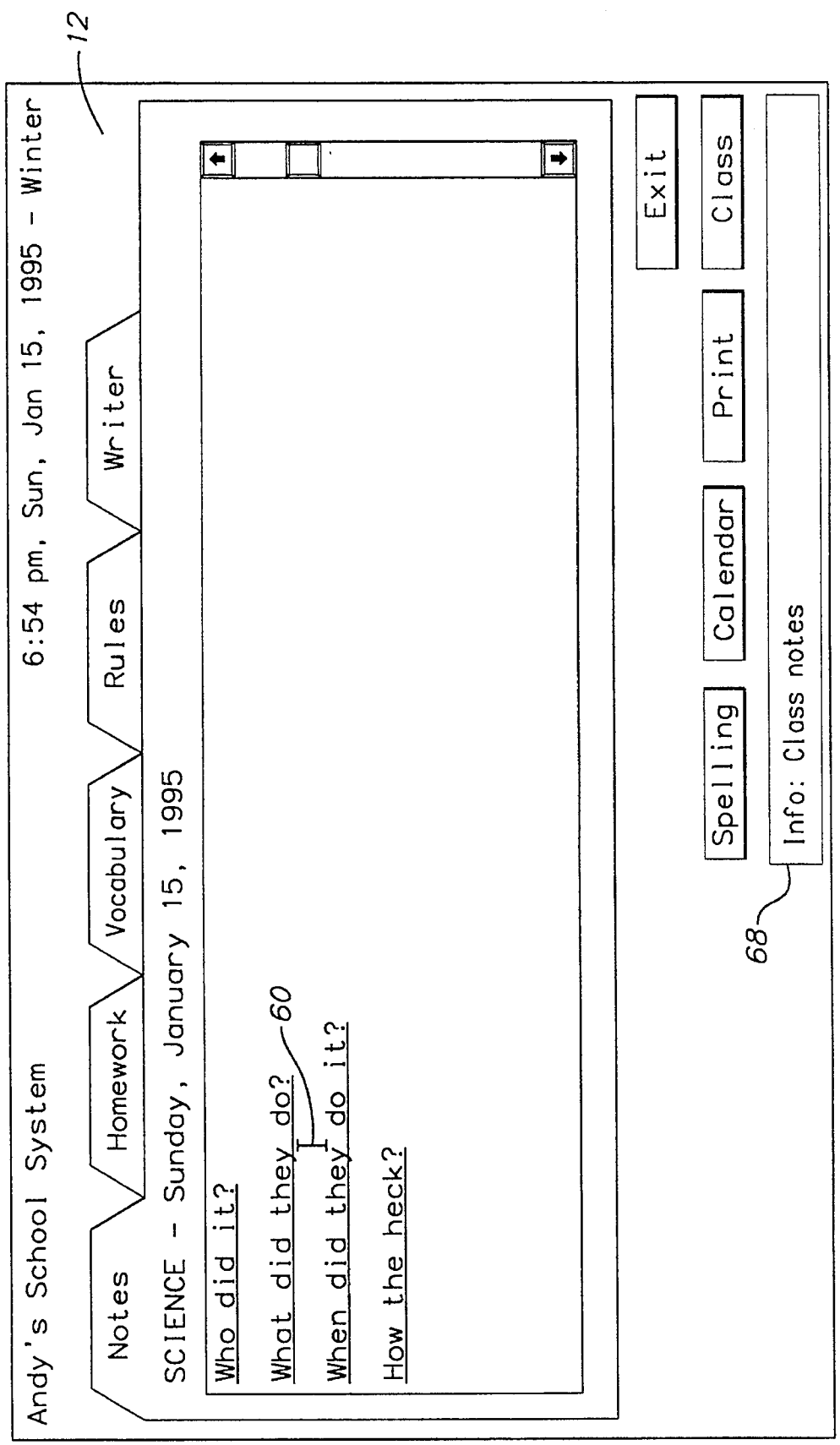
FIG. 5 is the Notes function for a science class of the educational organizer.

As shown in FIG. 5, the Notes function comprises a text area for taking notes during class. This can be a blank screen or, using the Maintenance Menu (FIG. 24), the teacher can choose up to six divisions (e.g., the "Who, What, Where, When, How, and Why of a related class subject) to be displayed on the screen 12 (FIG. 5) which are intended to organize note taking during class and cannot be edited by the primary user. The primary user is instructed to enter information accordingly under the appropriate division. The purpose of these queries is to organize and structure the pertinent class subject matter.

Figure 7A:
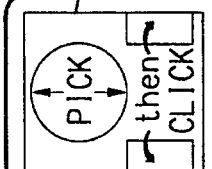
Figure 7C:
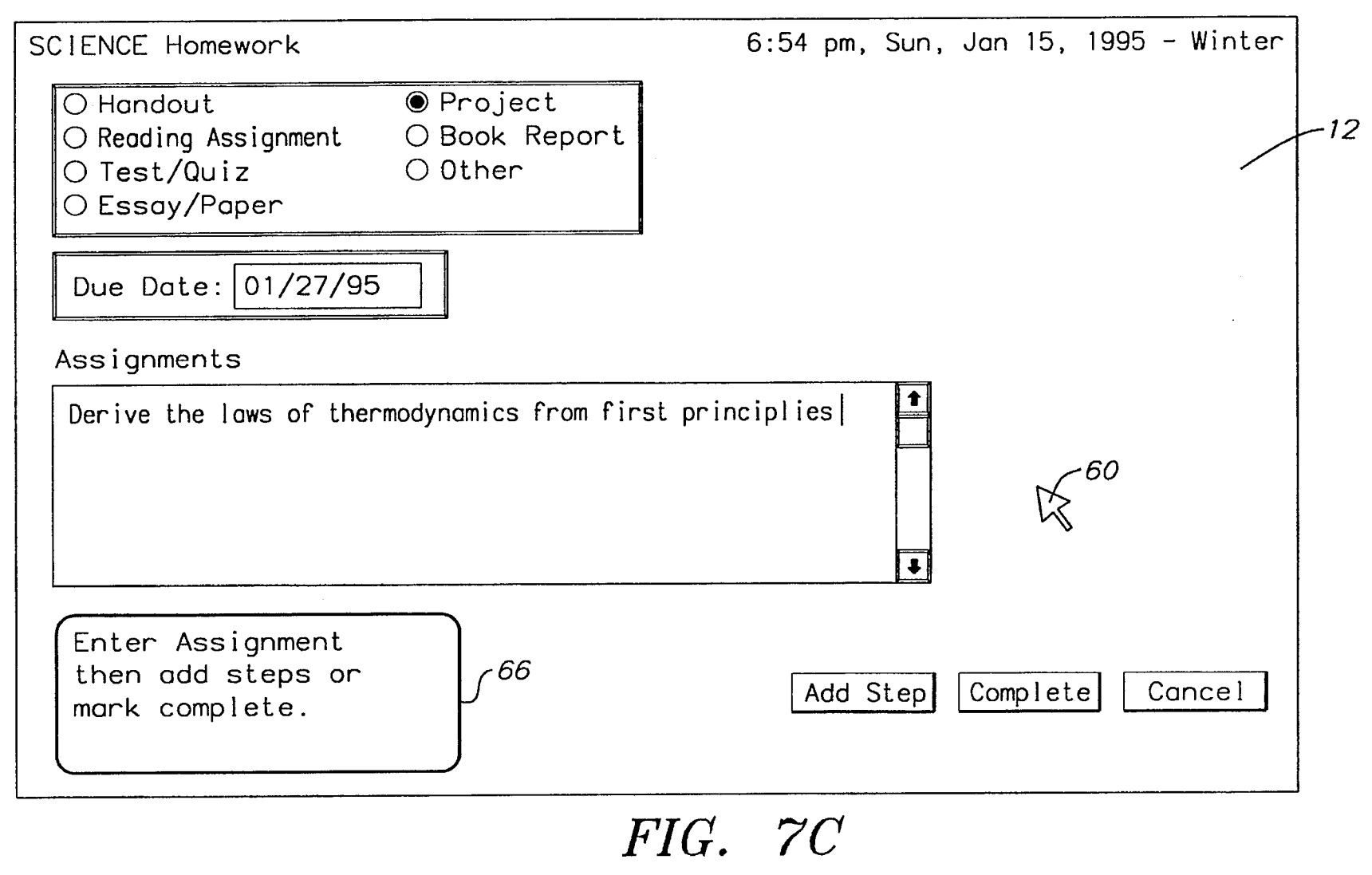

As shown in FIG. 6, the Homework function has a format that permits the primary user to schedule a homework assignment as a project having a due date but with the added feature that each project can be divided into smaller steps, each with their own respective completion dates. In this manner, the primary user can simplify the accomplishment of a large task by completing the overall project in a series of small steps or sub-goals. Selecting a due date for the overall homework assignment is a three phase process. First, upon selecting the New subfunction under the Homework function (FIG. 2B) the user is brought to the window of FIG. 7A wherein the user selects a homework-type (e.g., Handout, Reading Assignment, Test/Quiz, etc.) using the radio buttons in the upper left of the screen 12; the Cancel subfunction in the lower right of the screen 12 permits the user to undo the homework-type selection and return to the original Homework function (FIG. 6). Second, once the user has selected the homework-type, the user is presented with a calendar of the current month/year (FIG. 7B) for selecting a due date. It is important to note that all dates prior to the current date (i.e., the date indicated in the upper right portion of the screen 12 in FIG. 7B) are remain dull in appearance (shown in FIG. 7B as italicized numbers); this indicates to the user that past dates are not permitted due dates for a homework assignment. All selectable dates are indicated in bold (shown in FIG. 7B as non-italicized numbers) with the current date being highlighted (shown in FIG. 7B as a bolded, non-italicized "15"). Note also that the user has the ability to scroll further to any date in the future, as indicated by the accompanying month arrow 70 and year arrow 72 (FIG. 7B). To facilitate the user in differentiating between work days and weekends and envision a work week as a distinct visual unit from the weekend, each calendar-month is constructed so that Monday begins the work week, while Saturday and Sunday are located adjacent each other at the end of the week and consist of a common color (shown in FIG. 7B as bolded, italicized numbers) that is different from the rest of the week. Third, once the due date is selected, the user is brought to a window that provides a field into which the user can describe the homework assignment and enter any steps, if desired (FIG. 7C). In the lower right of the screen 12, the operations Add Step, Complete and Cancel permit the user to either add a step to the assignment, complete the entry of the assignment and return to the original Homework function (FIG. 6), or cancel the entry of the assignment and return to the original Homework function (FIG. 6). Adding steps to the homework assignment is a two phase process. First, selection of the Add Step operation brings the user to the window shown in FIG. 7D which repeats the due date selections discussed earlier for assigning a due date to the overall project in FIG. 7B. Second, upon selection of a due date for a particular step, the user is brought to a window (FIG. 7E) which provides a field in which the step can be described that is similar to the homework assignment description window, as discussed earlier for FIG. 7C. It should be noted that the other subfunctions for Homework (FIG. 2B) are: Modify (for changing a selected assignment), Done (for marking selected homework as done), History (for reviewing a list of homework marked done) and Sort (for displaying assignments with steps). Finally, it should be noted that the color of the text 74 (FIG. 6) of a homework assignment, any corresponding steps and their respective due dates can change (e.g., from black to green to red) as the due date of the assignment/step goes from pending to imminent to overdue.

Figure 8:
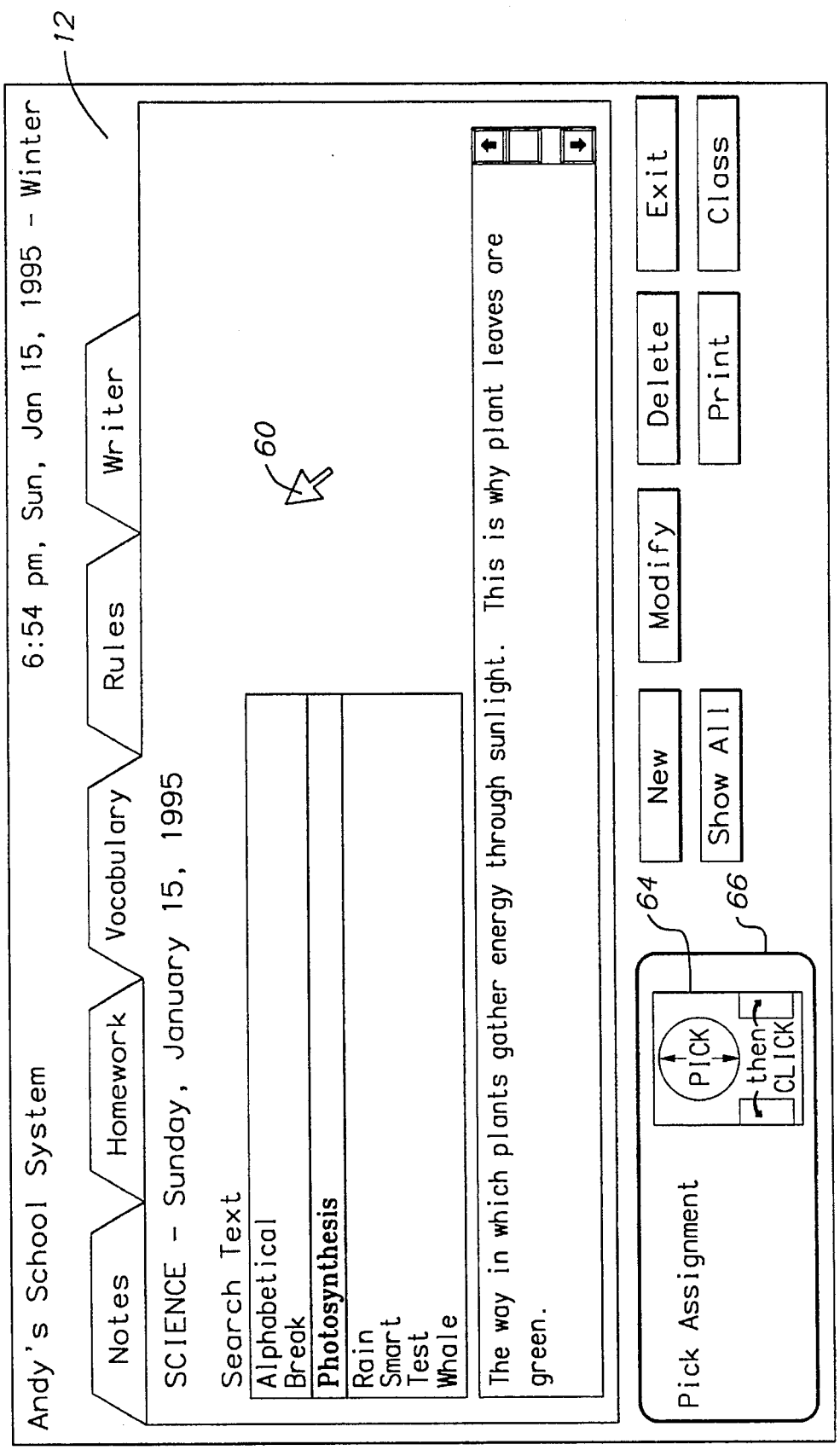
FIG. 8 is the Vocabulary function for a science class of the educational organizer.
Figure 9D:
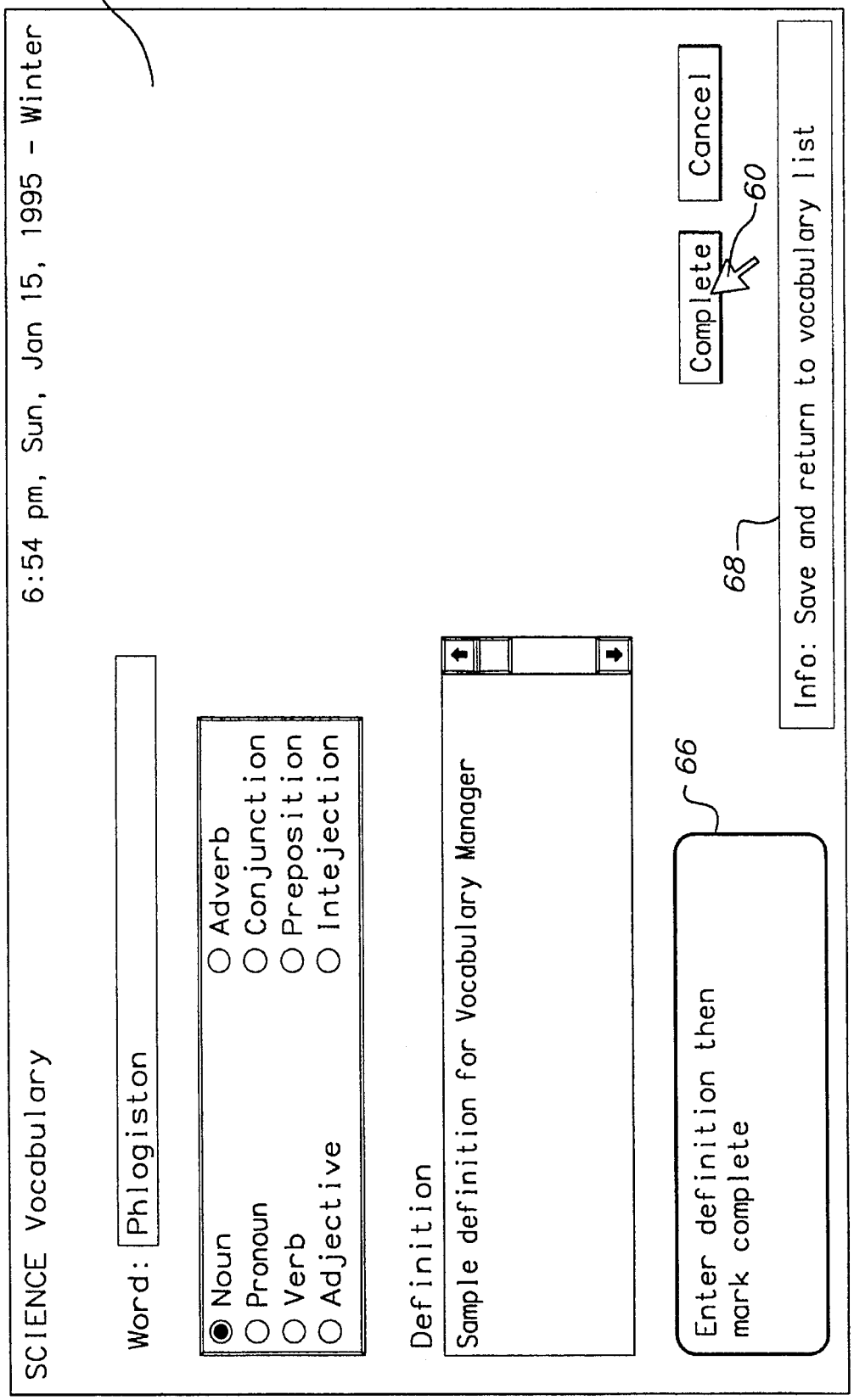

As shown in FIG. 8, the Vocabulary function permits the student to develop a vocabulary list for every class. In addition, the user has the unique ability to display a comprehensive vocabulary list that includes other class vocabularies (Show All subfunction). FIGS. 9A–9D depict a four step procedure of the New subfunction in the Vocabulary function (FIG. 2B): prompting the user to enter a new vocabulary word (FIG. 9A), user enters the new vocabulary word (FIG. 9B), user selects the part of speech that categorizes the new vocabulary word (FIG. 9C) and finally the user enters the definition of the new vocabulary word (FIG. 9D).

Figure 10:
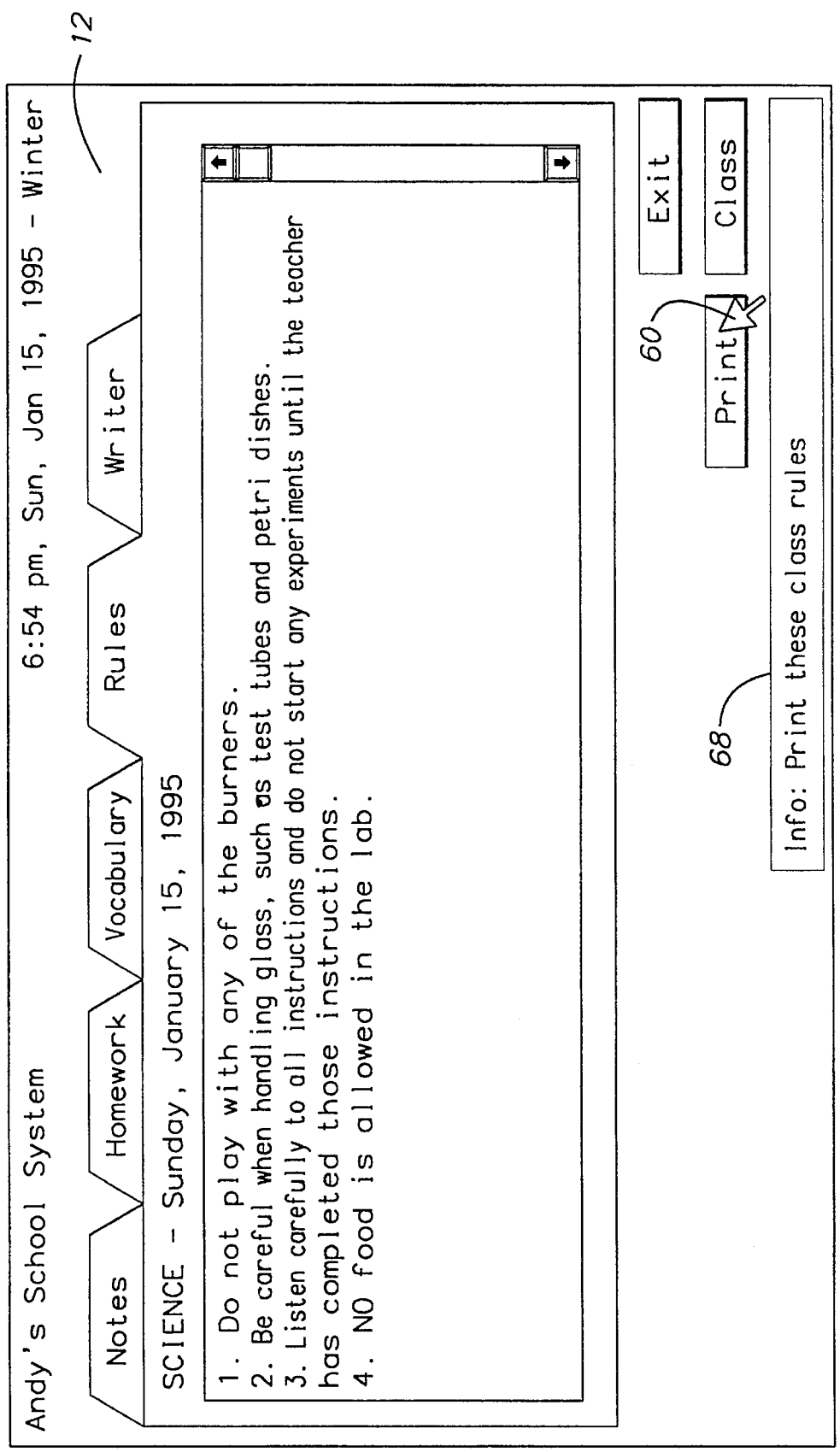
FIG. 10 is the Rules function for a science class of the educational organizer.

As shown in FIG. 10, the Rules function for a particular class permits the user to enter text regarding specific rules to be followed for the selected class.

Figure 11:
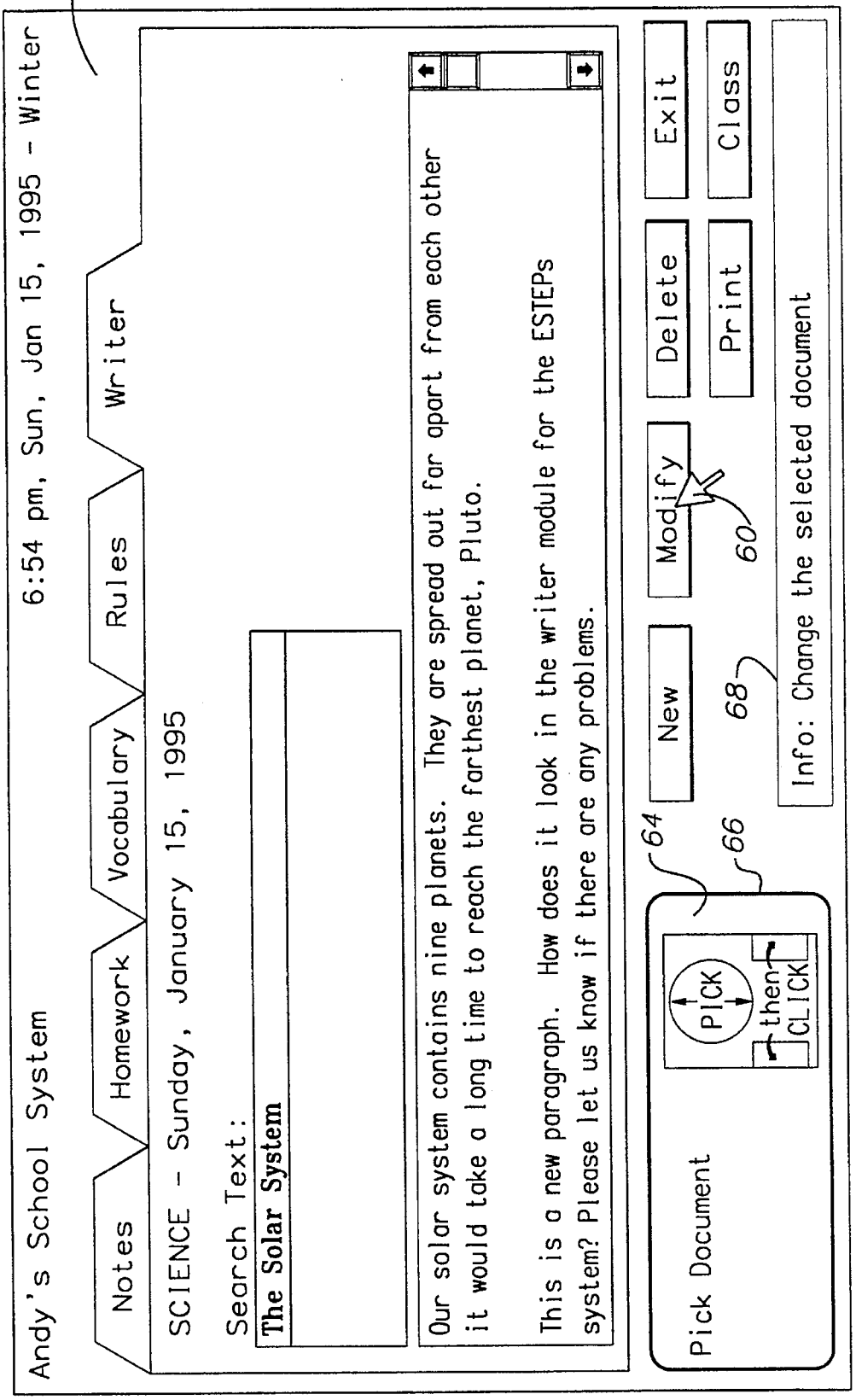
FIG. 11 is the Writer function for a science class of the educational organizer.
Figure 12:
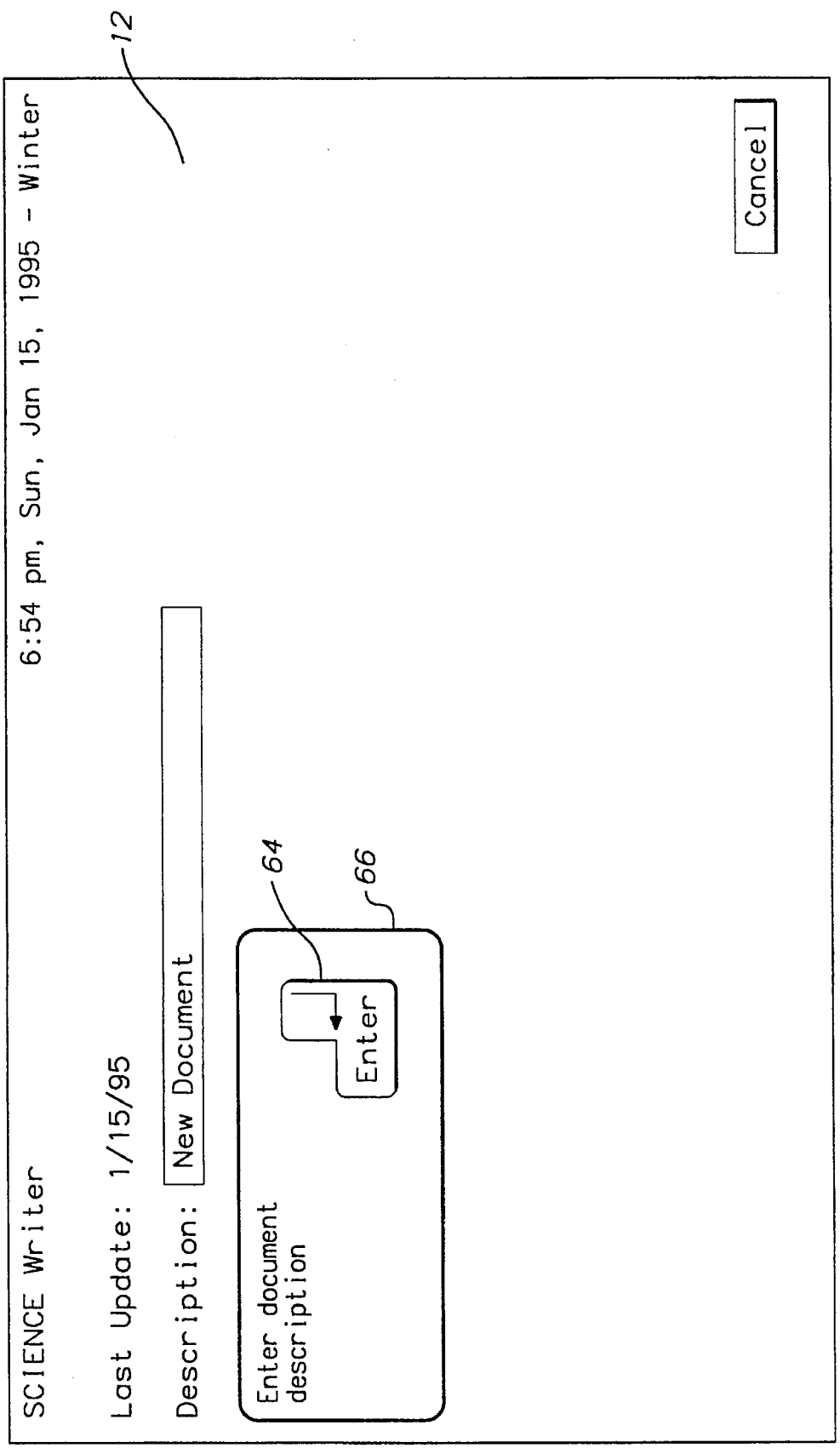
FIG. 12 is the New subfunction of the Writer function in FIG. 11.
Figure 13A:
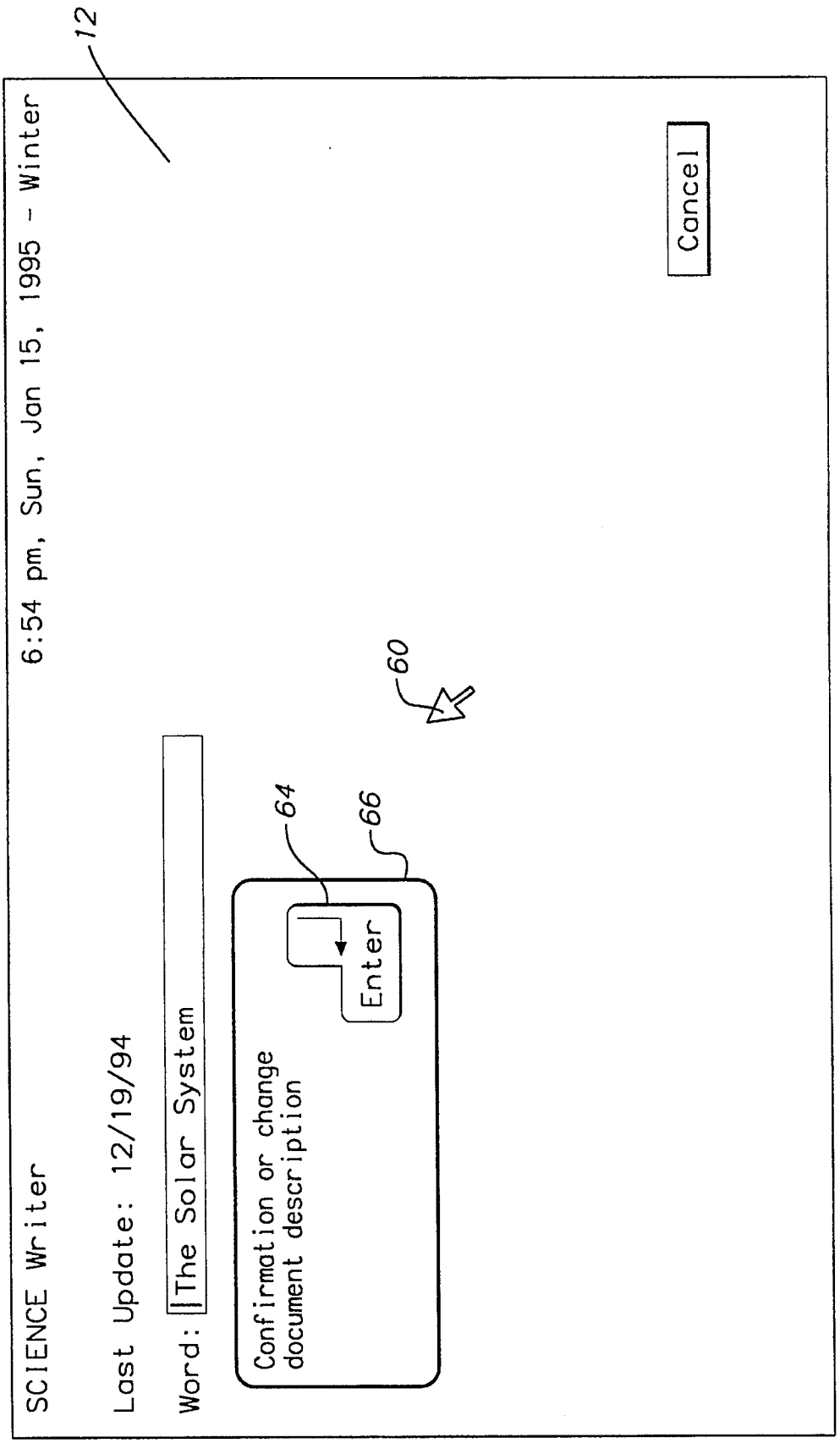

As shown in FIG. 11, the Writer function permits the user to type a document, letter, etc. regarding a particular class. One important feature of the Writer is that it permits the user to create and edit documents without the need for the user to assign a file name to the document, define a path for saving the document, nor remember a file name in trying to later retrieve the document. Instead, the Writer assigns a field within the document itself that permits the user to title his/her document. That title then becomes the equivalent to a file name; the user does not have to worry about condensing a document title into eight characters with an extender (e.g., solar.doc). In particular, FIG. 12 depicts the window after the user has selected the New subfunction of the Writer function (FIG. 2B). FIGS. 13A–13B depict the Modify subfunction (FIG. 2B) having been selected in order to change the document name (FIG. 13A) or edit the document text (FIG. 13B).

Figure 15:
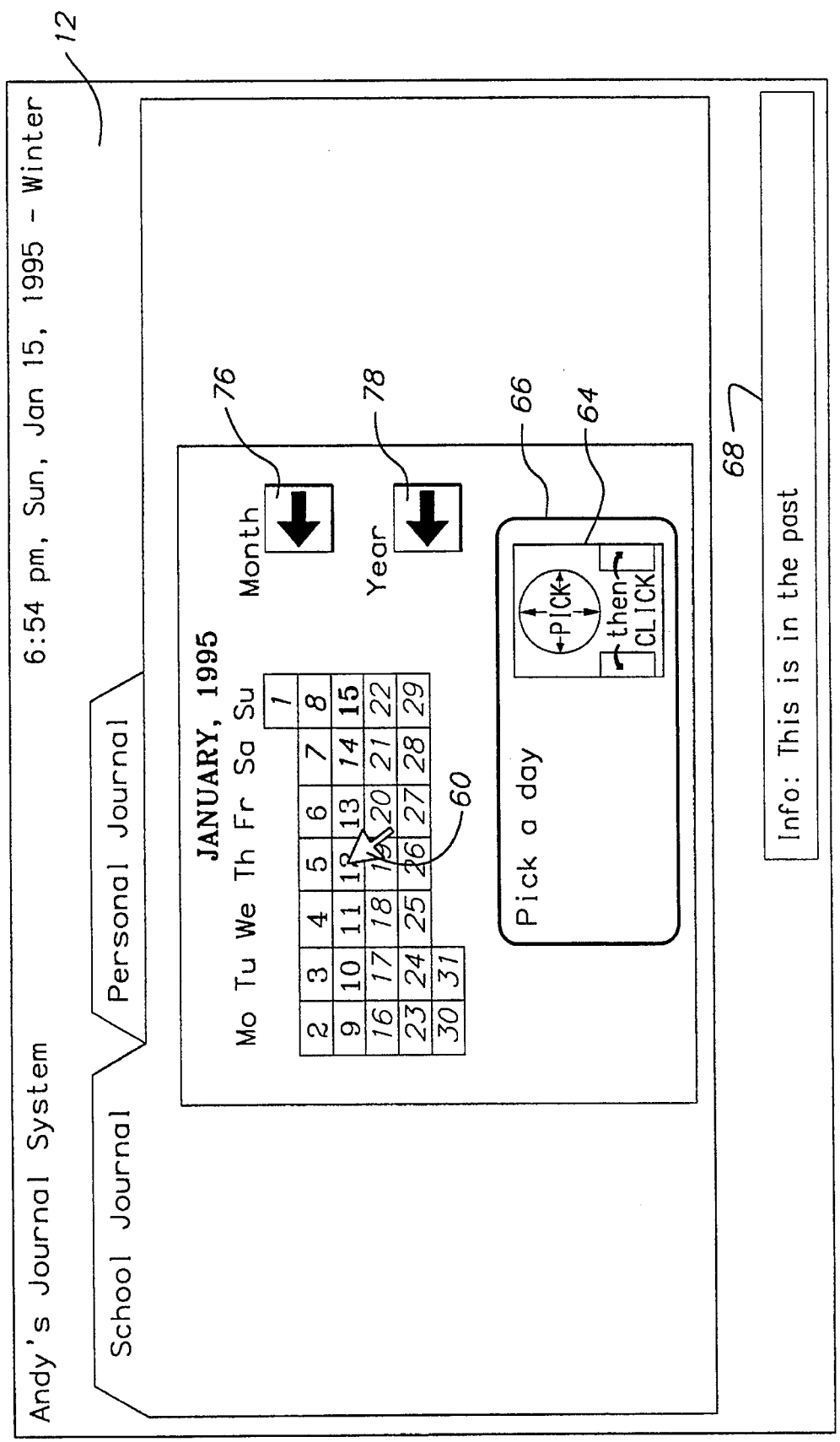
FIG. 15 is the Calendar subfunction of the School Journal function in FIG. 14.
Figure 16B:
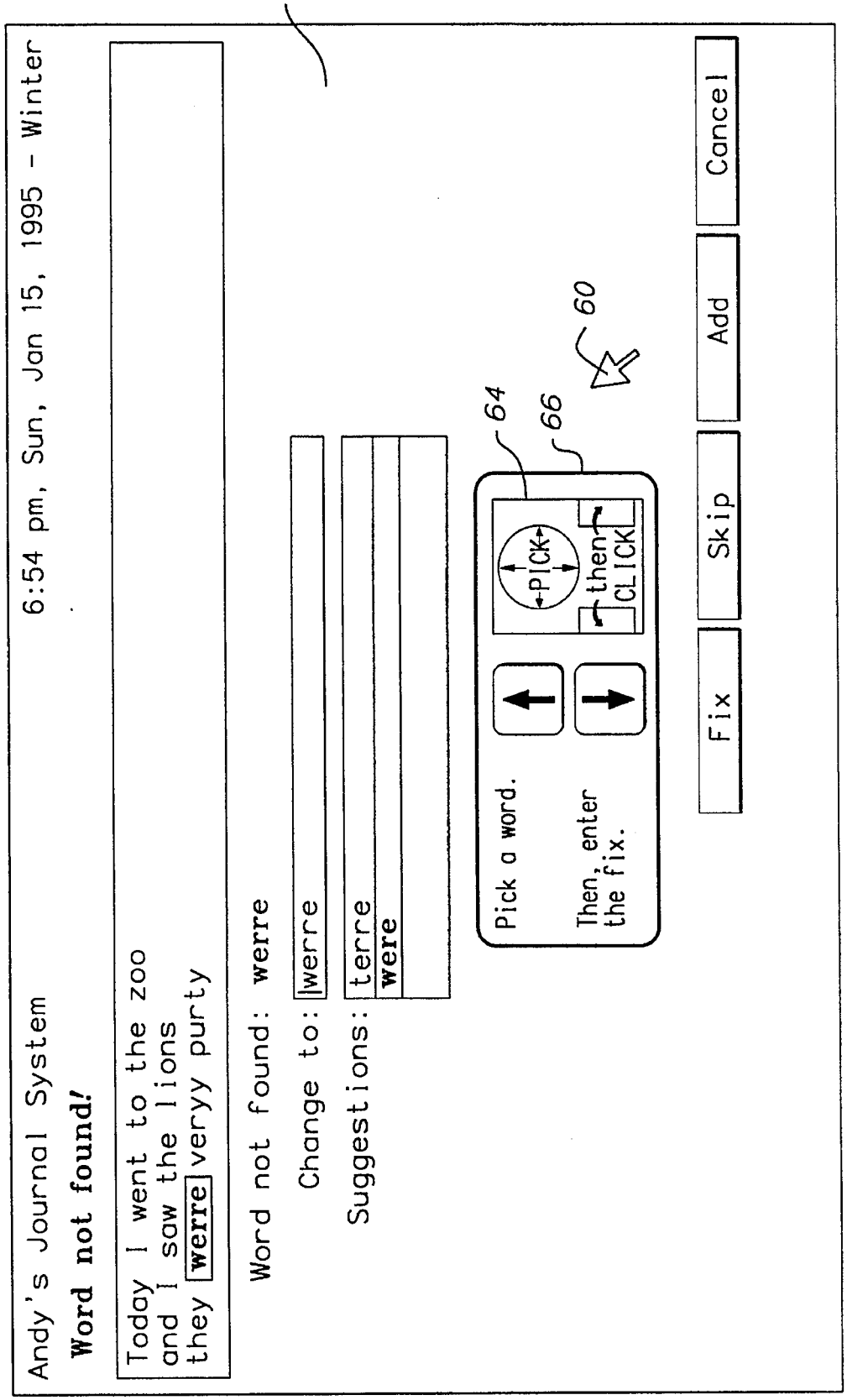

Selection of the Journals Option 26 from the Main Menu brings the user to Journal Folders 32 (FIG. 2C) that depict the available journals as file folders. Upon selecting the School Journal (FIG. 14) the user is presented with a time-entry prompt 42 to begin entering text; as such, every entry has an associated automatic entry time. Furthermore, the user has the subfunctions of Spelling, Calendar, Print and Exit. Except for the Calendar subfunction, the other subfunctions operate as discussed previously with respect to the Class Functions (FIG. 5). The Calendar subfunction in the School Journal function operates in a similar fashion as the Calendar subfunction in the Homework Function (FIGS. 7B and 7D) except for the available time period, i.e, the Calendar subfunction in the School Journal permits the user to select dates only in the past (which are indicated in non-italicized numbers, FIG. 15) including the present date (indicated by a bolded, non-italicized number "15", FIG. 15), but not in the future. As such, the month arrow 76 and year arrow 78 point into the past. In FIGS. 16A–16B, the Spelling subfunction of the School Journal has been selected, thereby permitting the user to select any one of the four operations of Fix, Skip, Add or Cancel.

The primary user can enter the Personal Journal (as well as any other available journal) by simply placing the pointer 60 on the tab of the desired file folder. It should be noted that the Vocational Journal and the Medicine/Health Journal indicated in FIG. 2C are proposed journals that provide the primary user with journals specific to job/work tasks and the taking of medication/doctor visits, respectively. These two journals have respective functions (FIG. 2C, 80 and 82, e.g., Spelling, Calendar and Print) that operate similarly to the subfunctions in the School Journal and the Personal Journal. At this time, the Vocational Journal and the Medicine/Health Journal are not available on the educational organizer 20 and as such there is no file folder appearing in the Journal Folders window (e.g., FIG. 14).

Figure 18:
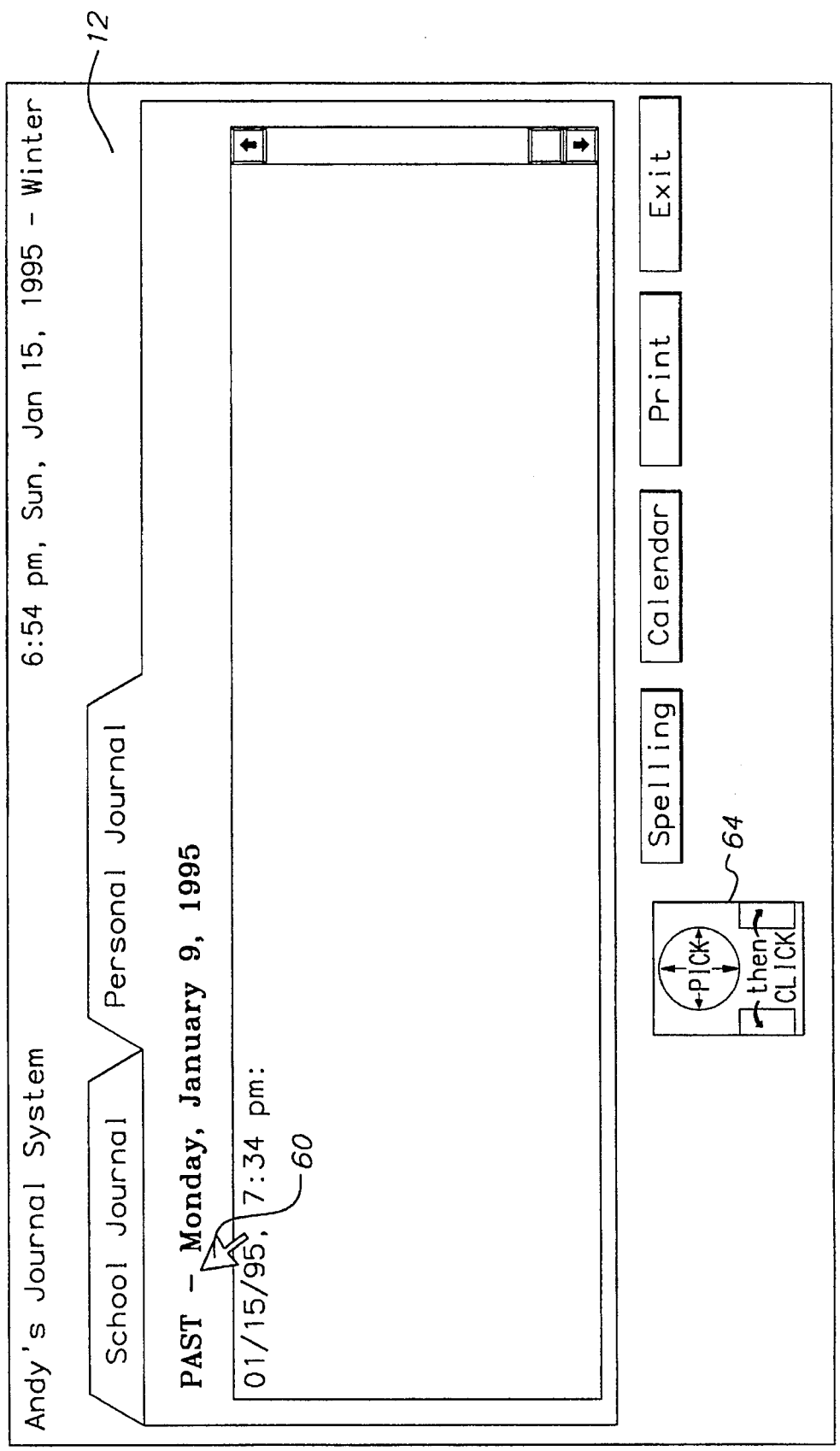
FIG. 18 is the selected date display using the Calendar subfunction of the Personal Journal function.

Upon entry into the Personal Journal (FIG. 17), the primary user is immediately prompted to type in a user-selected password and to enter that password using the entry key on the keyboard 4. The field where the password is typed in does not echo the keystrokes on the screen 12, i.e., as the primary user enters the password, the question marks are all that are seen during the entry. Use of the password and the non-echo feature of this window provide the user with restricted access to this journal because it is personal in nature. In addition, this feature also prevents access to the Personal Journal by the tertiary users at the remote back-up location where the content of the Personal Journal is also saved using the Back-Up option 44. Once the correct password is entered, entry into the Personal Journal (FIG. 18) is permitted. Further operation of the Personal Journal (FIG. 18) is similar to operation of the School Journal discussed above with regard to FIGS. 14–16B.

Access to the Maintenance Menu 22 (FIG. 2D) by the secondary/tertiary user is achieved by a command known only to them (e.g., positioning the pointer 60 on the uppermost option in the Main Menu and depressing the keyboard "Ctrl" key simultaneously with either the left or right button on the mouse 7). As stated earlier, the educational organizer 20 is customizable by teachers or therapists to meet the needs of the individual user. The customization is accomplished via the Maintenance Menu 22. This menu permits the system configuration, preferences and roster structure, and note taking structure to be modified. The default option is the User Information option 50 (FIG. 22) that displays user information such as the user's name, address, and phone number. As with the Roster 30 and the Journal folders 32, entry into another option in the Maintenance Menu 22 is achieved by locating the pointer 60 on the tab of a desired option. The teacher or therapist can exit the Maintenance Menu 22 by selecting the Exit press button (FIG. 22) and return to the Main Menu.

The Classes option (FIG. 23) contains information concerning the roster 30 of a particular user, with the ability to, among other things, add, edit or remove classes. Upon entry into the Classes option (FIG. 23) the first two columns labeled "Class ID" and "Name" are displayed on the screen 12 in a common color (e.g., blue) whereas the columns labeled "Teacher", "Room", "Grade" and "Monday" appear in a different common color (e.g., white). The purpose of the different color for the first two columns is that they remain fixed in the display 12 while the other columns can be scrolled to the left using the scroll bar 84 in order to reveal other columns not visible at the right of the display 12. To add a new class, the New press button is selected and to edit an existing class the Modify press button is selected. Selection of the New press button takes the teacher/therapist to a display 12 as shown in FIG. 24 that permits the secondary user to enter a new class with all of the appropriate class information. As shown in the lower portion of FIG. 24, the teacher/therapist can enter the desired queries discussed earlier with regard to the Notes function (FIG. 5). Upon completion, the secondary user can select the Completion press button and return to the display 12 of FIG. 23 or the secondary user can choose to cancel the new entry by selecting the Cancel press button and return to the display 12 of FIG. 23. If the secondary user wishes to edit an existing class, the secondary user selects the Modify press button which brings the secondary user to the display 12 of FIG. 25 for editing the corresponding information of the selected class. Upon completion of the editing, the secondary user has the same options for leaving this display as discussed previously regarding the addition of a new class in the Classes option (FIG. 23).

Figure 23:
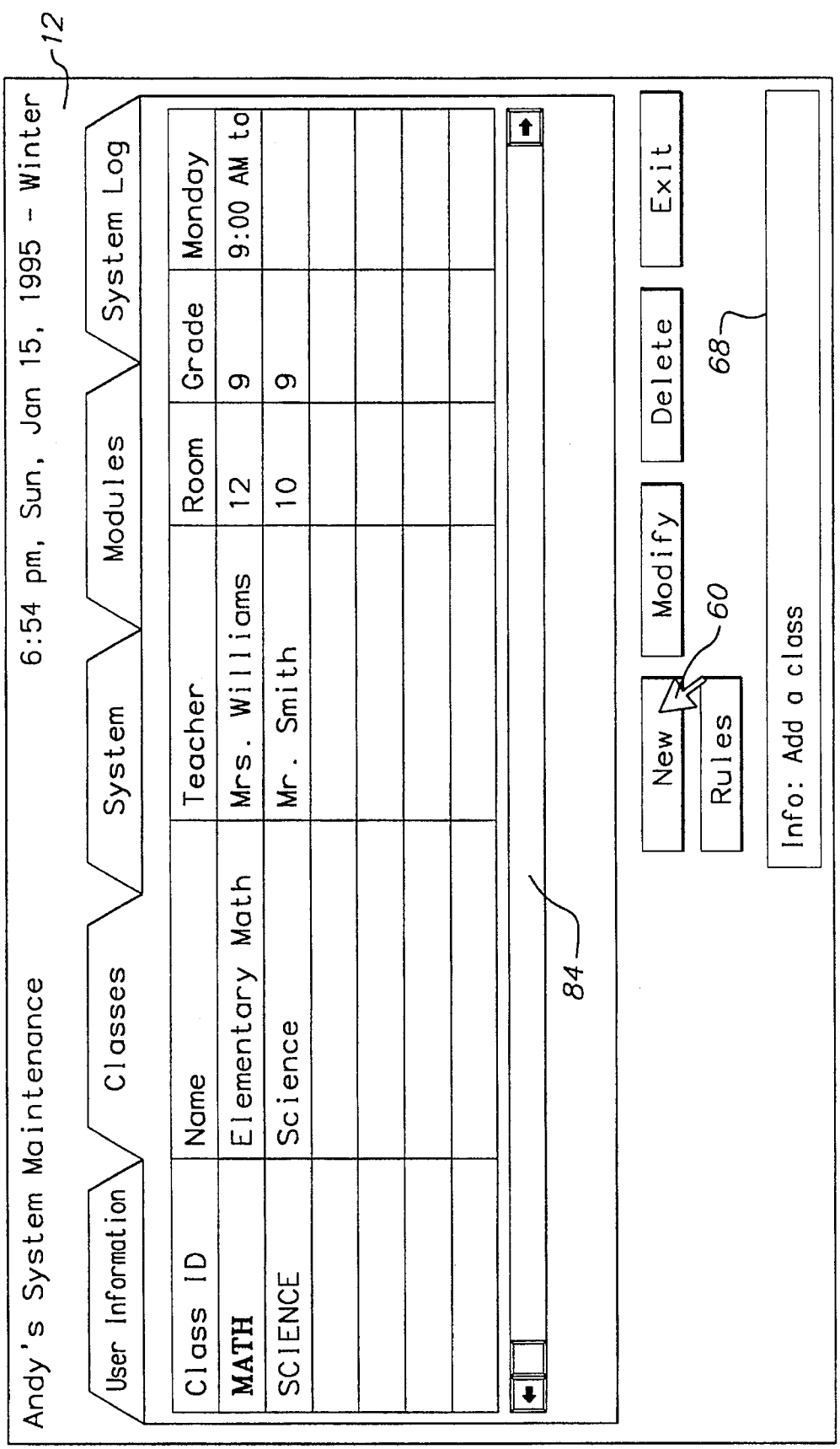
FIG. 23 is the Classes function of the Maintenance Menu.
Figure 27:
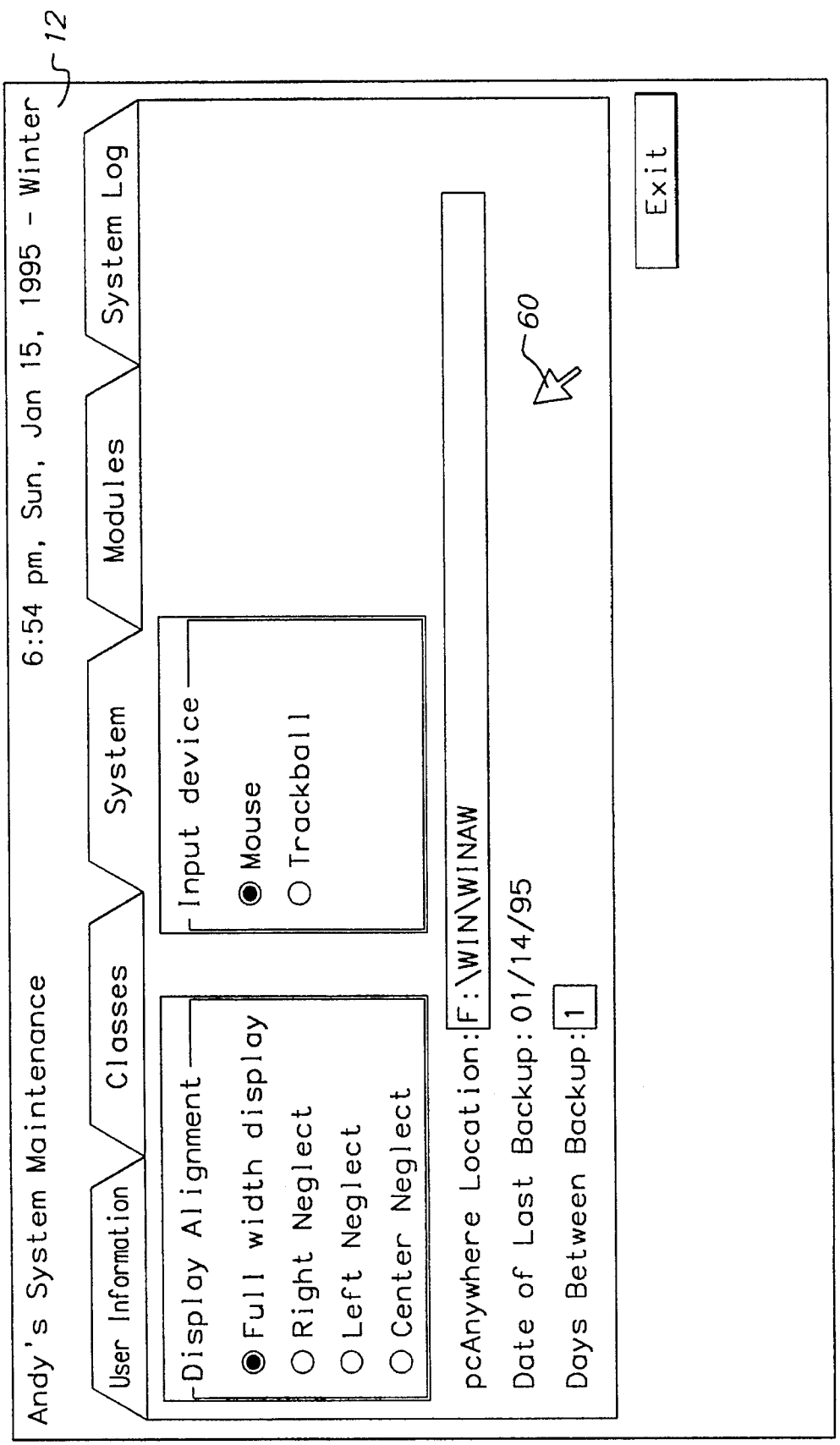
FIG. 27 is the System function of the Maintenance Menu.
Figure 28:
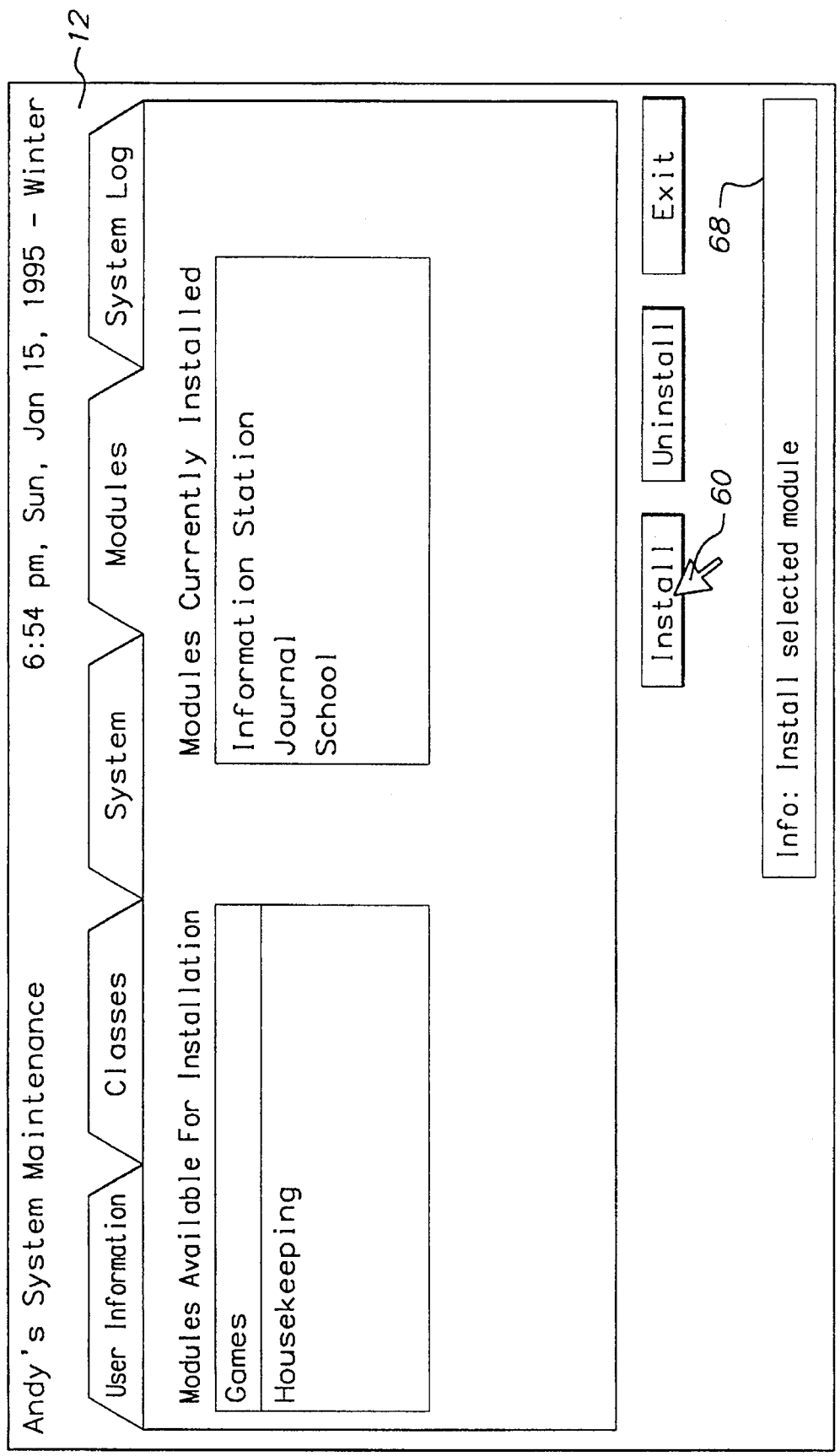
FIG. 28 is the Modules function of the Maintenance Menu.
Figure 30:
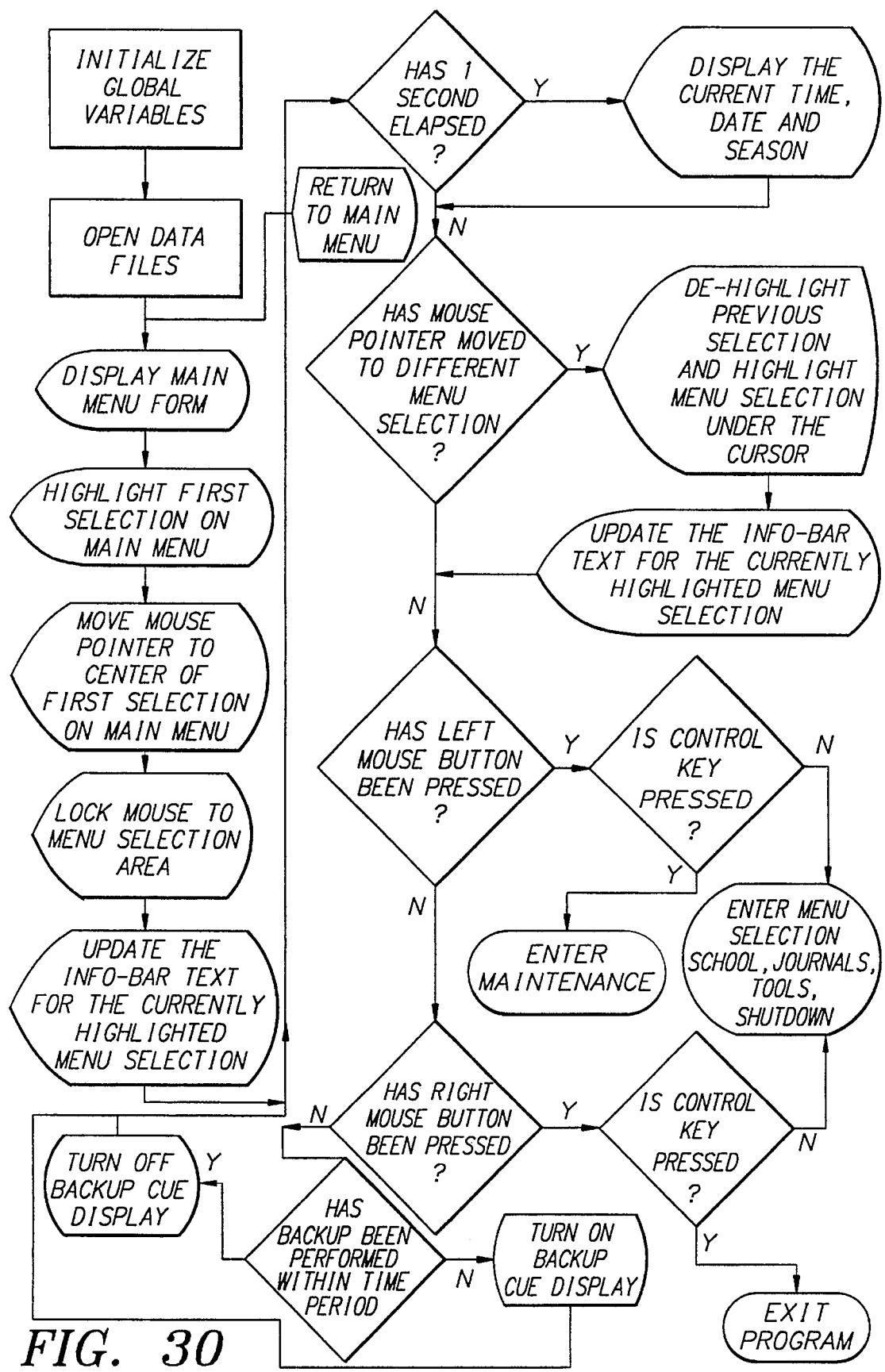
Figure 32:
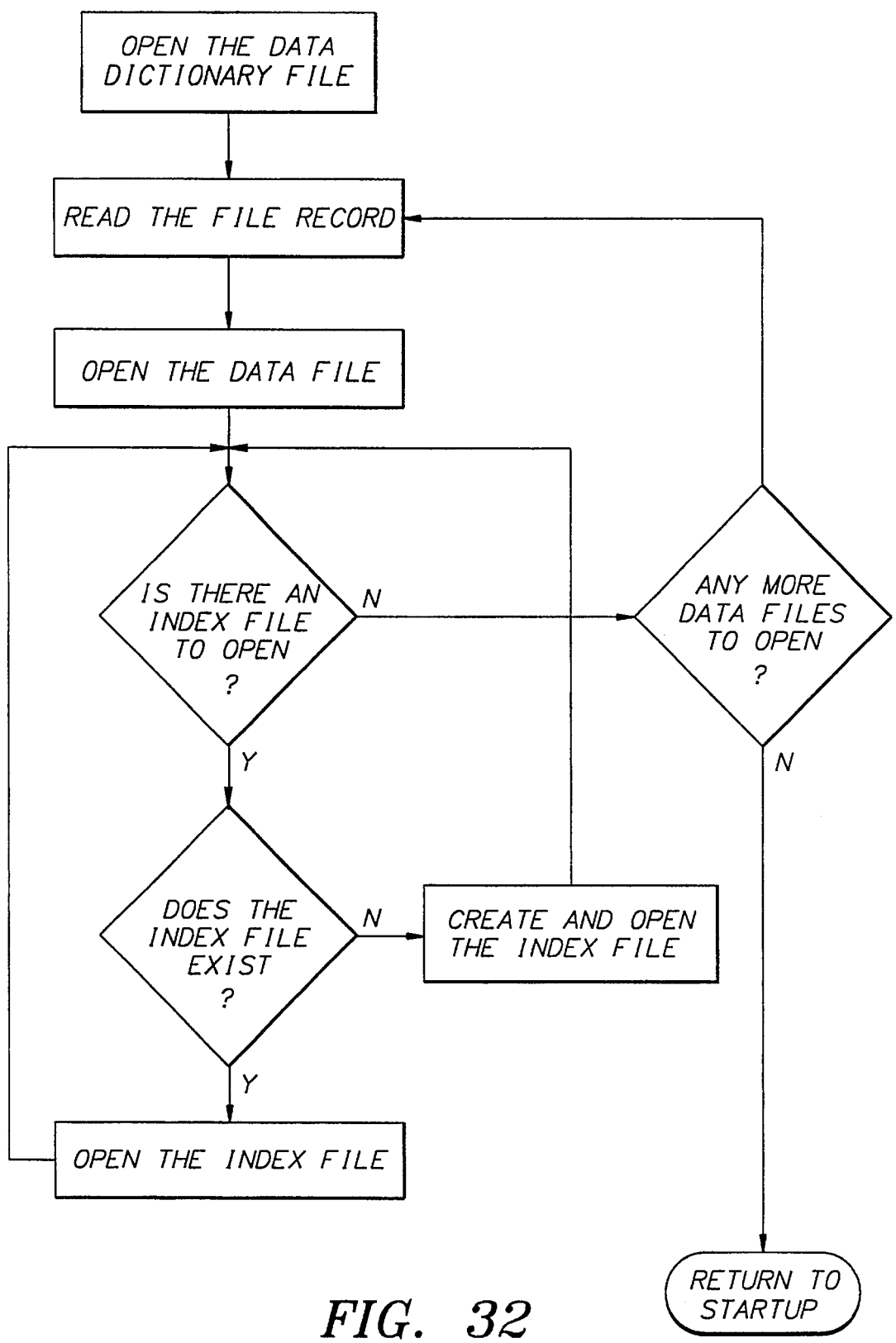
Figure 33:
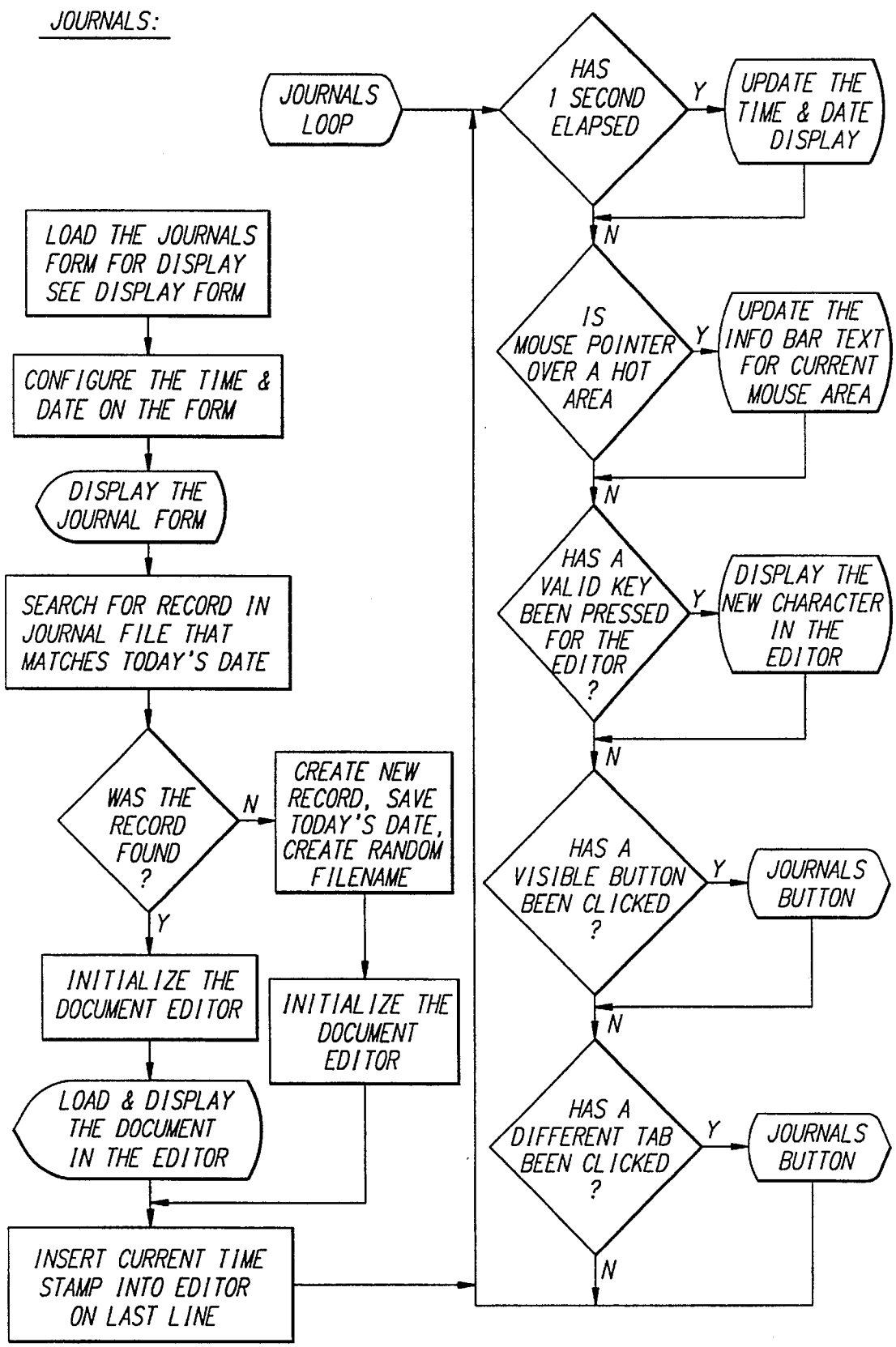
Figure 34:
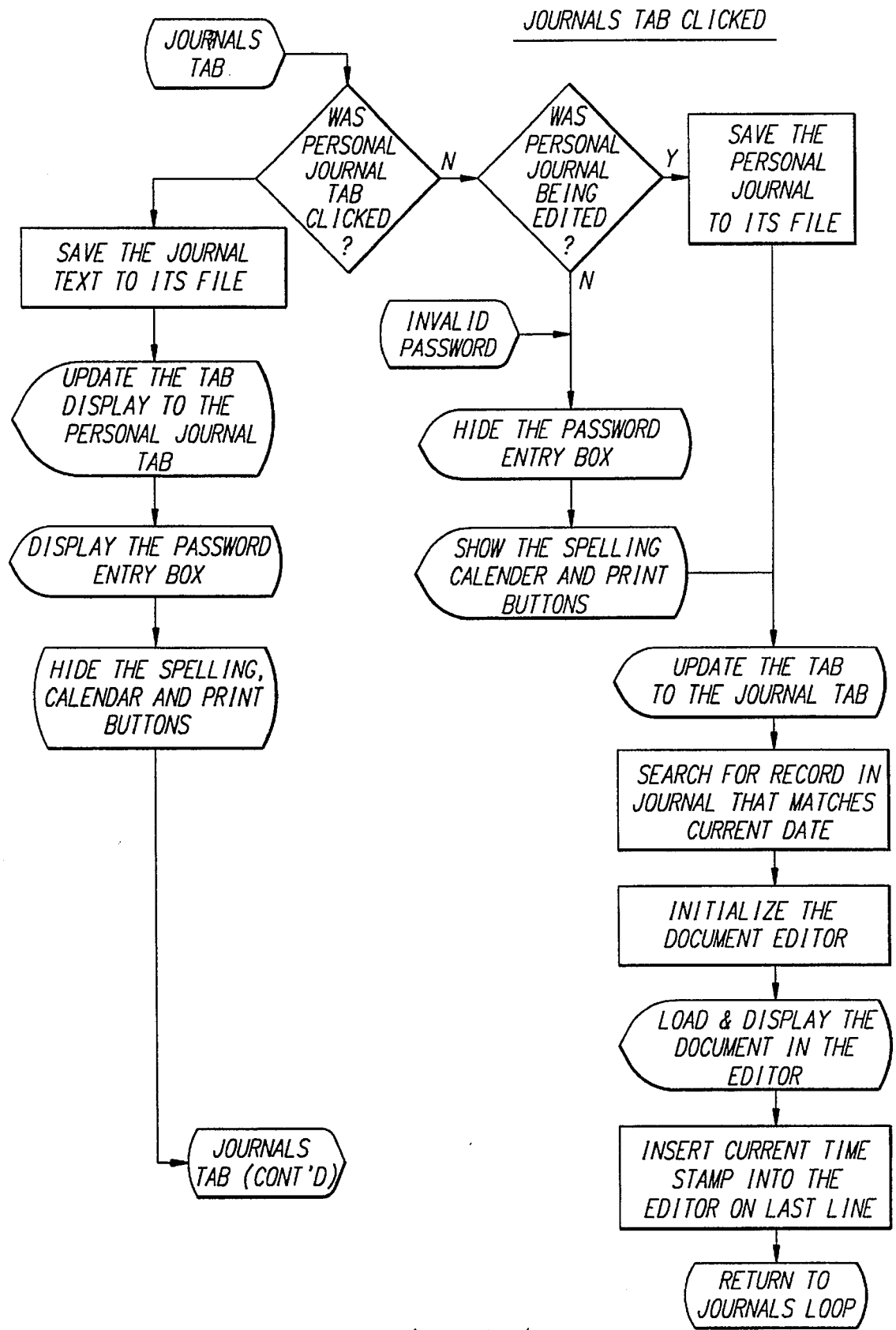
Figure 35:
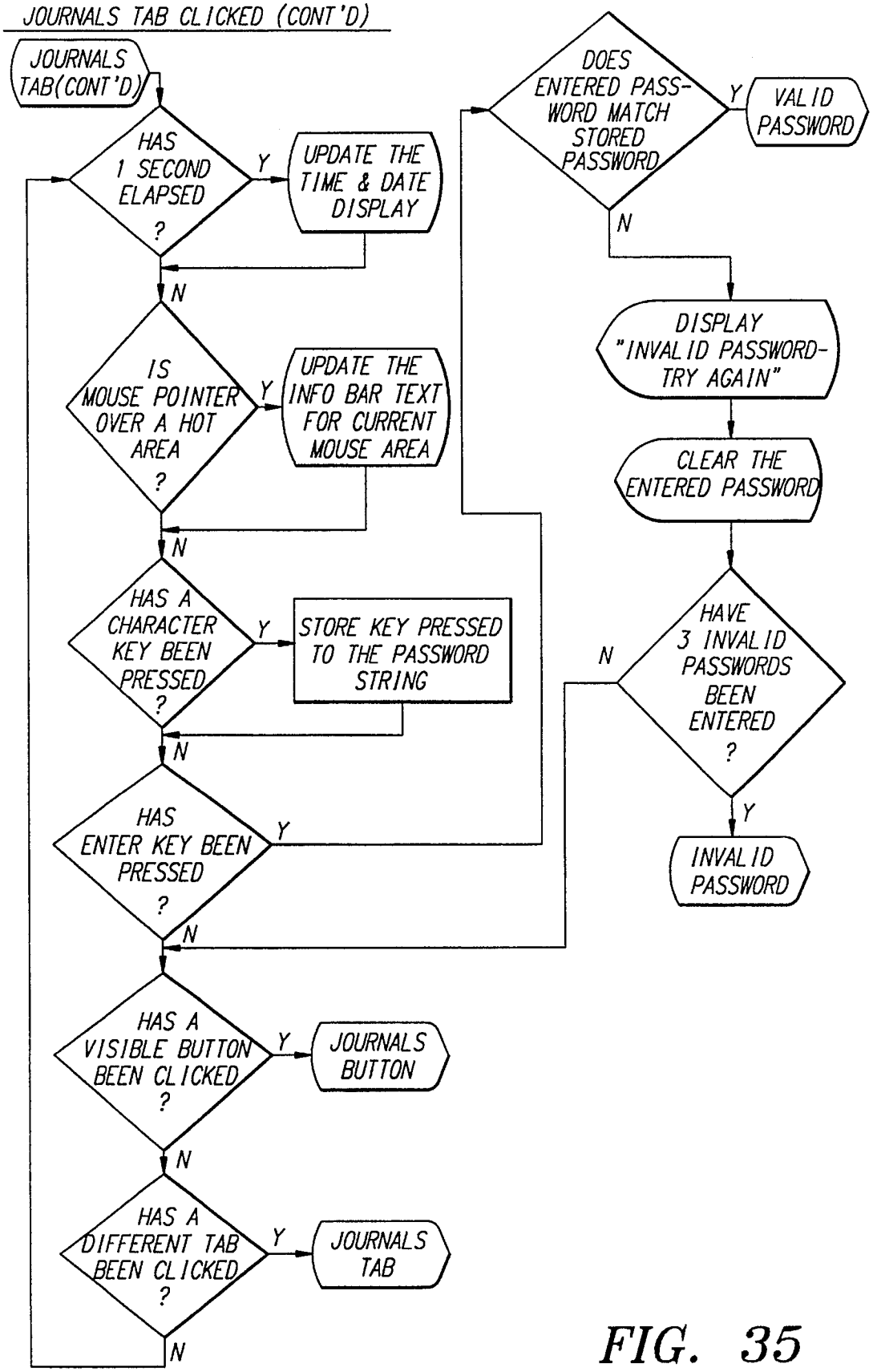
Figure 36:
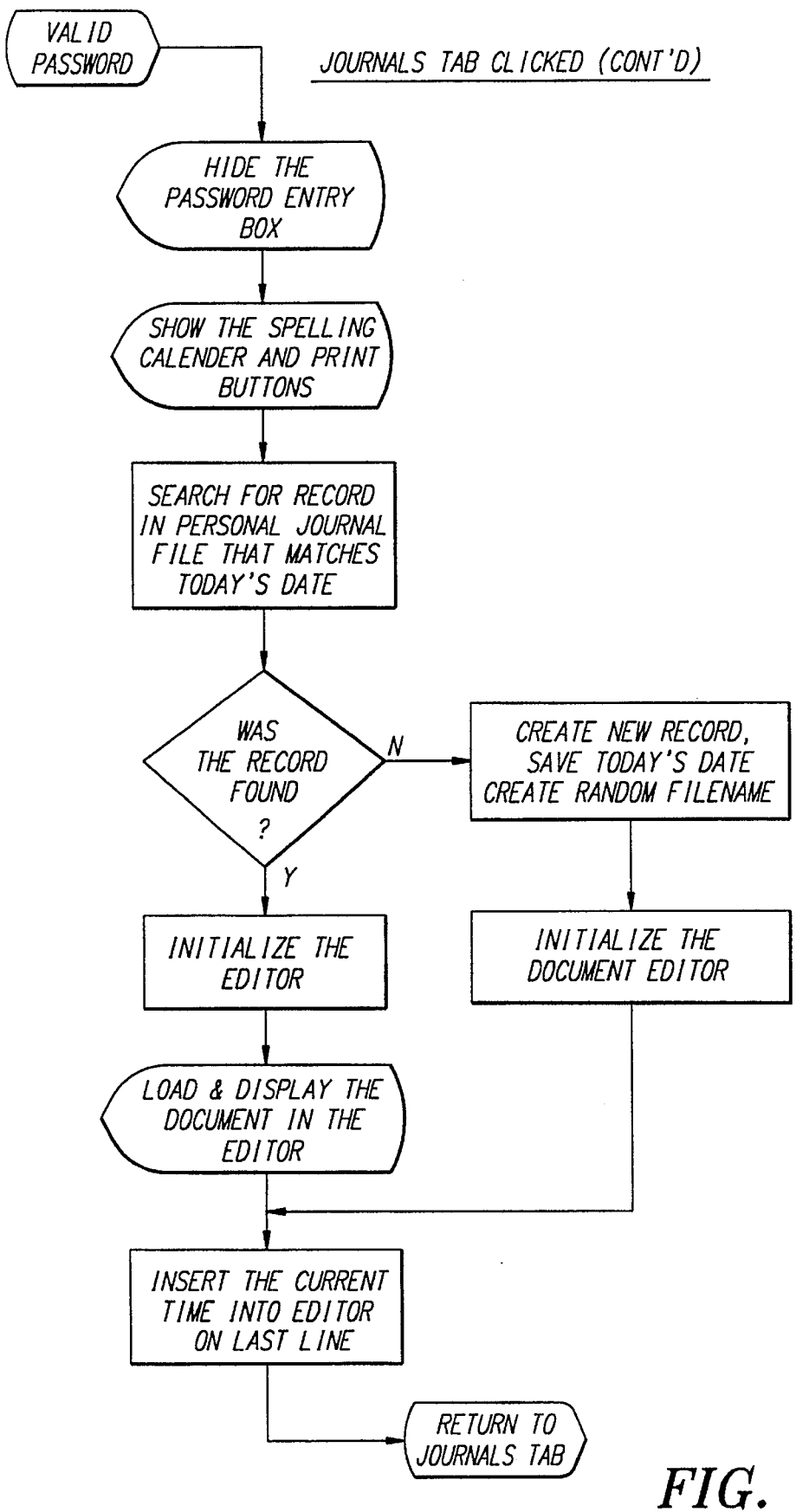
Figure 37:
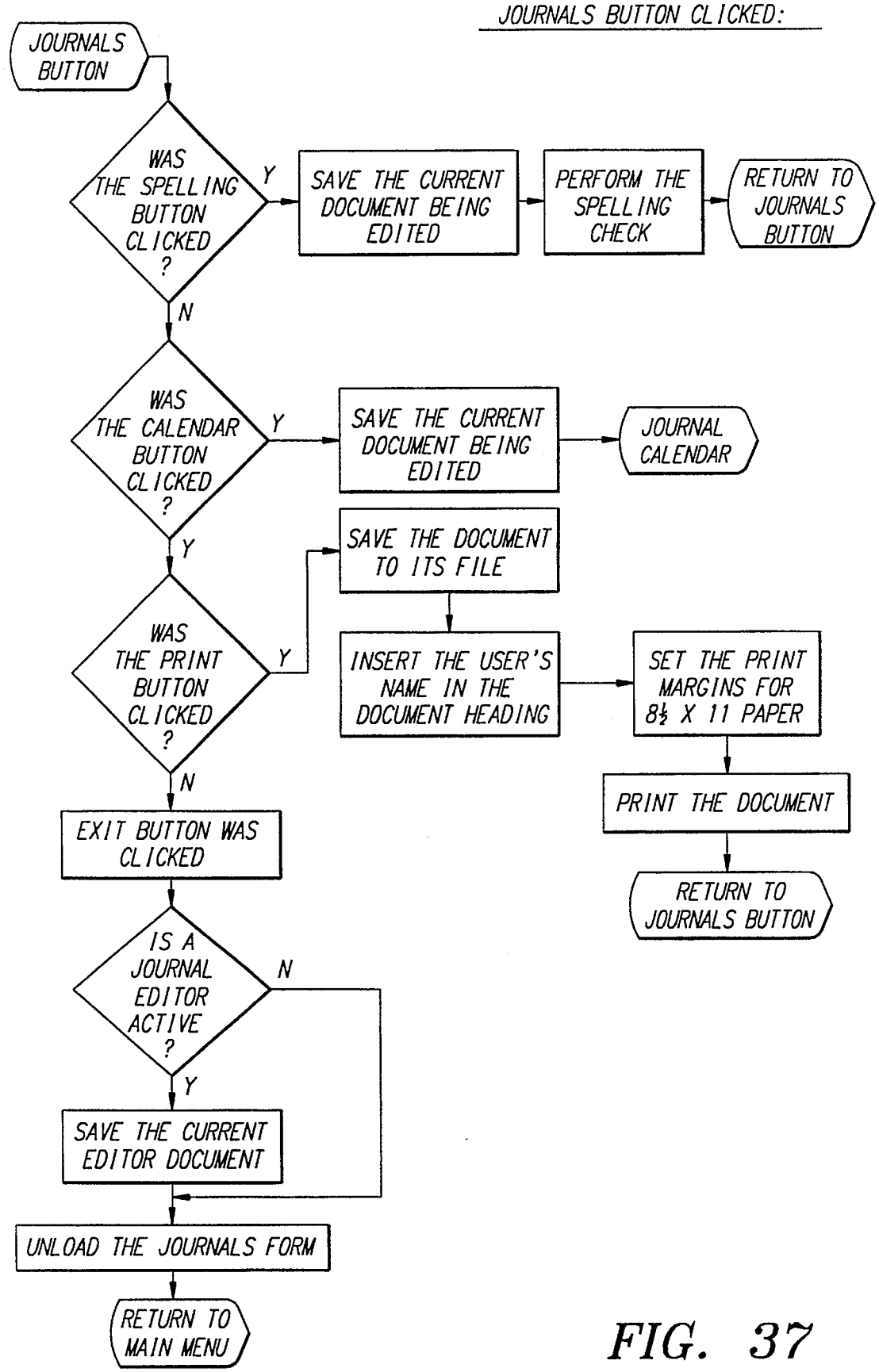
Figure 38:
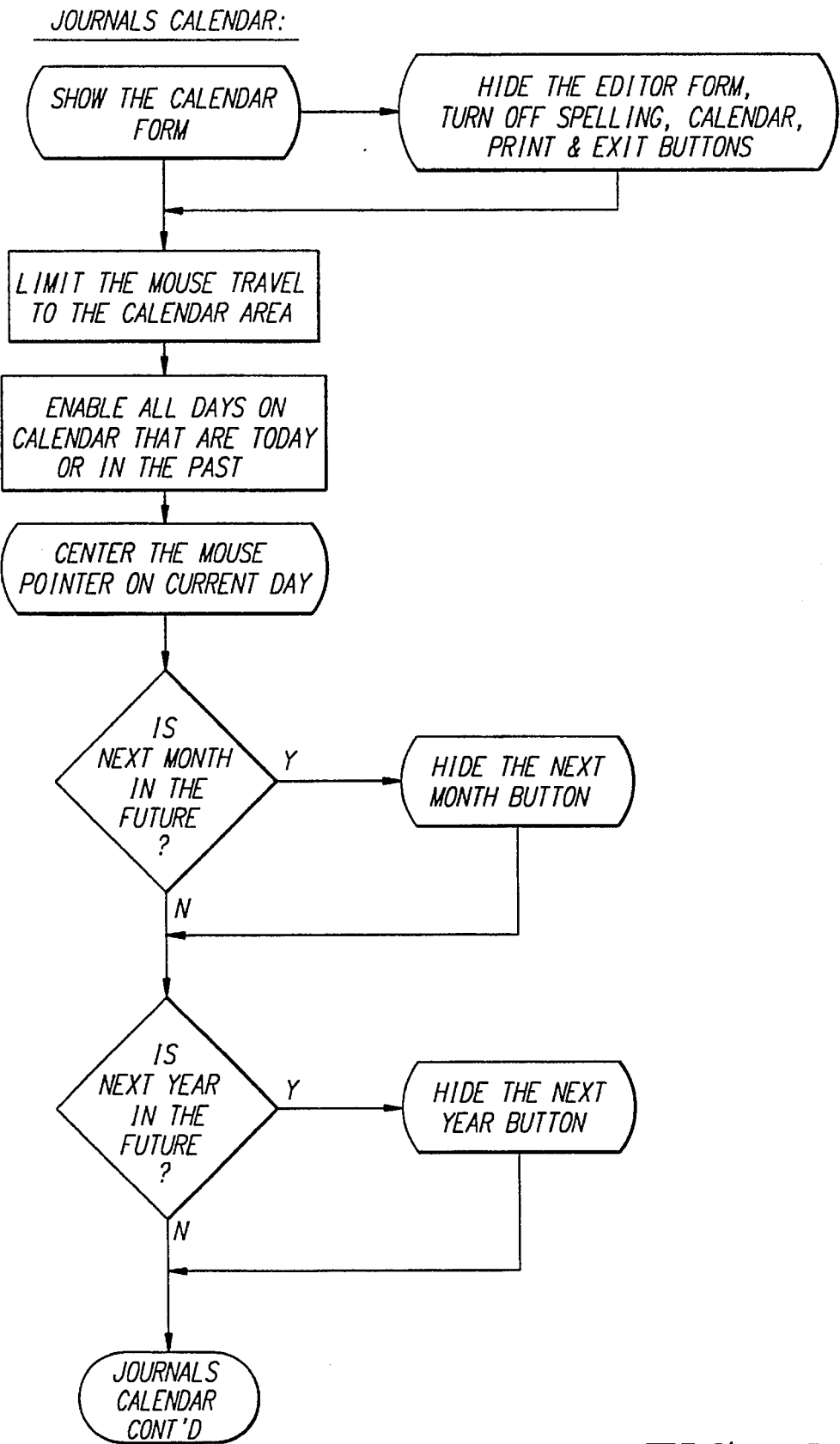
Figure 39:
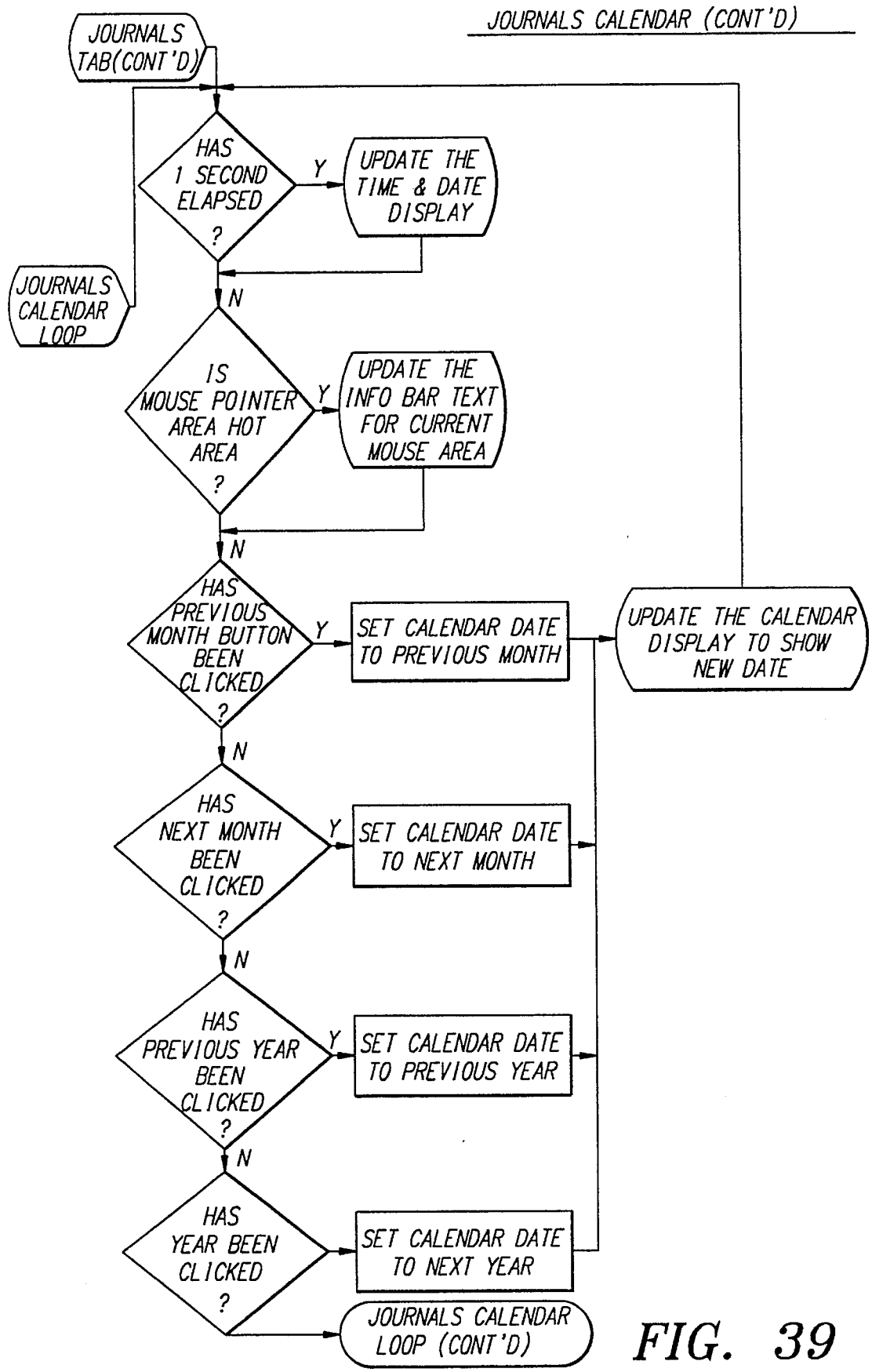
Figure 40:
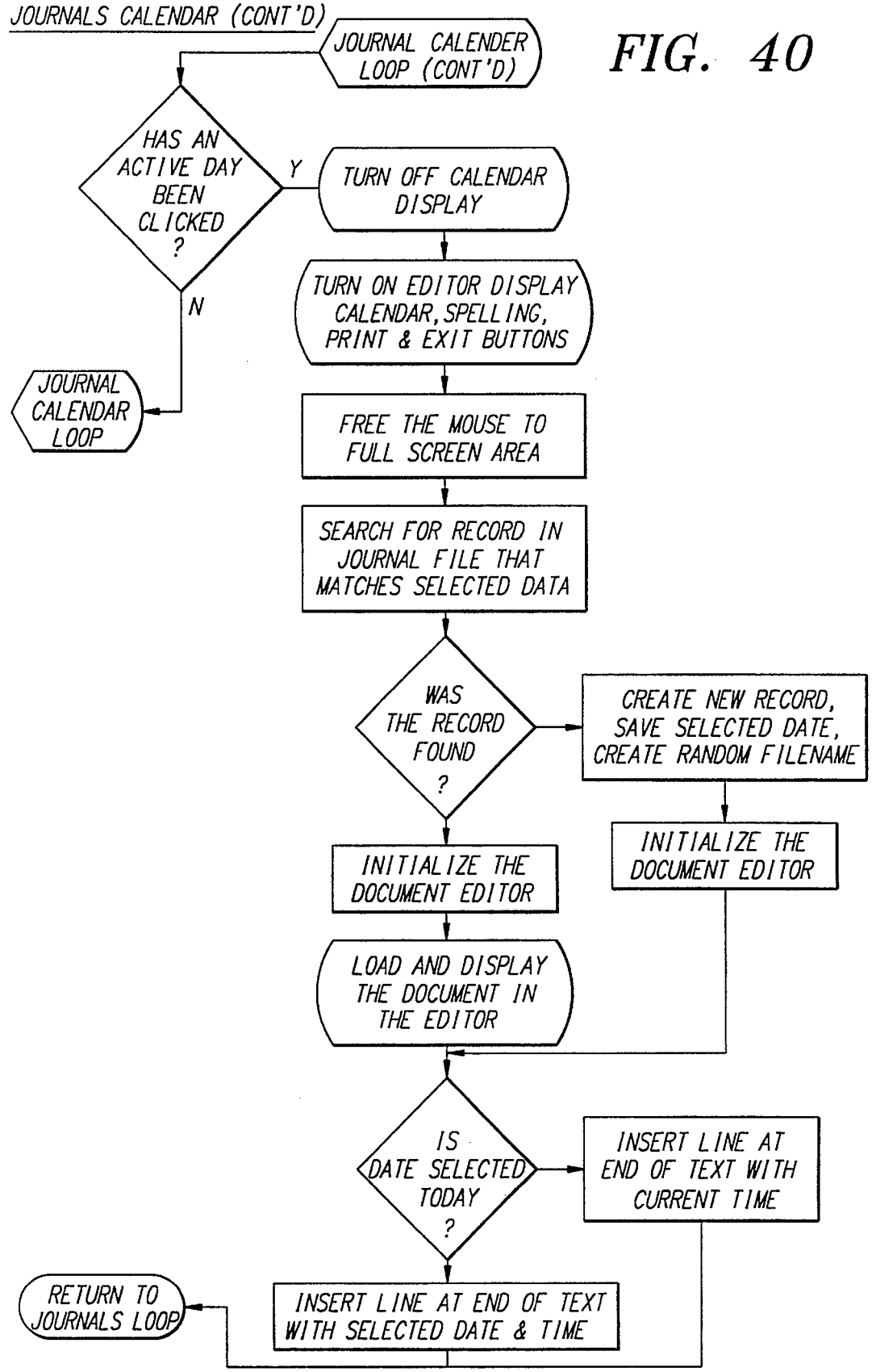
Figure 41:
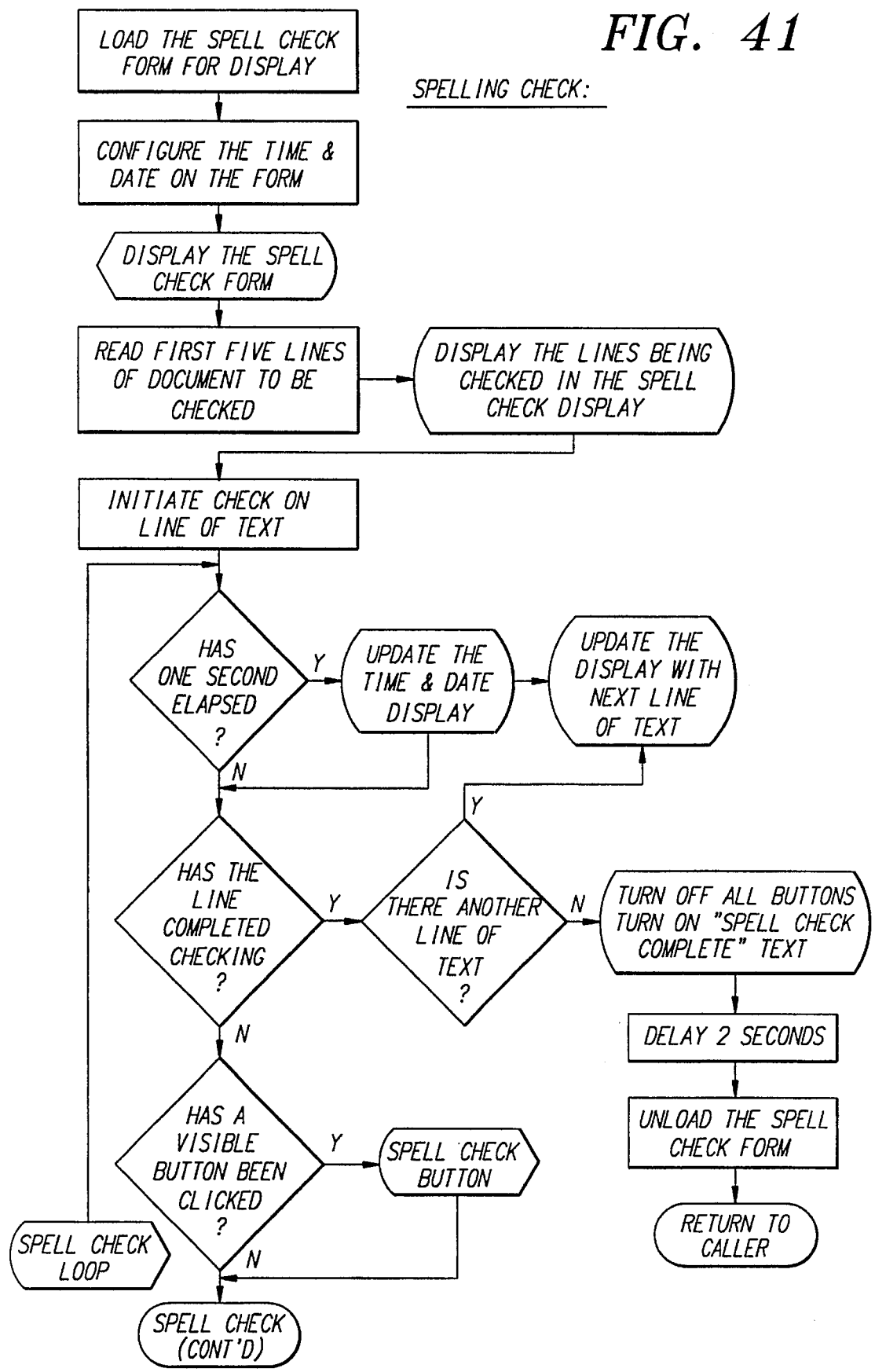
Figure 42:
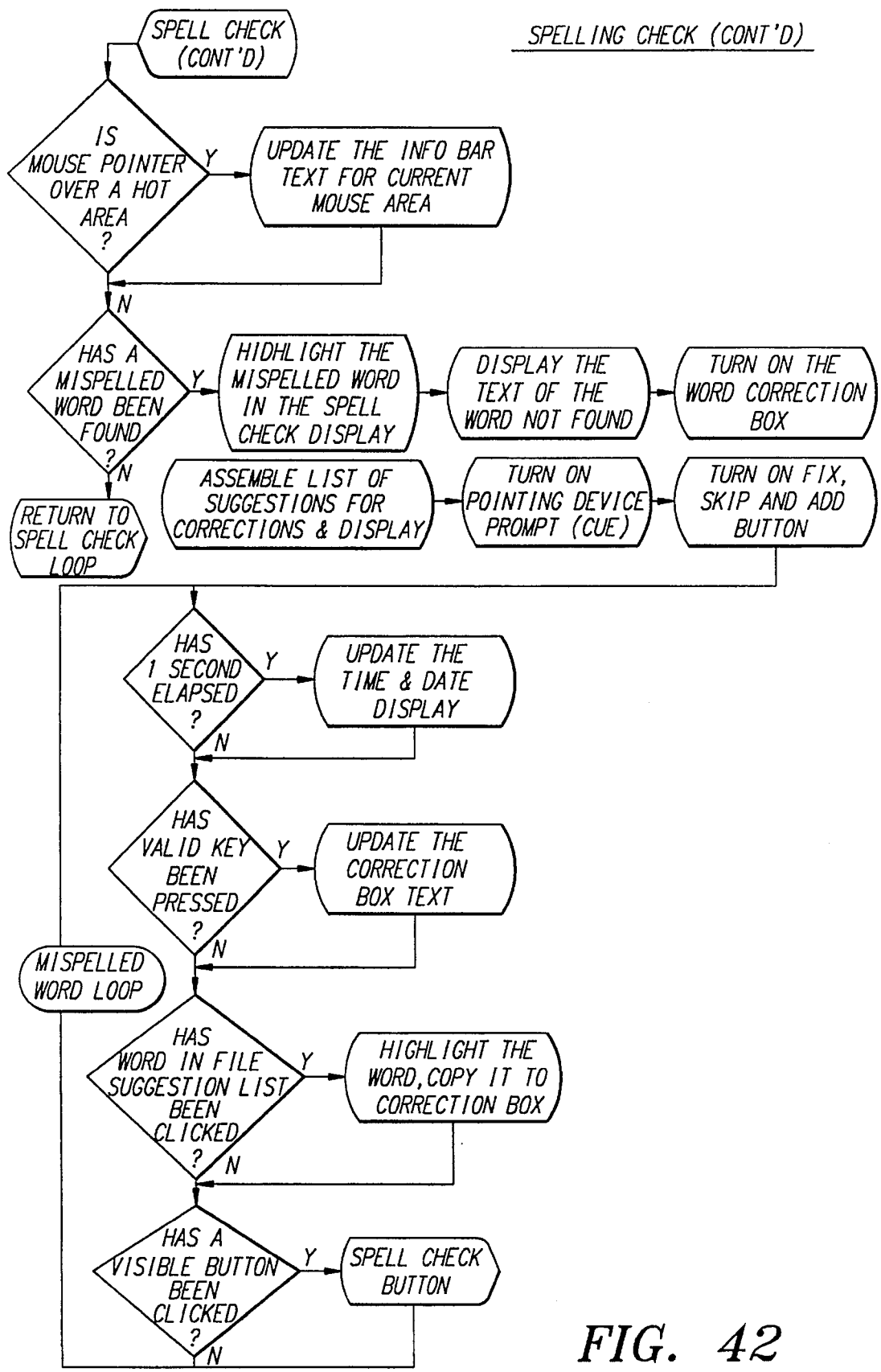
Figure 43:
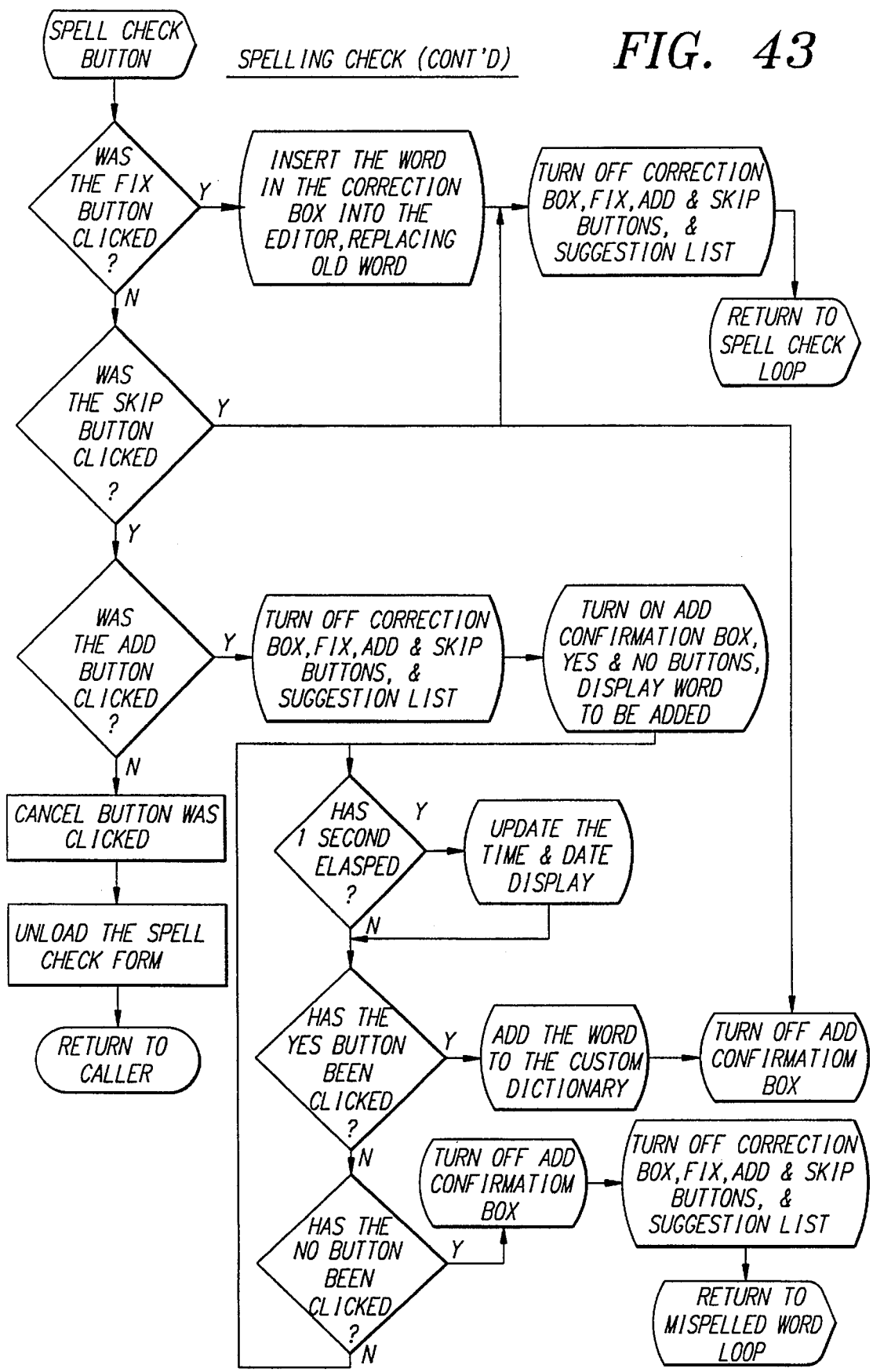
Figure 44:
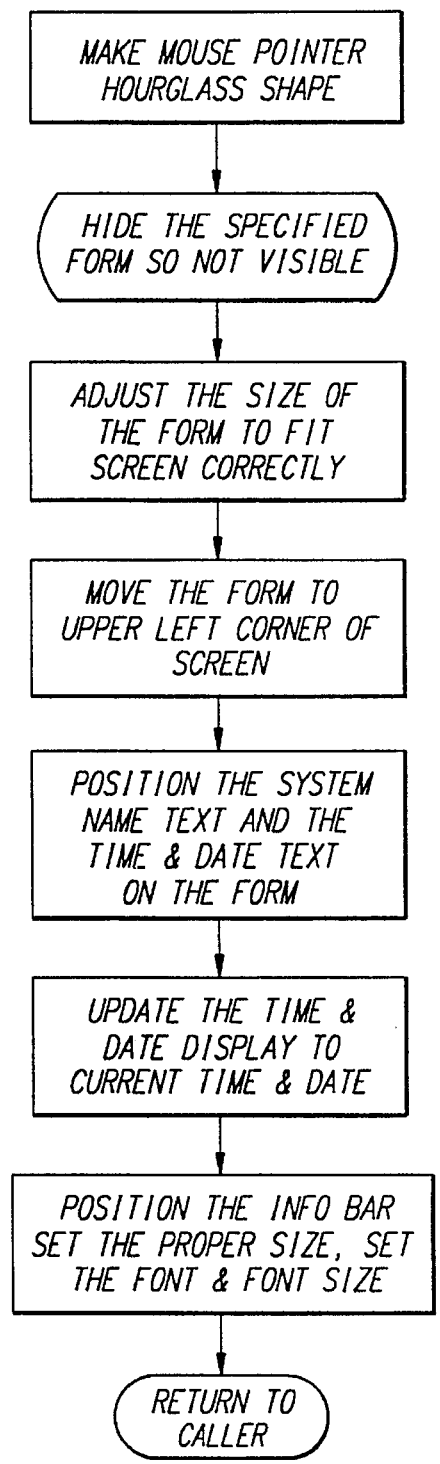
Figure 45:
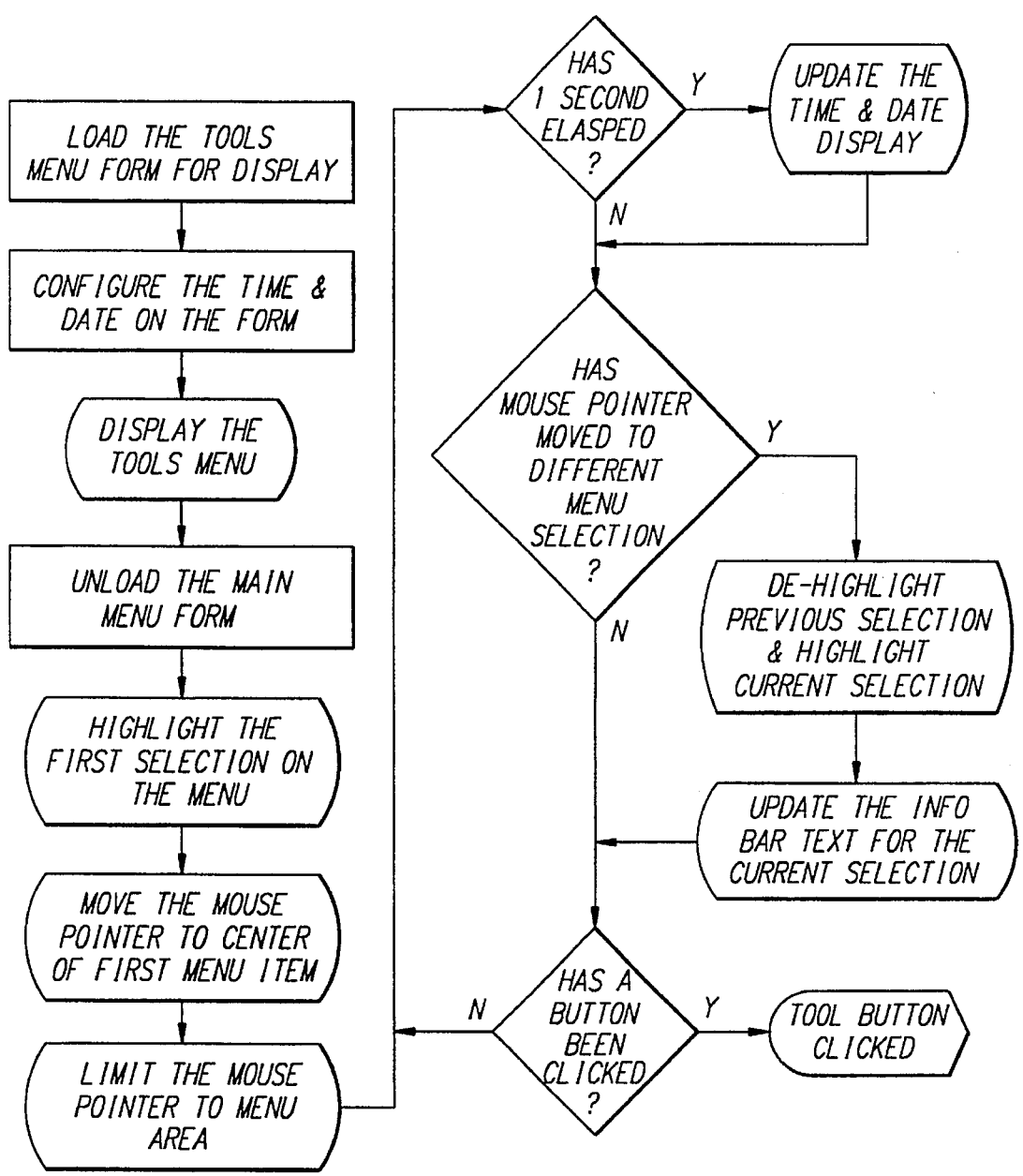
Figure 46:
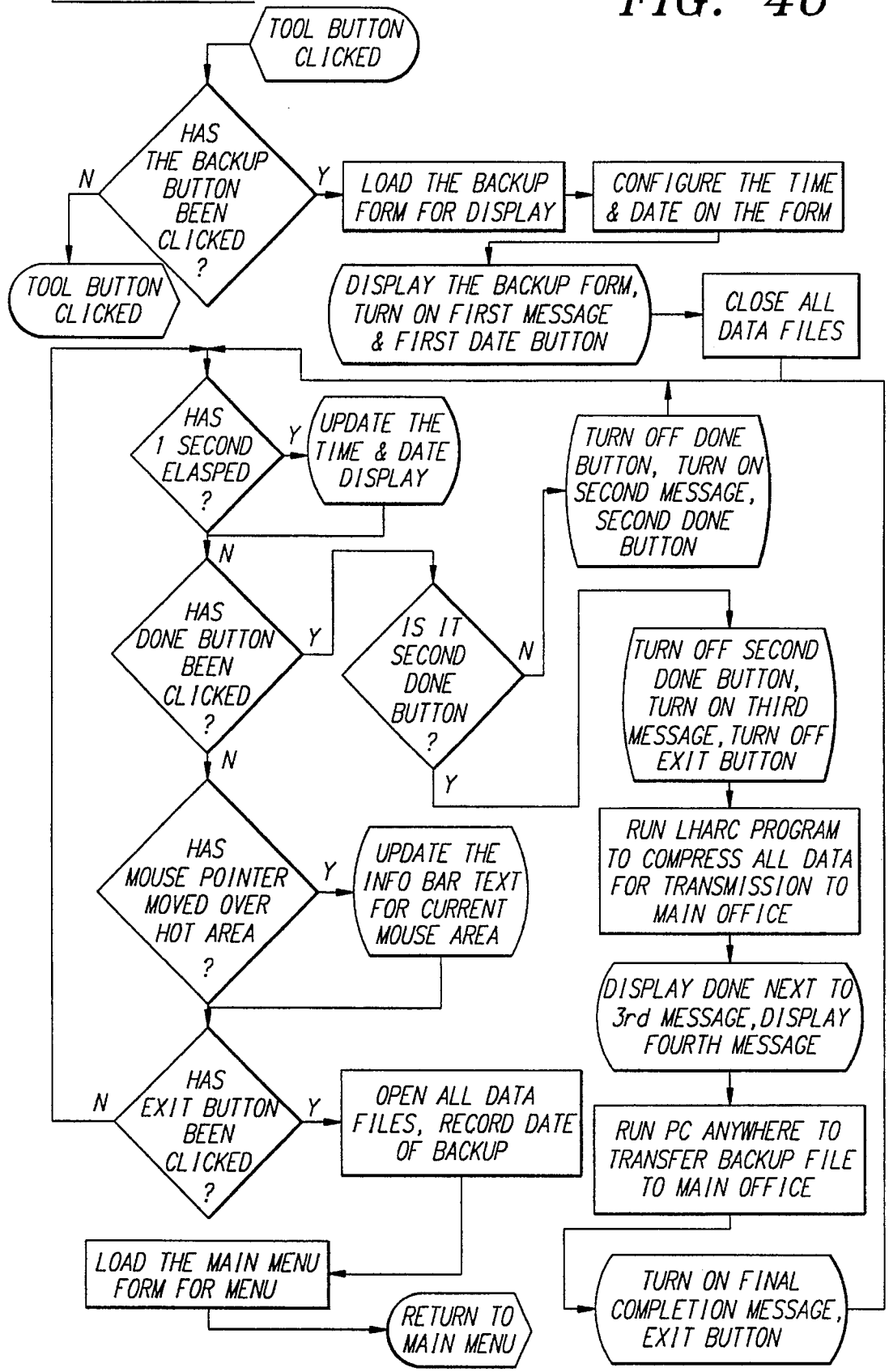
Figure 47:
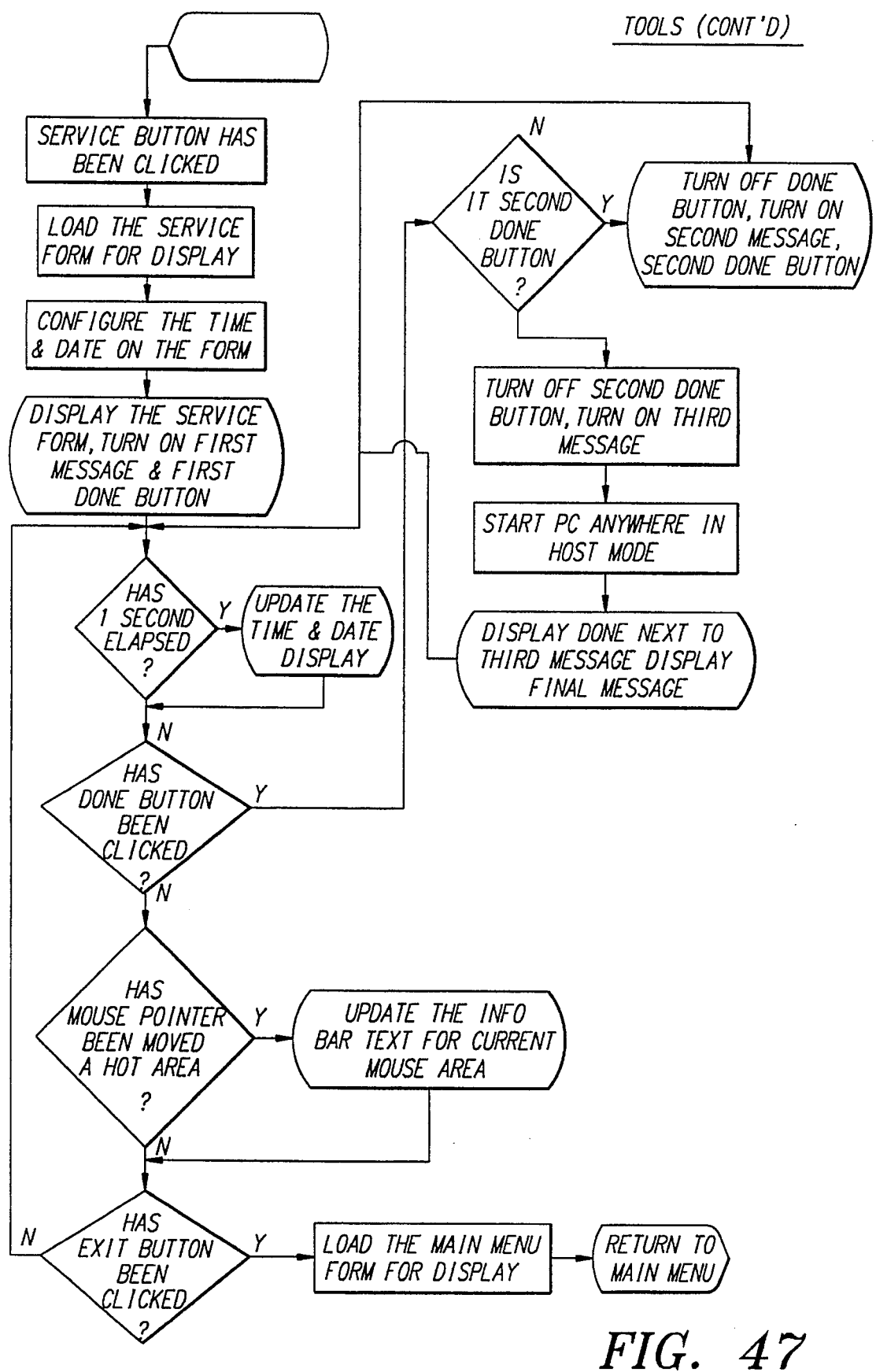
Figure 48:
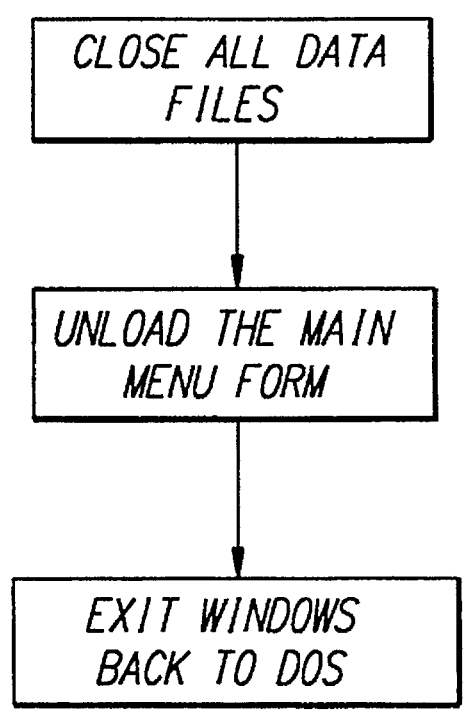
Figure 49:
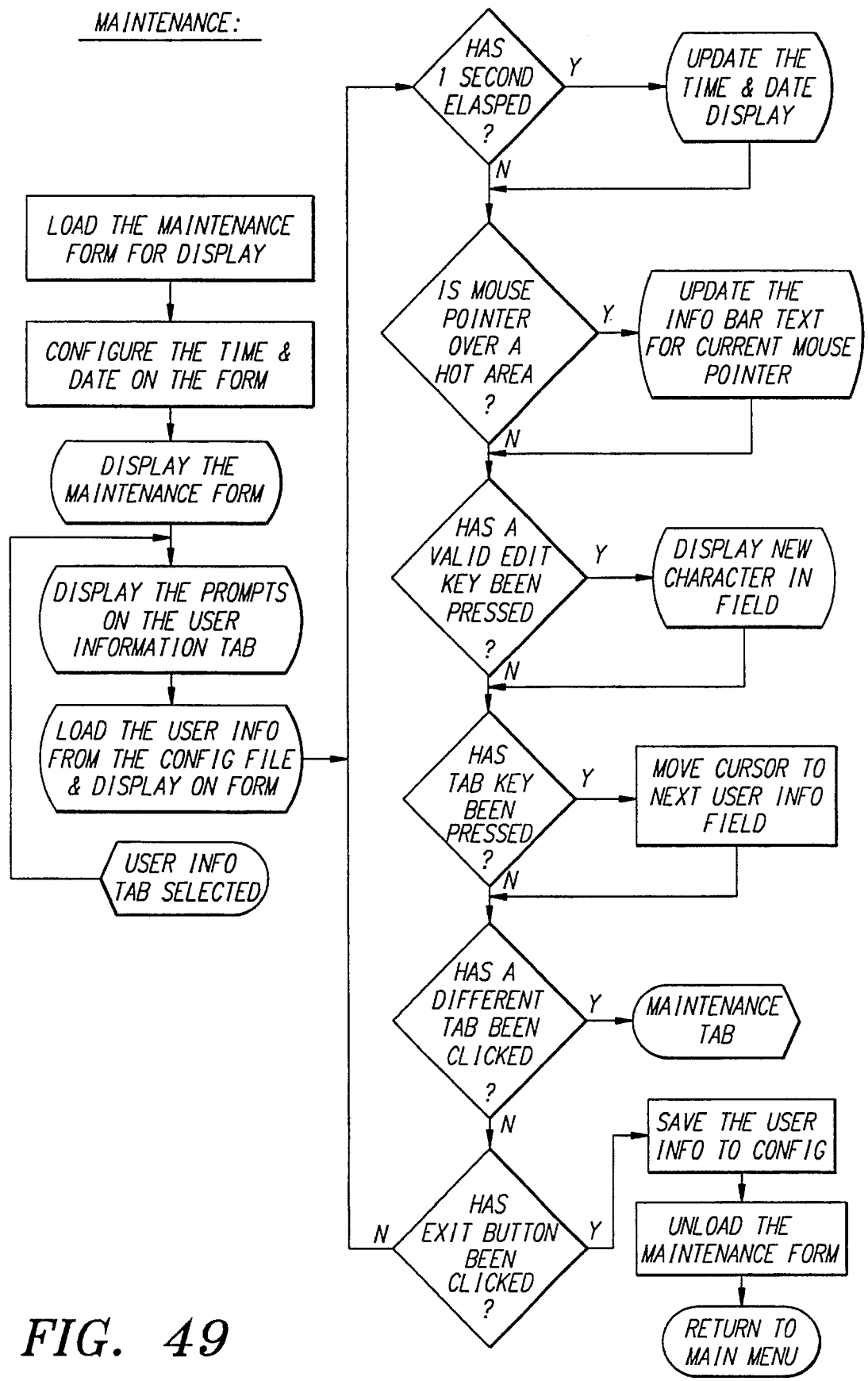
Figure 50:
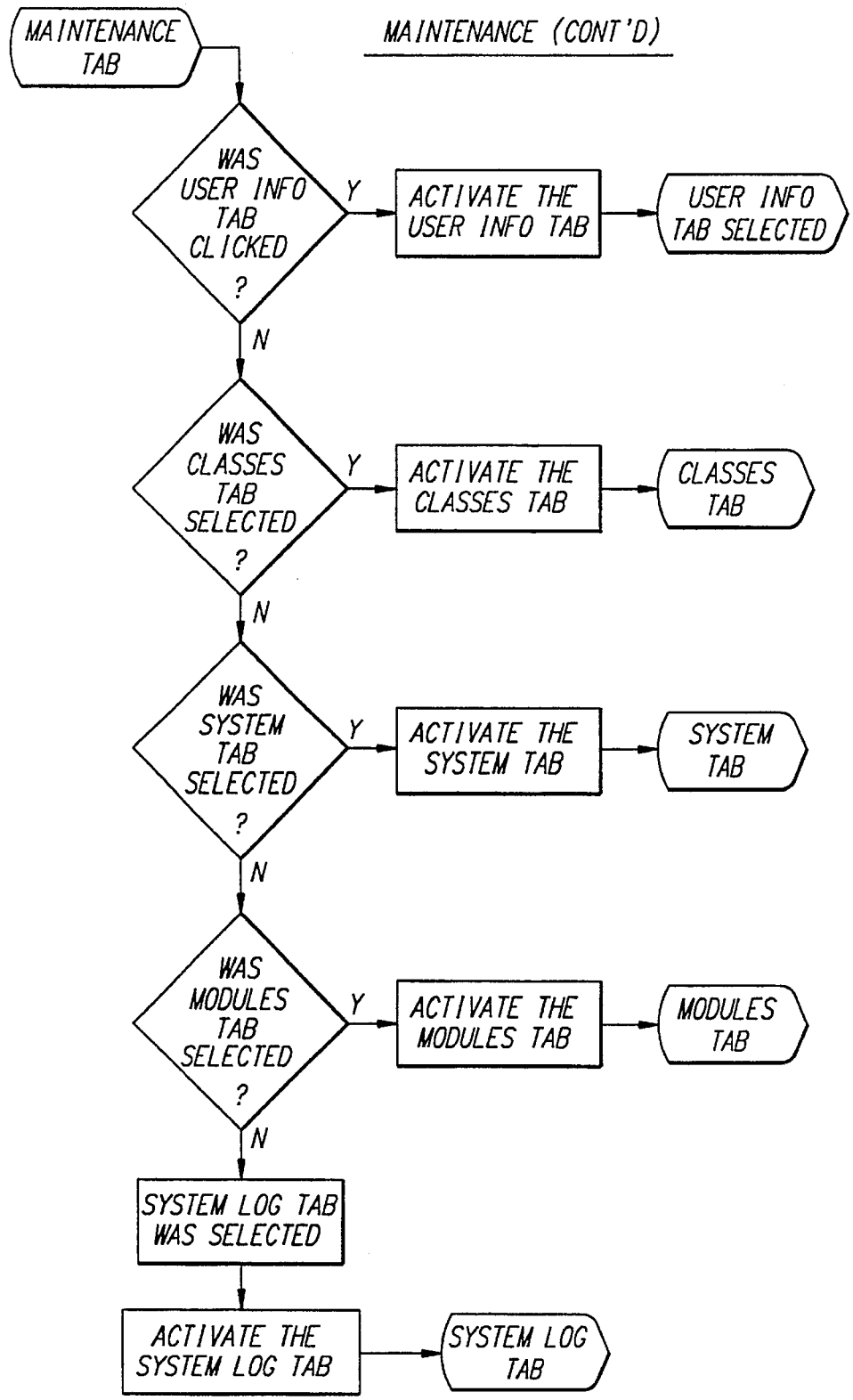
Figure 51:
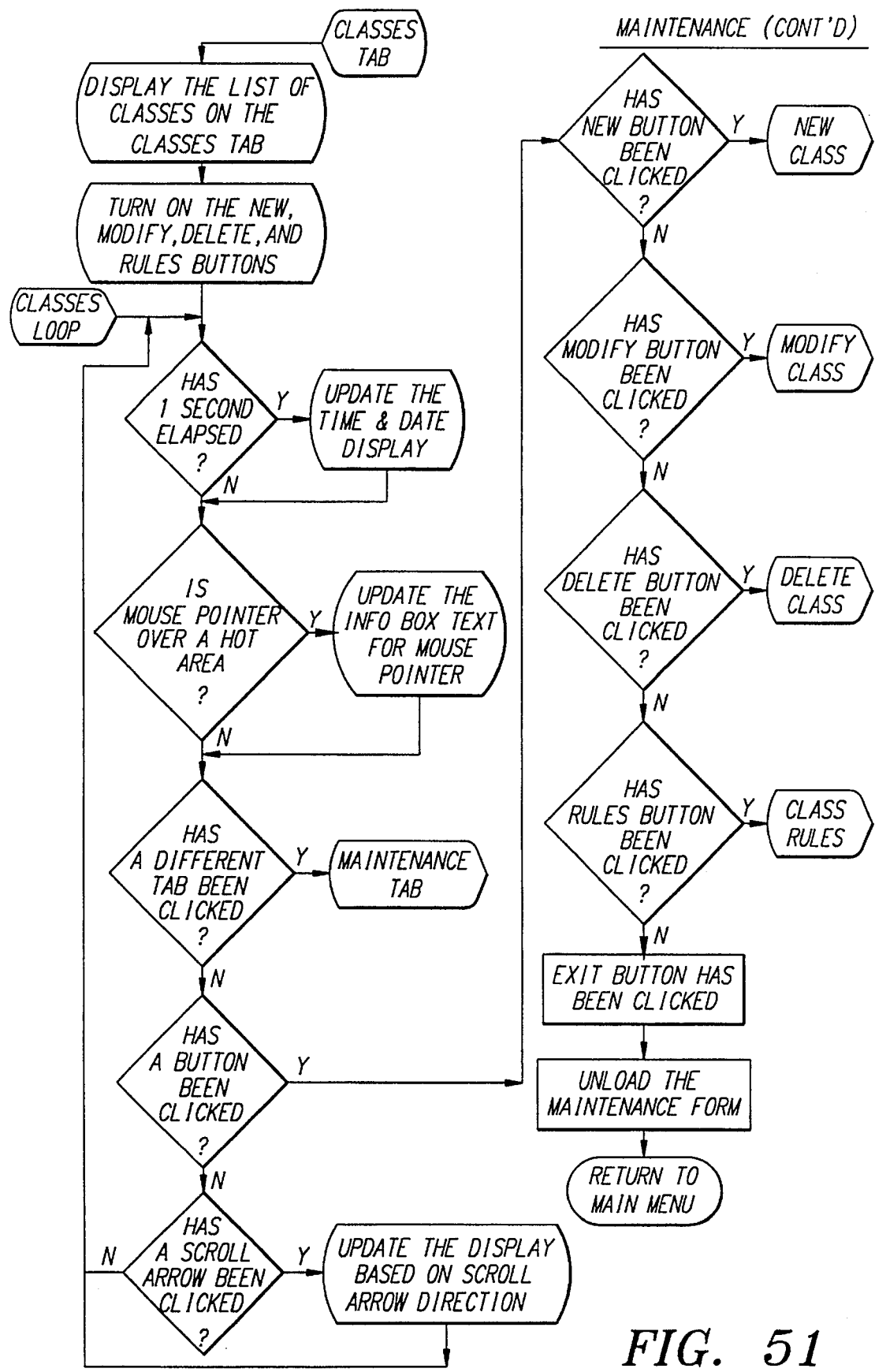
Figure 52:
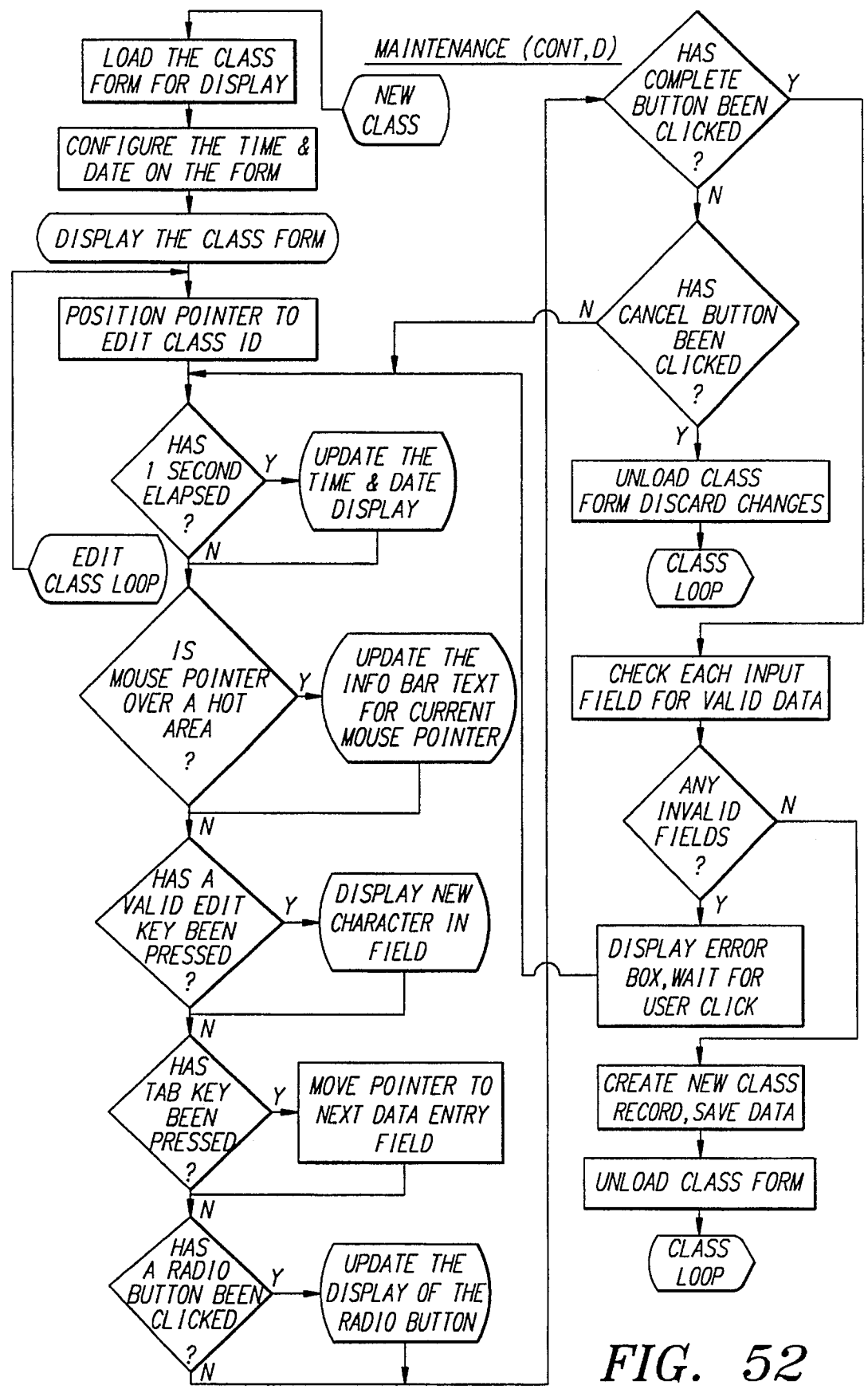
Figure 53:
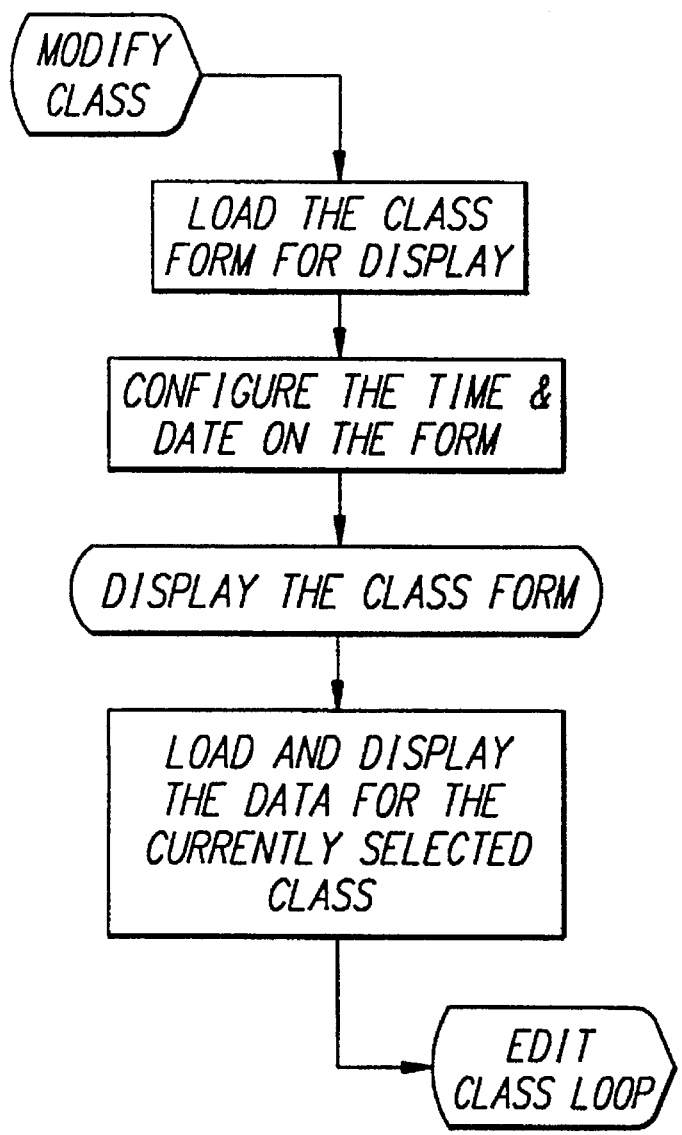
Figure 54:
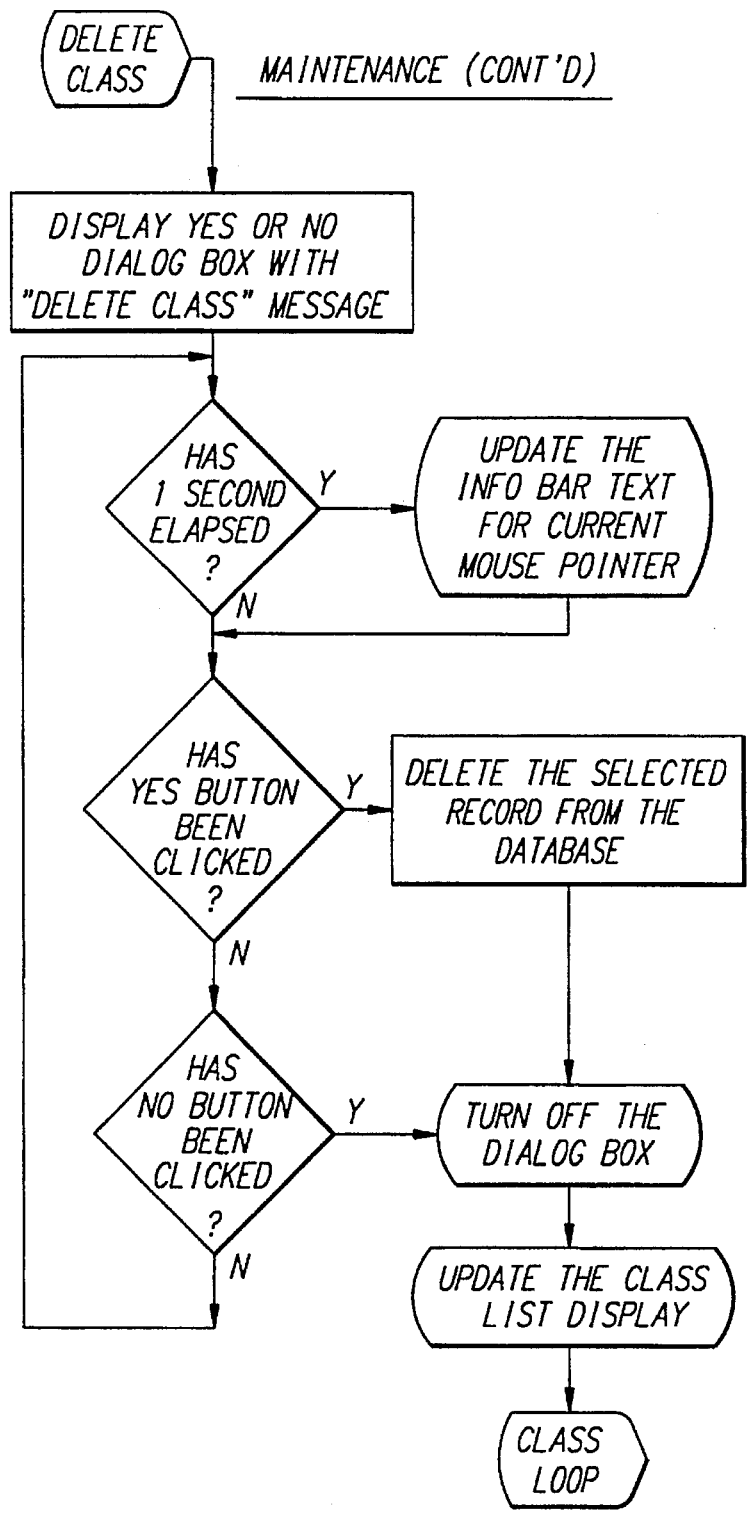
Figure 55:
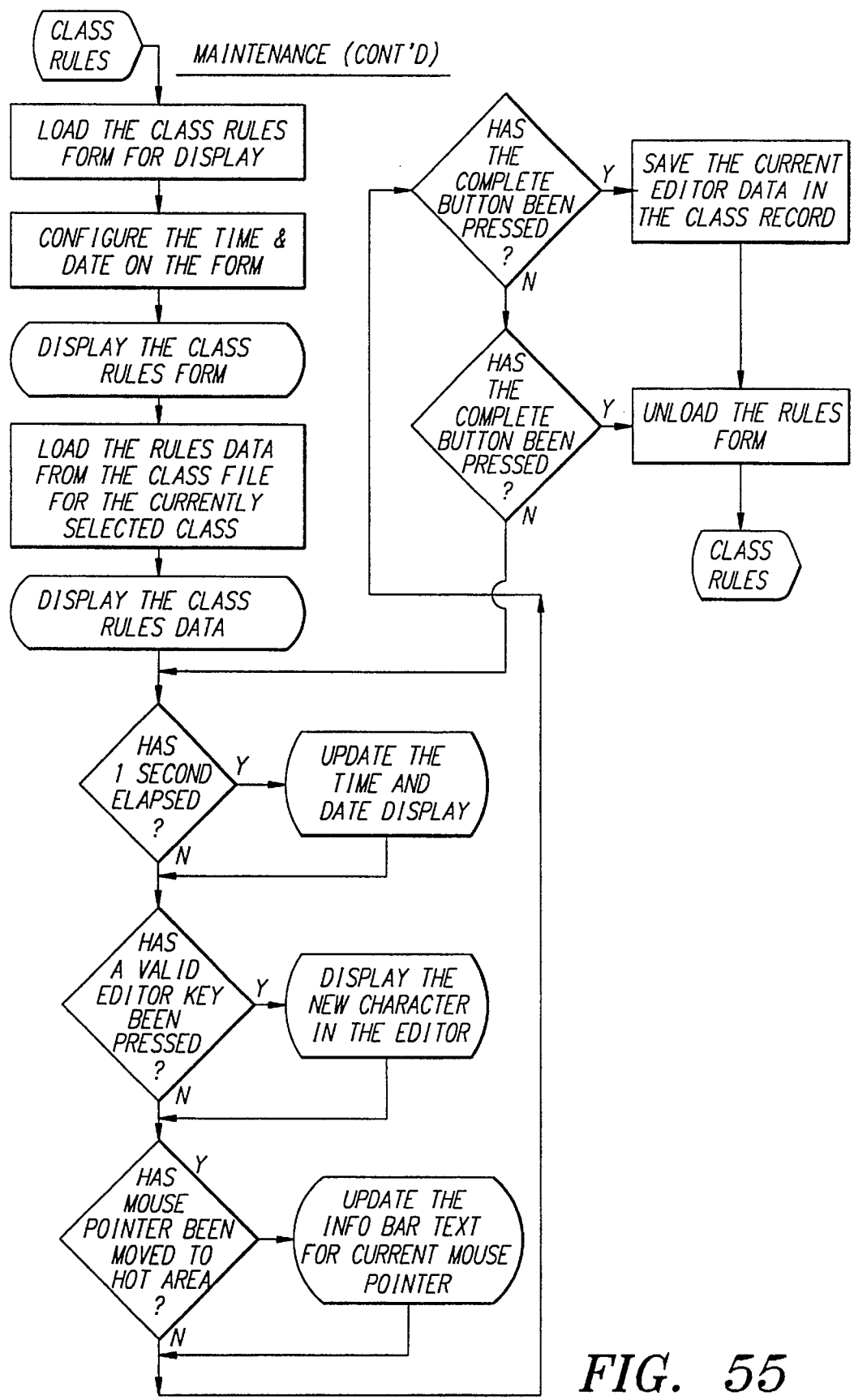
Figure 56:
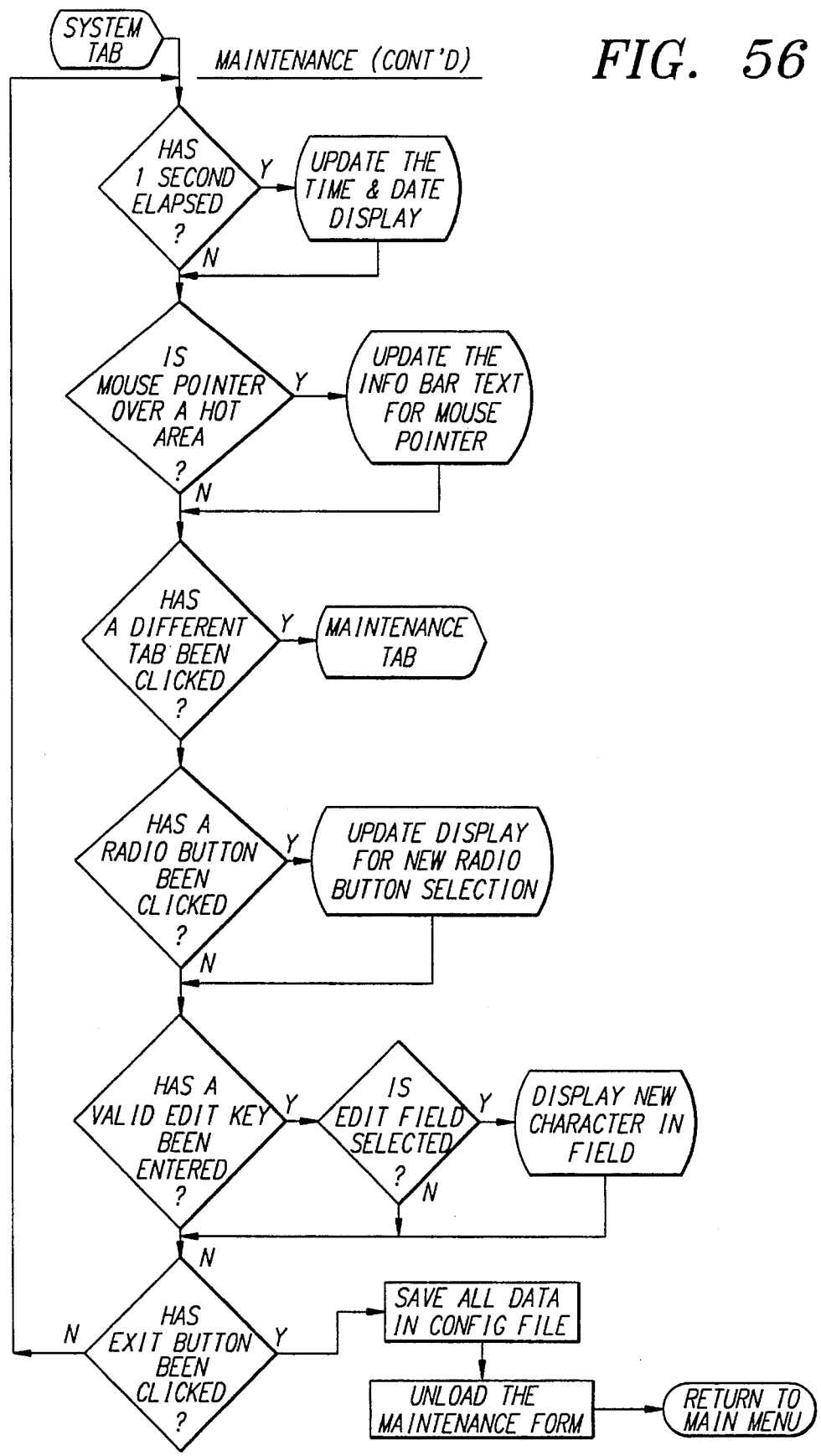
Figure 57:
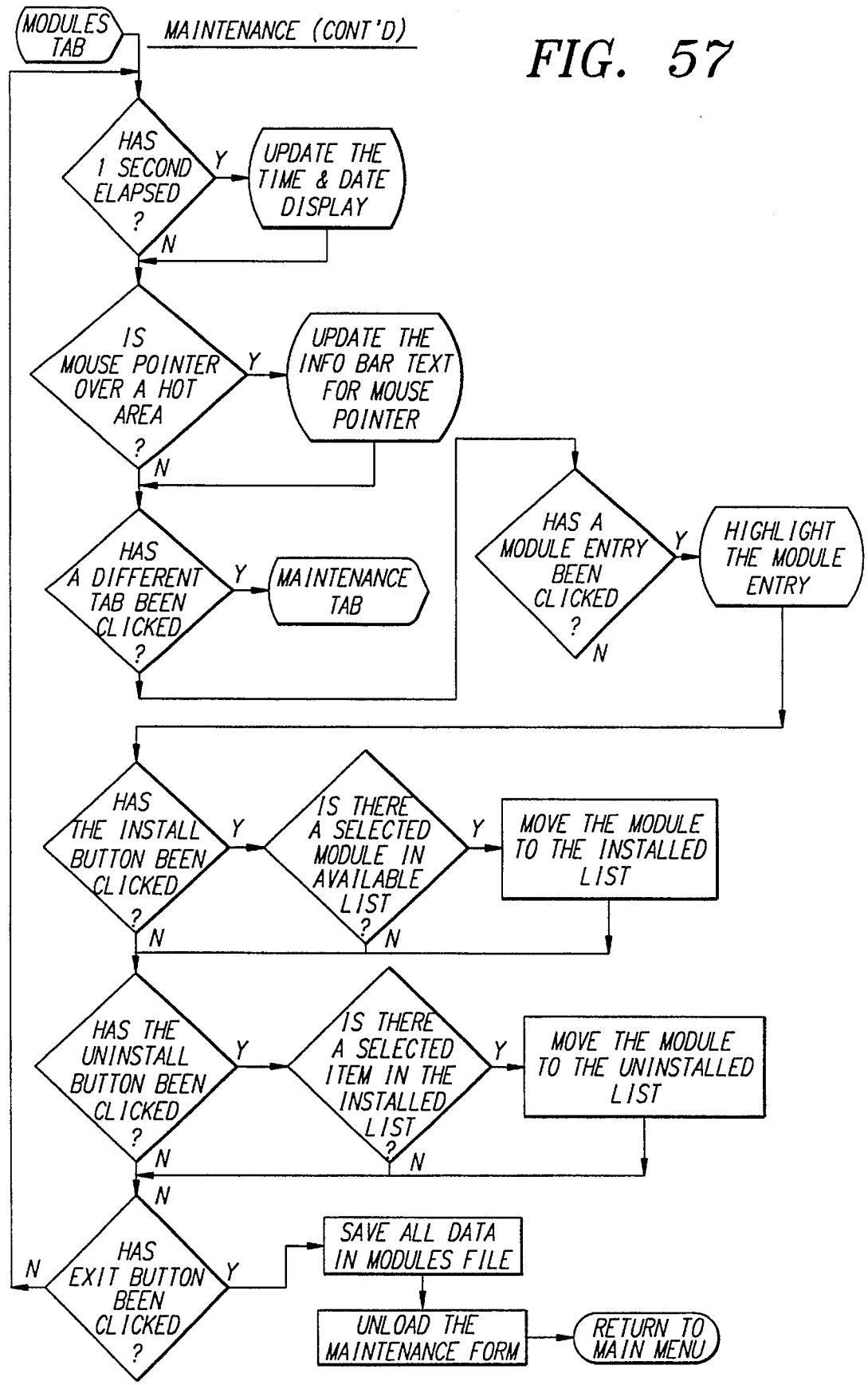
Figure 58:
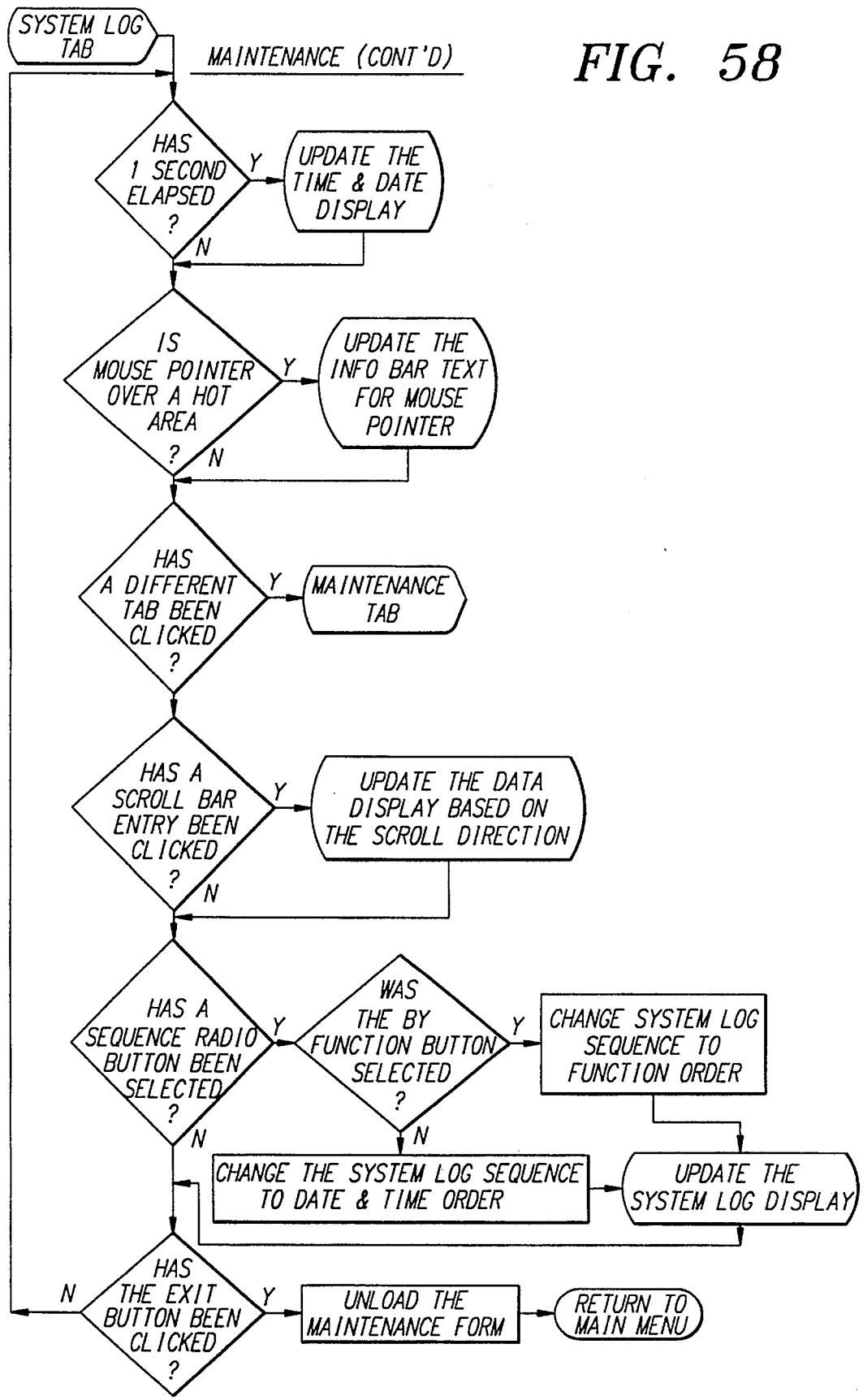
Figure 59:
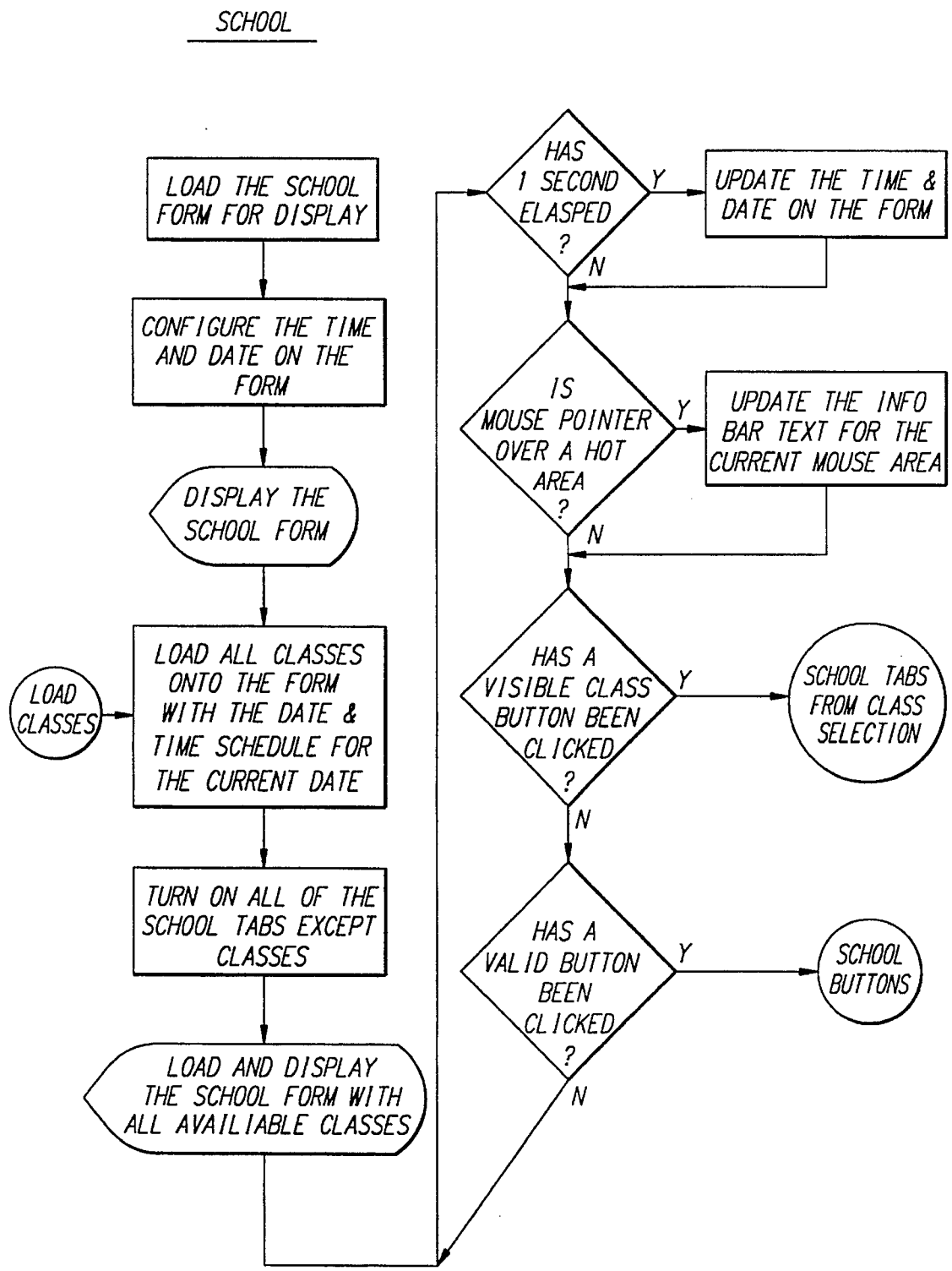
Figure 60:
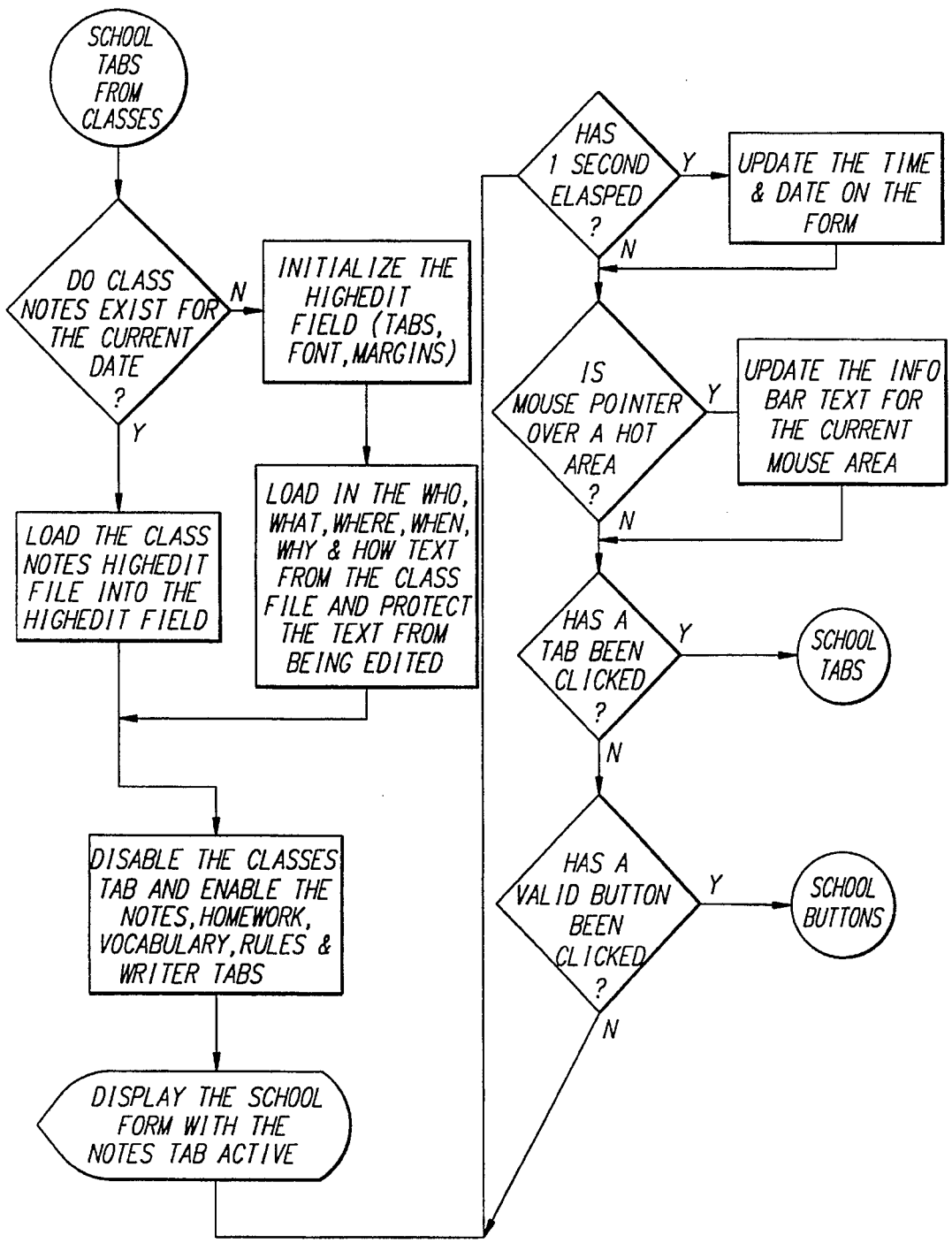
Figure 61:
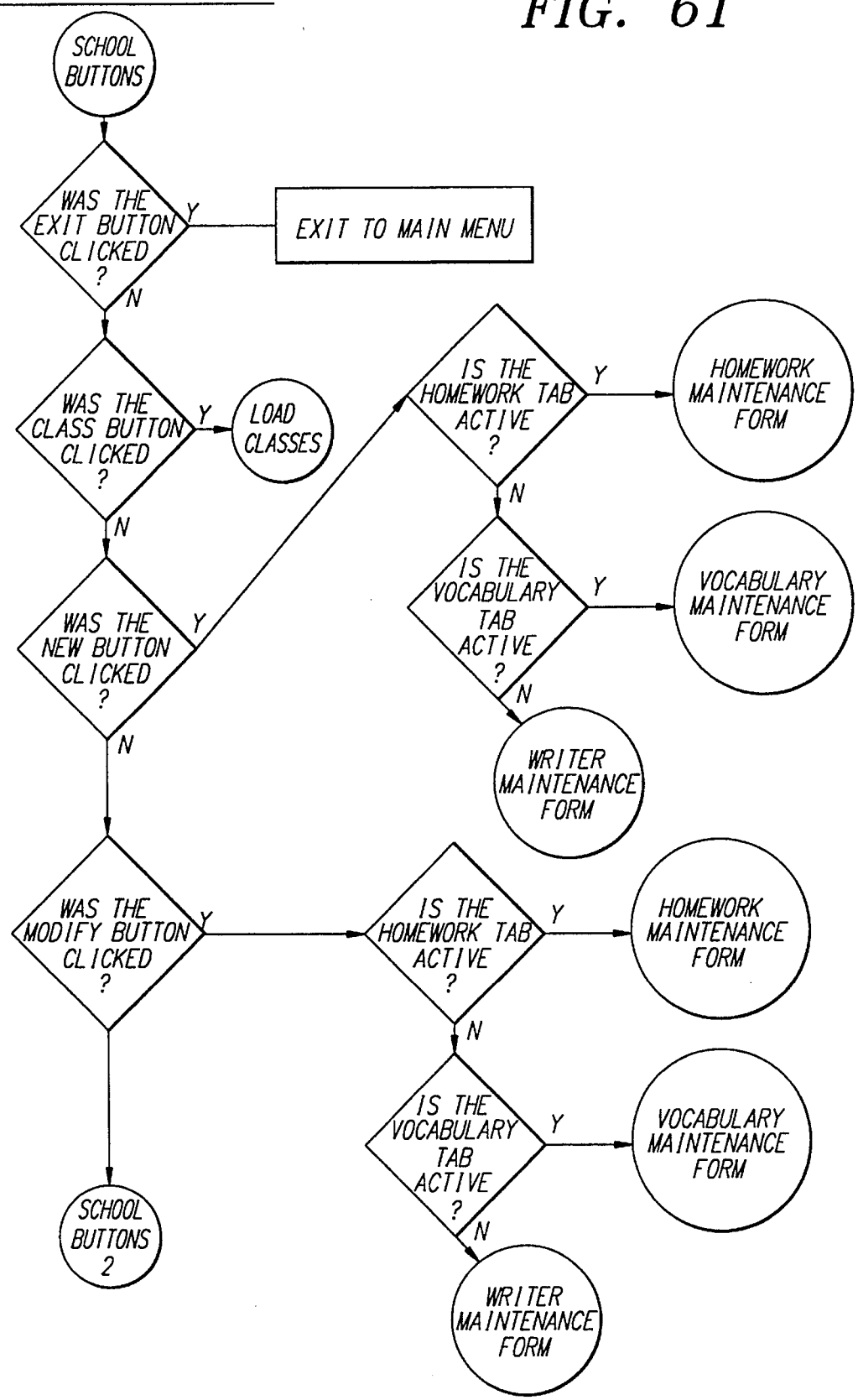
Figure 62:
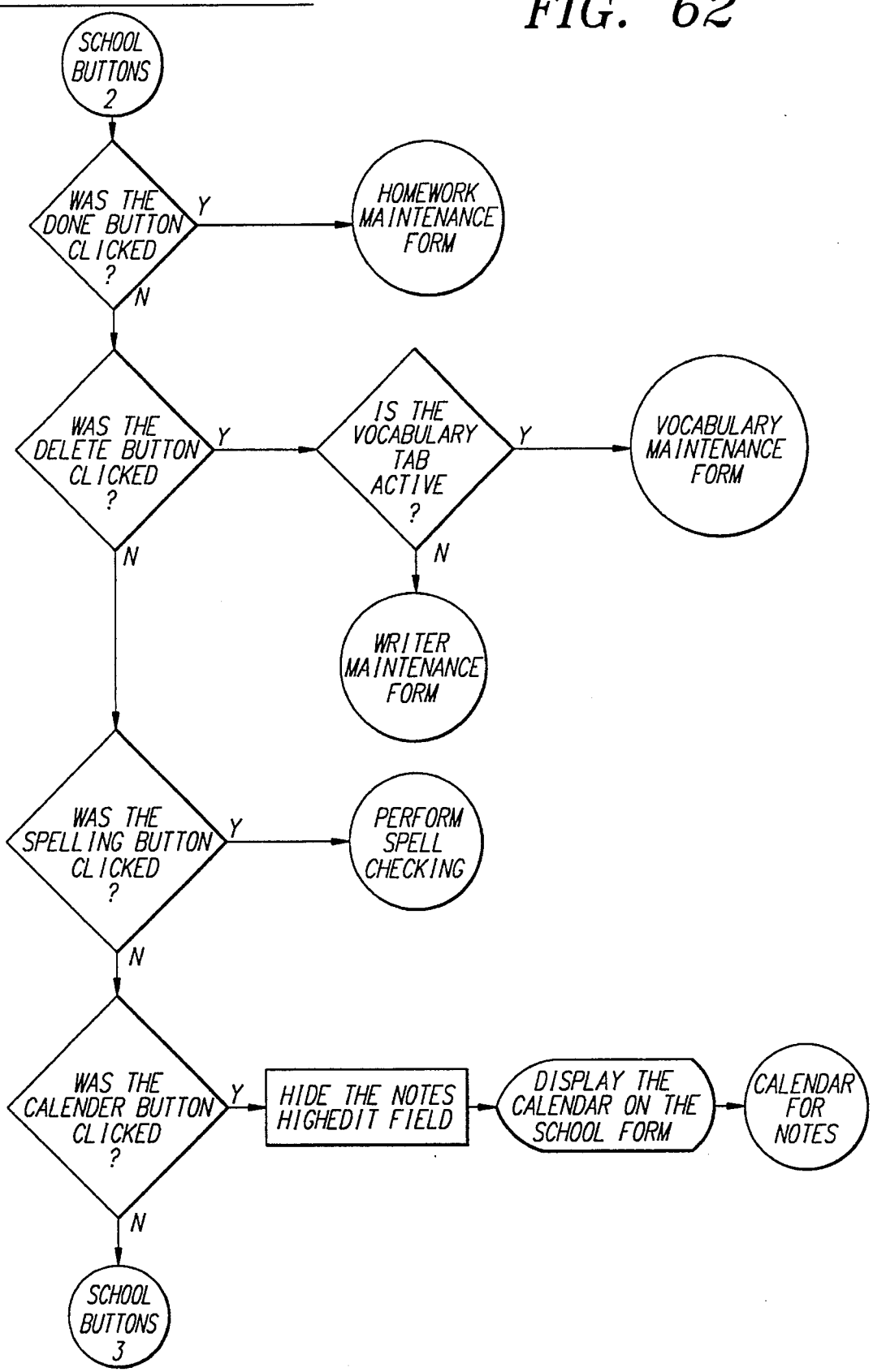
Figure 63:
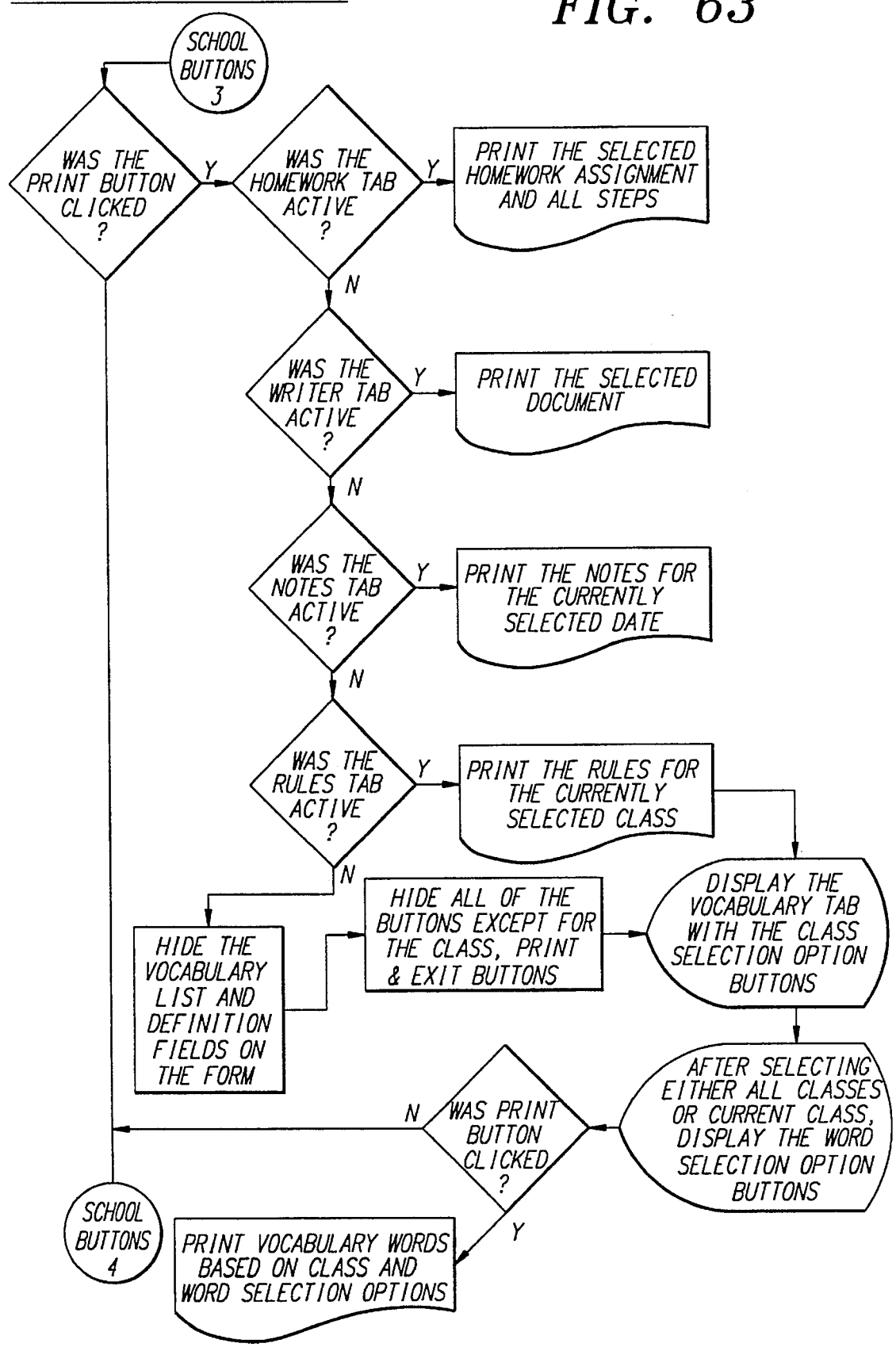
Figure 64:
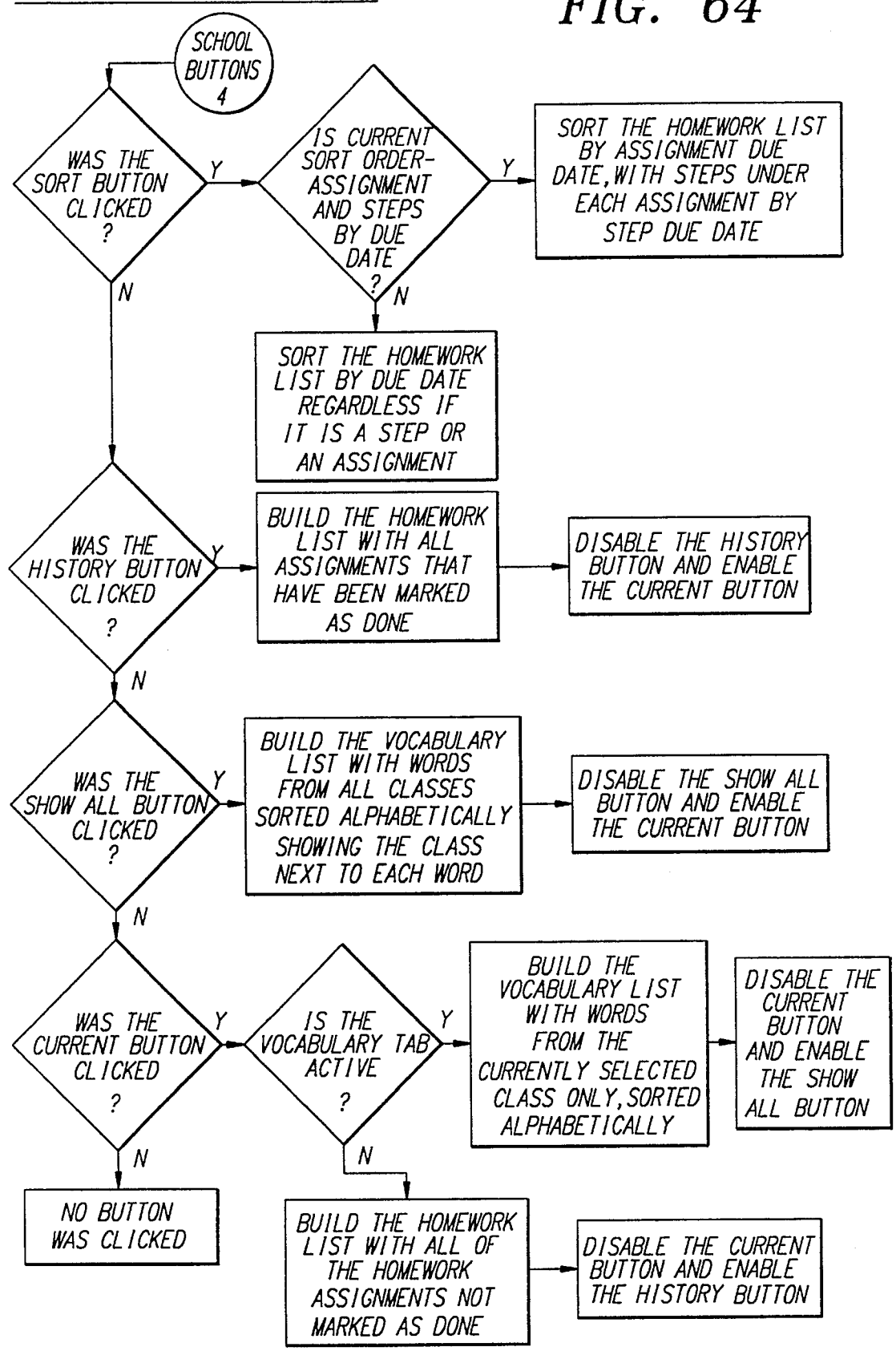
Figure 65:
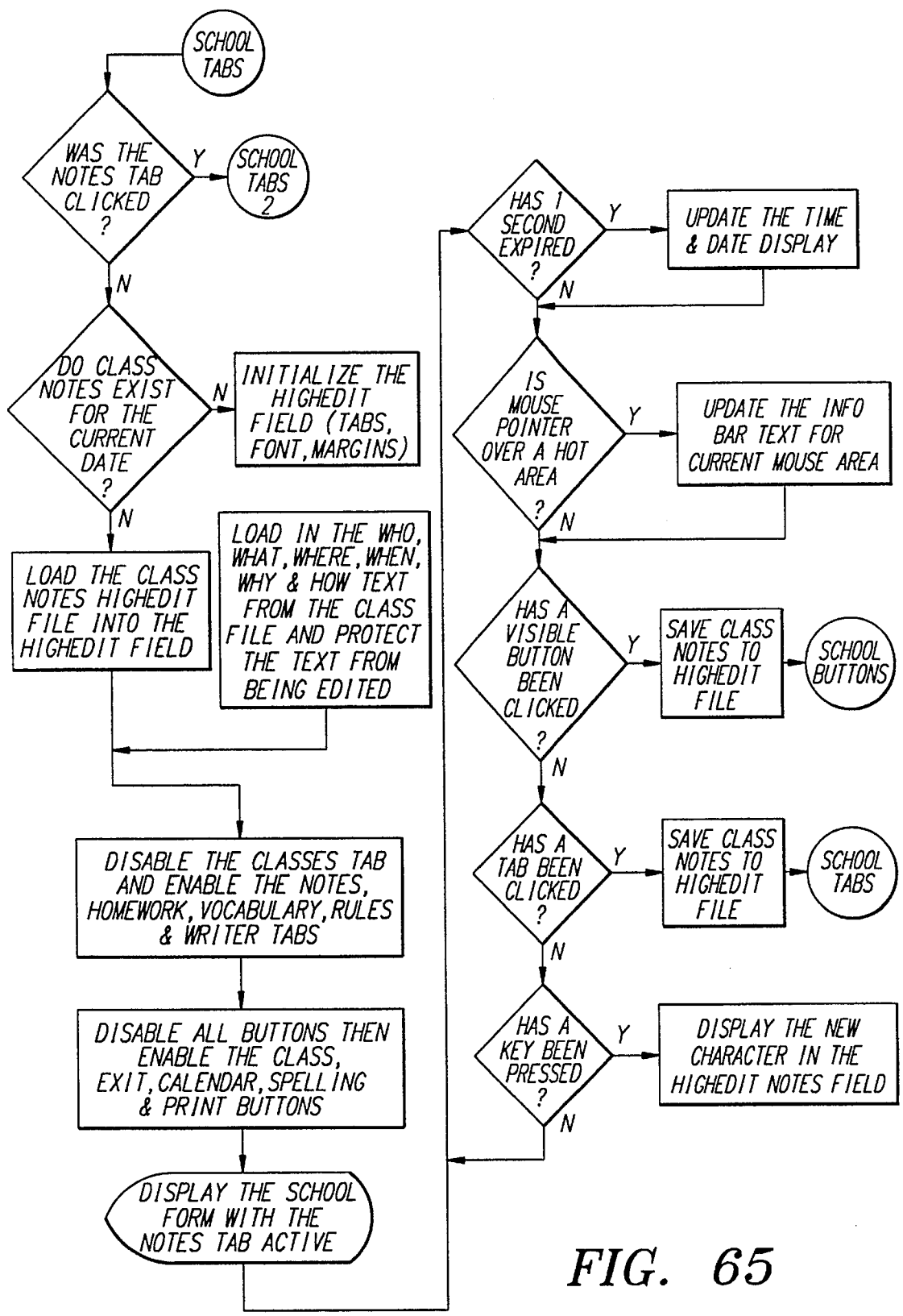
Figure 66:
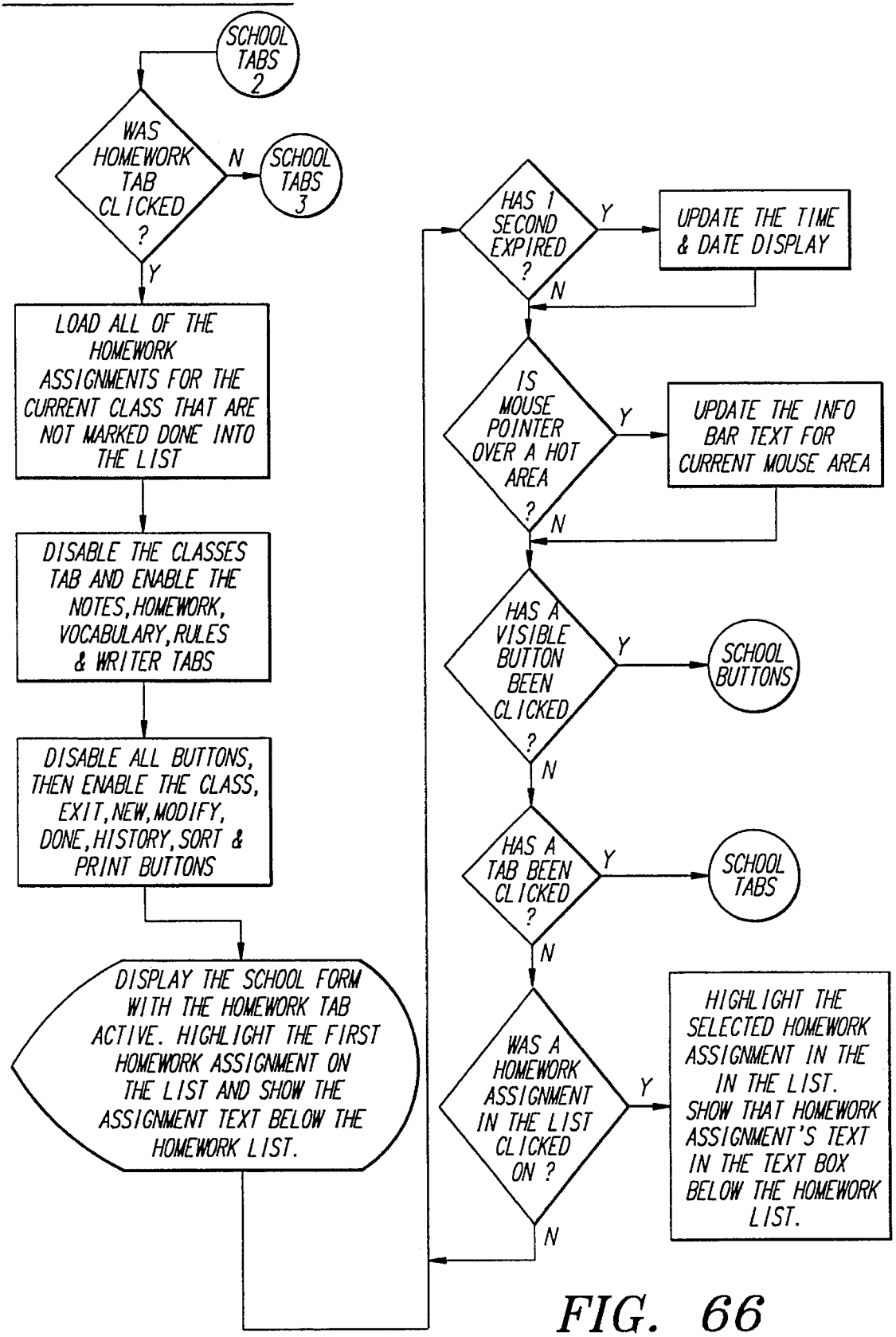
Figure 67:
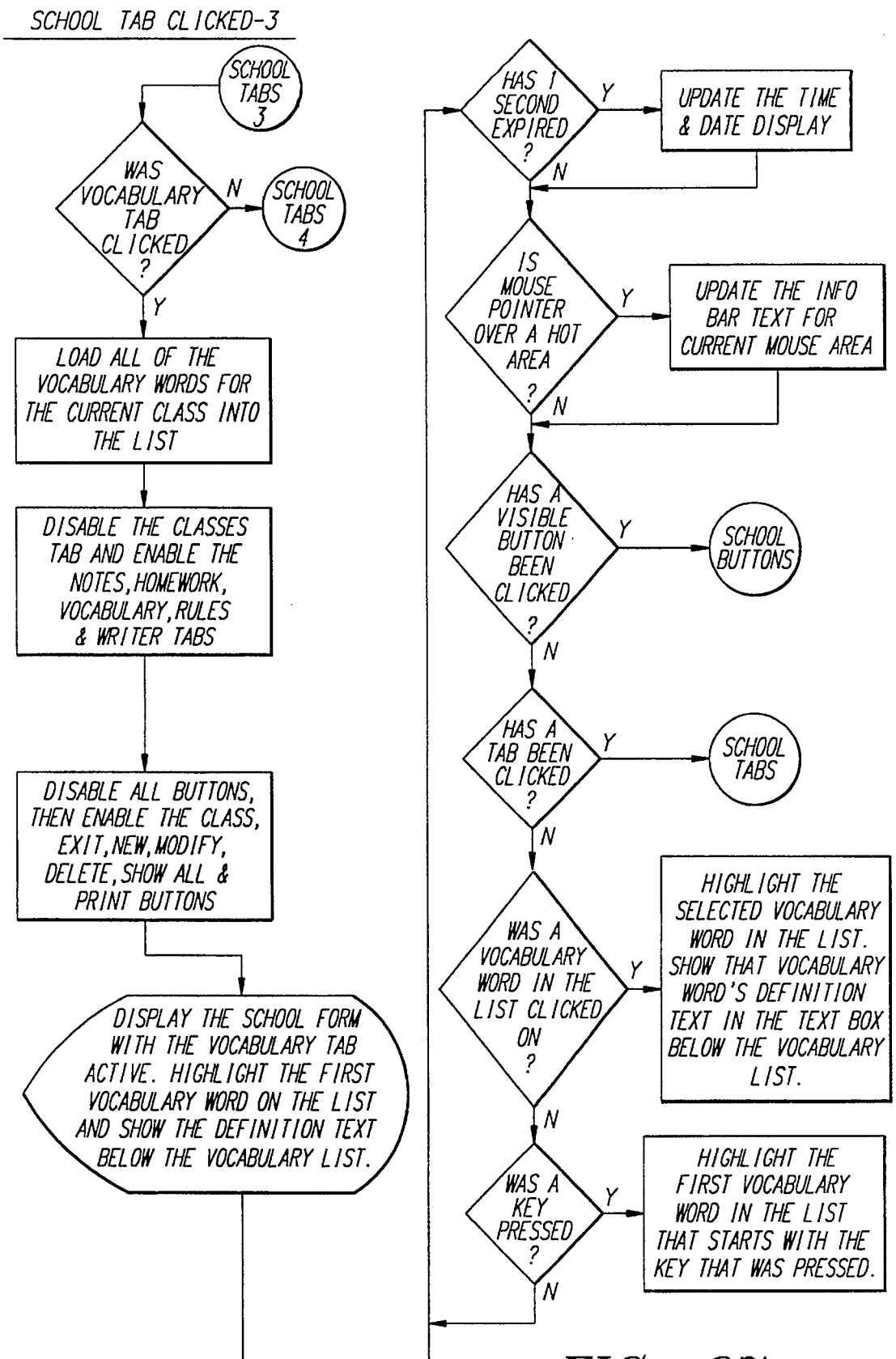
Figure 68:
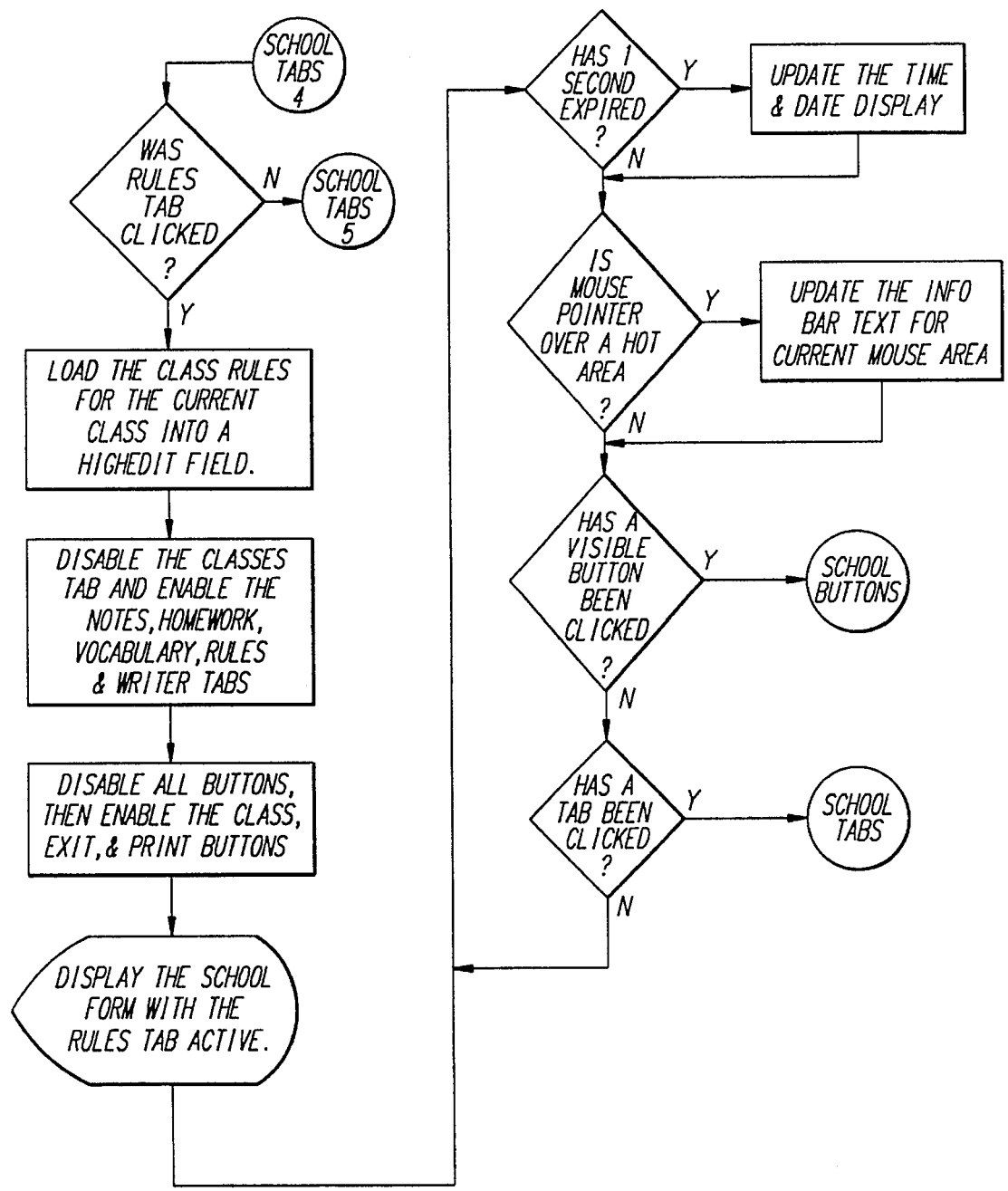
Figure 70:
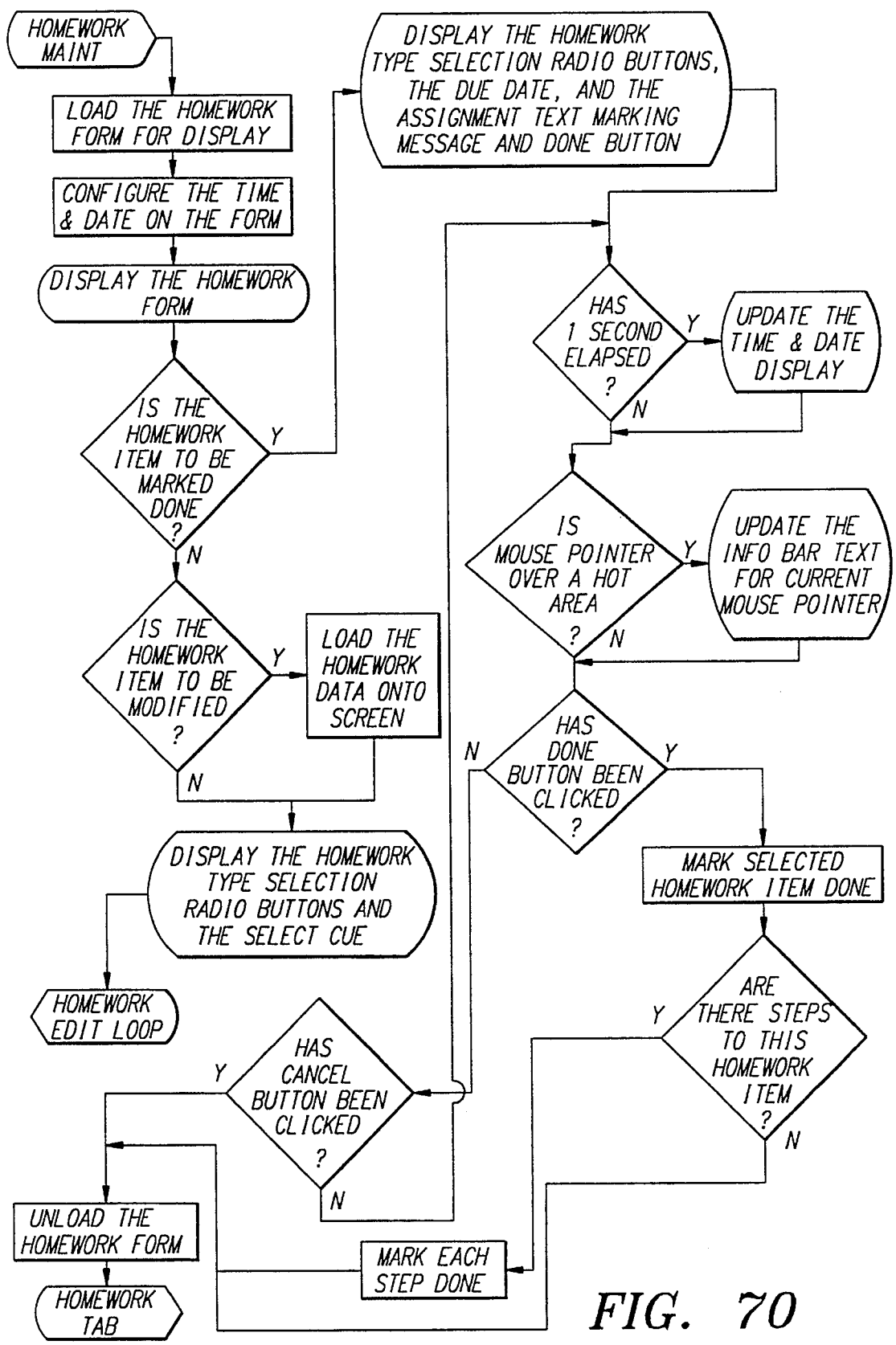
Figure 71:
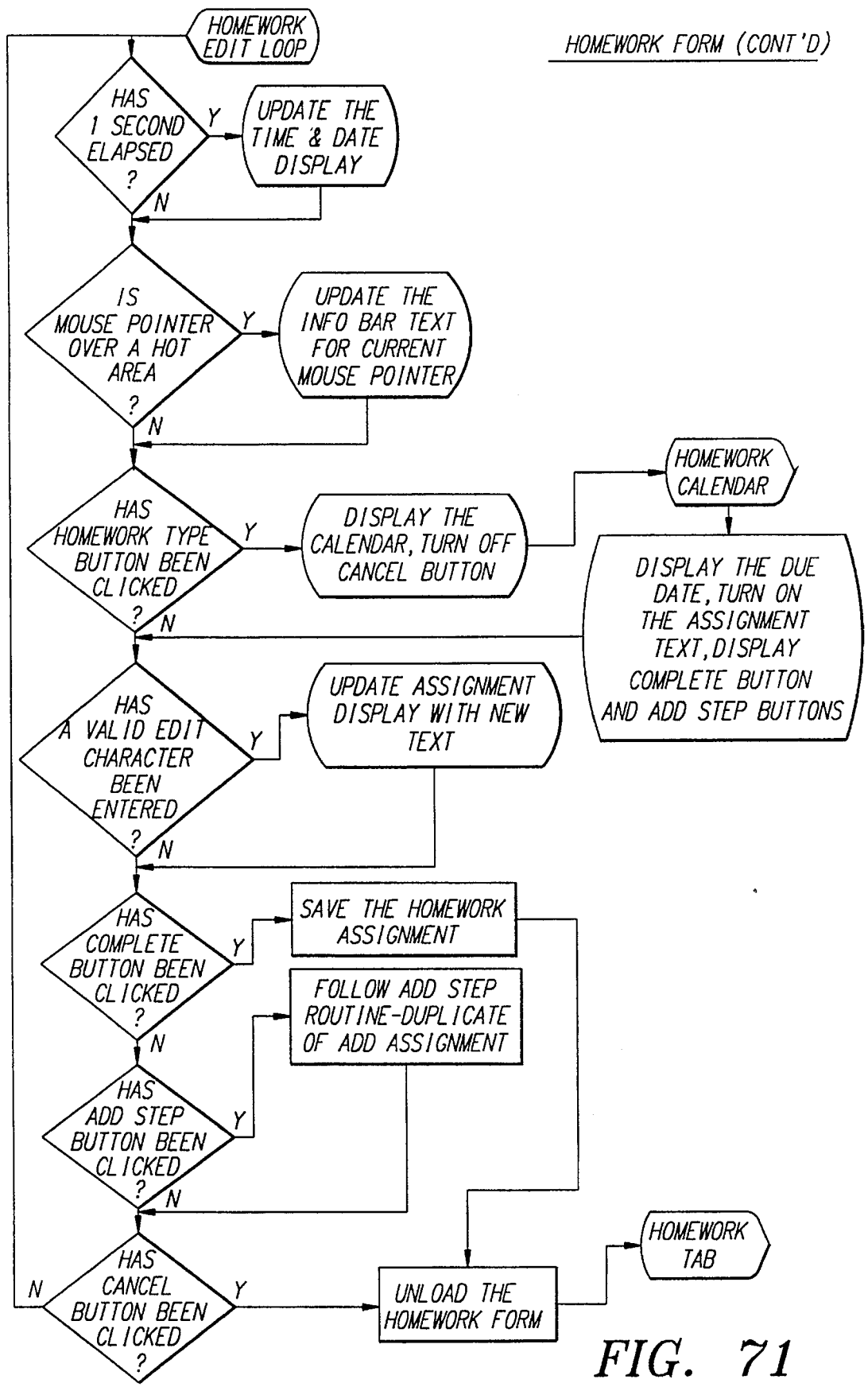
Figure 72:
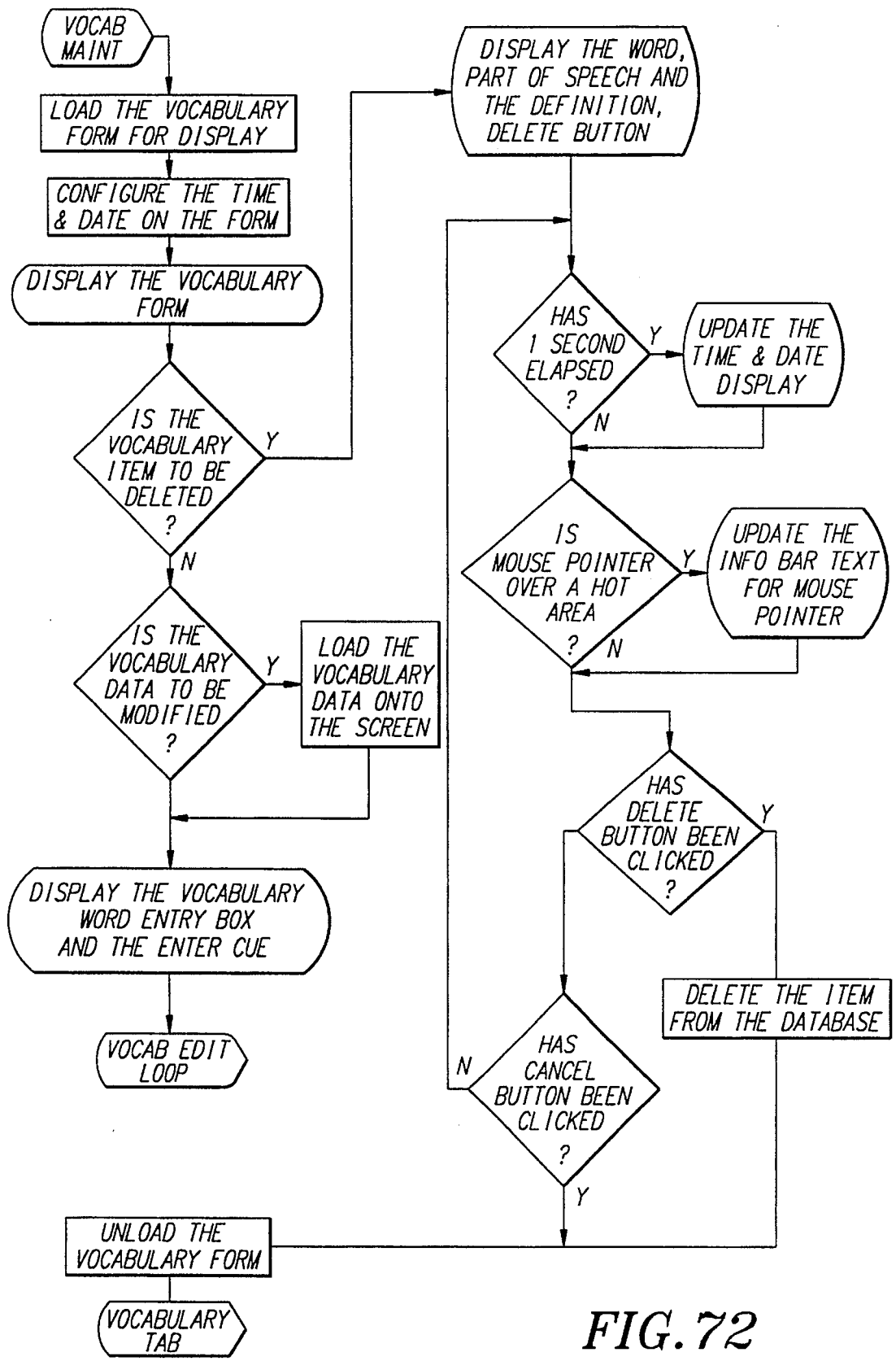
Figure 73:
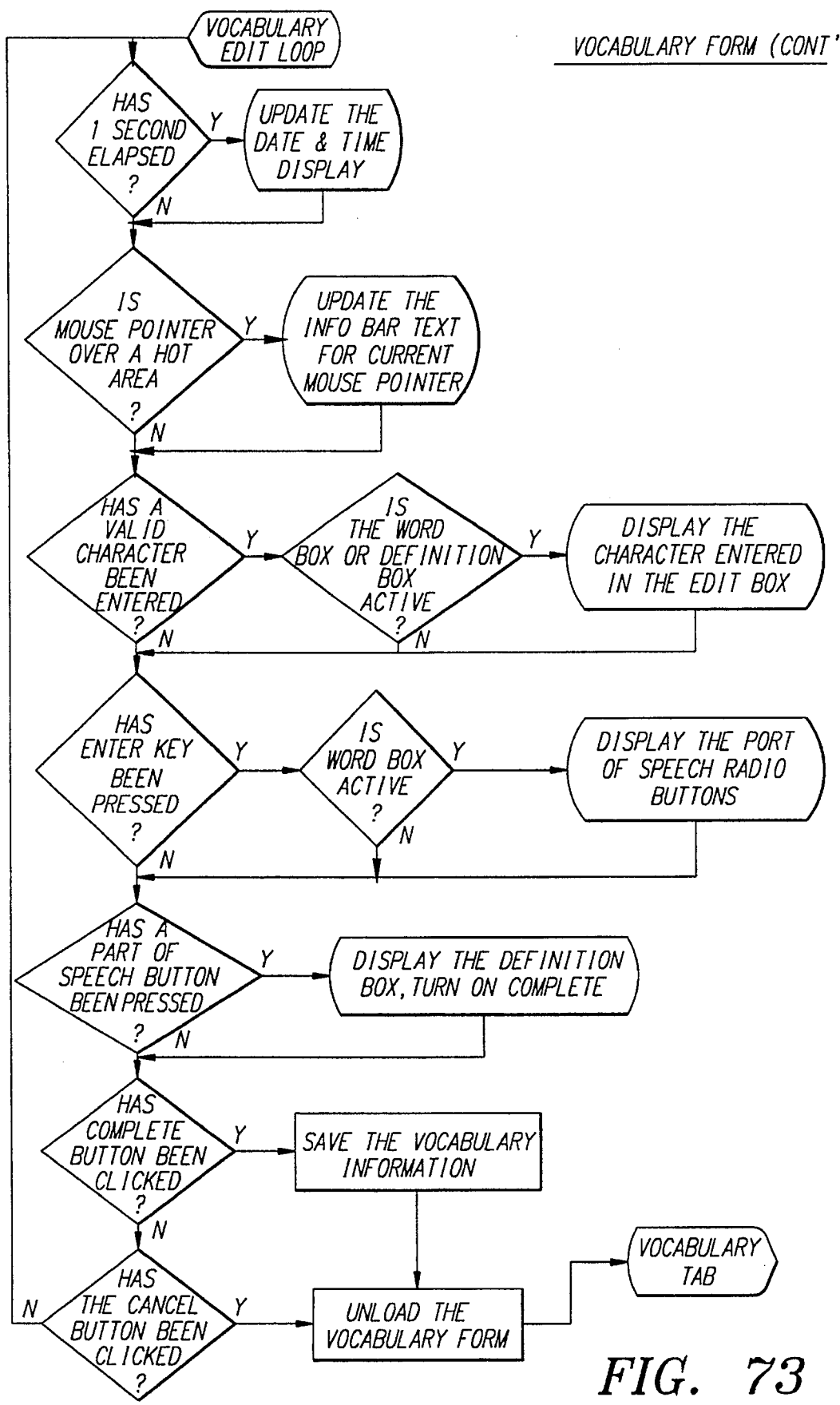
Figure 74:
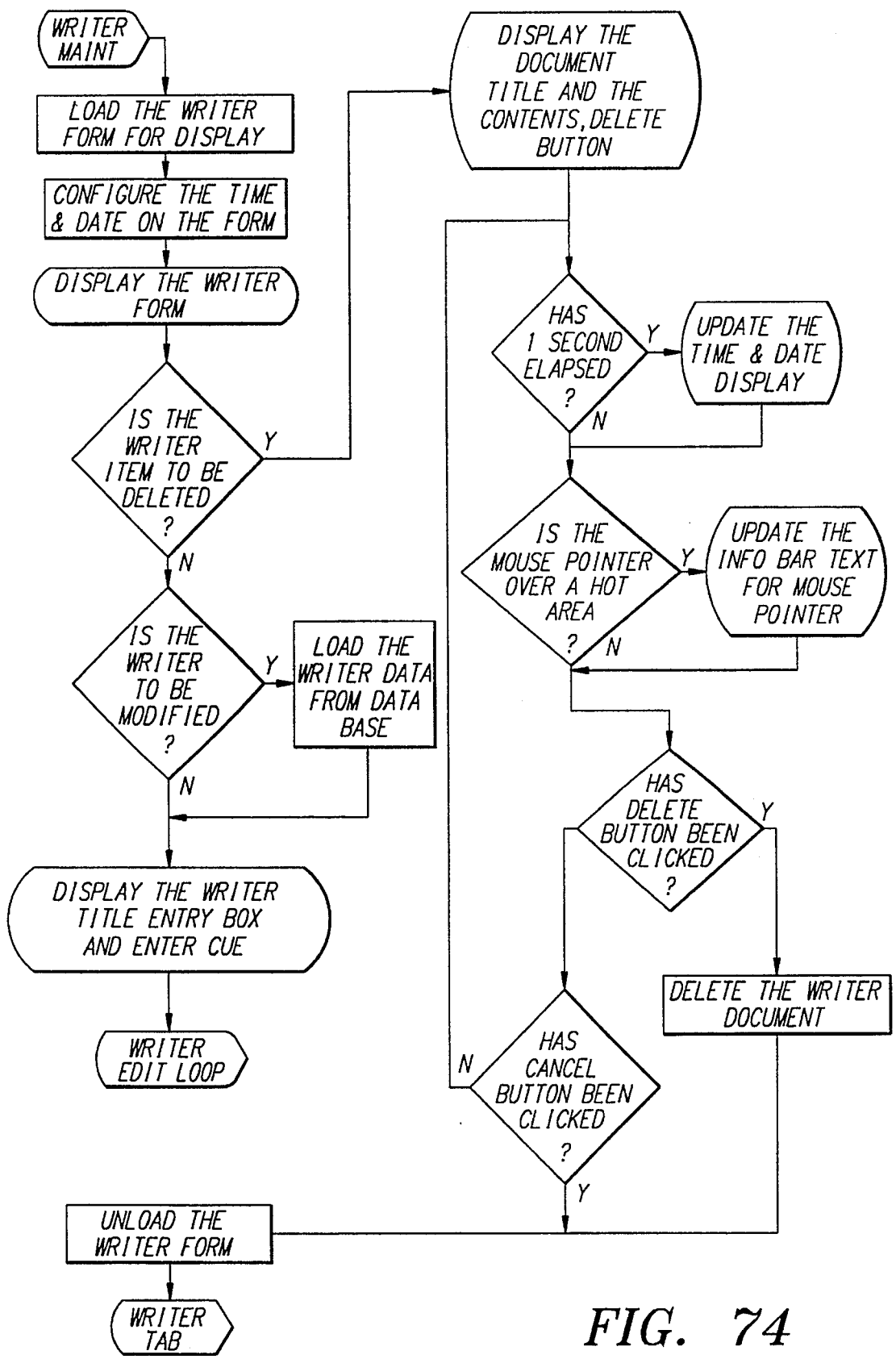
Figure 75:
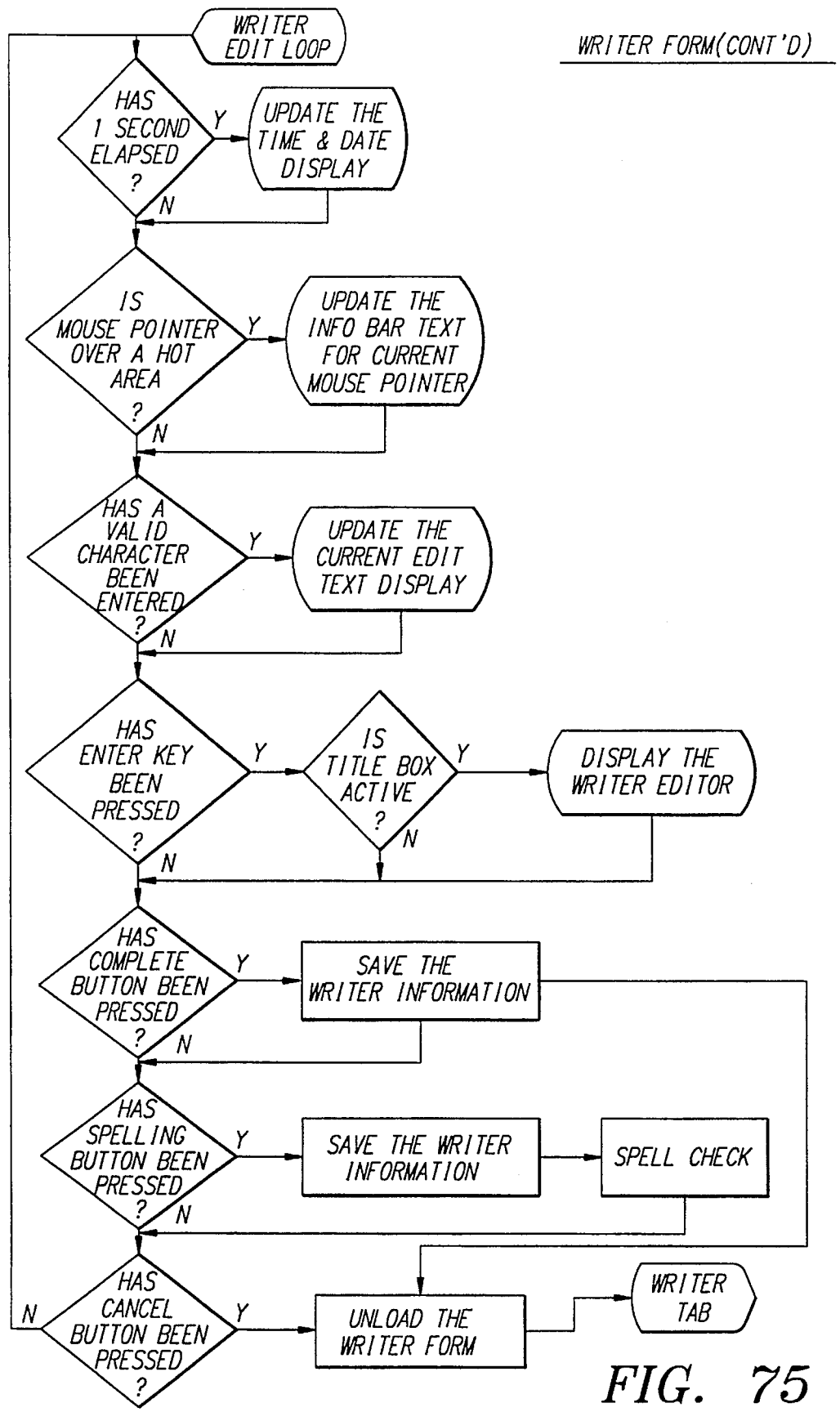

In addition, the teacher/therapist can edit the Rules function (FIG. 2B) of the primary user by selecting the Rules press button on the Classes function (FIG. 23). Selection of this press button brings the secondary user to the Rules function (FIG. 26), permitting the teacher/therapist to modify or add to the rules text. Upon completion of this, the teacher/therapist can exit that display 12 by selecting the Complete press button to save all new text and then exit to the Classes function (FIG. 23) or the secondary user can select the Cancel press button to cancel any new text and to exit to the Classes function (FIG. 23).

The System option (FIG. 27) is where the lower level program decisions are made. These include the appearance of the display 12, which can be modified for macular-spared vision loss, and lateral neglect or inattention. Sound options are controlled from this menu, as well as input device options.

The Modules option (FIG. 28) is where the various modules that comprise the system are added or removed from the Main Menu by being installed or uninstalled, as indicated. In particular, the Class functions (FIG. 2B) are modular in design, i.e., they can be removed or installed based on a particular primary user's needs without affecting the other Class functions. For example, one user may not need a Vocabulary function whereas another user may not require a Notes function nor a Writer function in their respective educational organizers 20. Using the Modules option, the tertiary user can easily uninstall these particular functions without affecting the overall operation of each of the users' educational organizers 20.

The System Log (FIG. 29) displays a record of system use by any of the users. This content of the display cannot be edited but does permit the secondary/tertiary user to rearrange the content by use of radio buttons, as indicated. In addition, the System Log uses a fixed column-scroll function as discussed previously regarding the Classes option (FIG. 23). In particular, the column labeled "Function Accessed" is displayed in a color (e.g., blue) that is different from the columns to the right of that column: "Start Date", "Start Time", "End Date", "End Time" (not shown), and "Elapsed Time" (not shown).

One feature that permits the tertiary user the ability to exit the educational organizer 20 without exiting the graphical user interface (e.g., WINDOWS) is the simultaneous depression of the keyboard Shift, Ctrl and Alt keys while clicking either the left or right mouse key.

Without further elaboration, the foregoing will so fully illustrate my invention that others may, by applying current or future knowledge, readily adopt the same for use under various conditions of service.

I claim:

1. A compensatory assistance apparatus for use by a user with cognitive impairment which allows the user to make entries and files therein, said apparatus comprising:

a first computer having a monitor and a graphical user interface that displays only one application on the monitor at any time, said graphical user interface requiring the exiting of said application before entering another application, each application displaying on said monitor a predetermined number of user prompts and working information at predetermined locations on the monitor using predetermined colors;

said graphical user interface using a movable pointer, said graphical user interface restricting said movable pointer in displacement in all directions in said displayed application so as to always remain in the view of the user;

said graphical user interface displaying a guidance icon that graphically instructs the user what the user must do to respond;

said graphical user interface automatically saving all files and entries created by the user to said first computer without user intervention;

input means for inputting data to said first computer and for controlling said movable pointer; and output means for outputting data from said first computer.

2. The compensatory assistance apparatus of claim 1 wherein said graphical user interface displays on the monitor a main menu upon power-up of said apparatus, said menu comprising a predetermined number of options and wherein one of said options is outlined in a predetermined color whenever said mobile pointer is positioned by the user on said one of said options.

3. The compensatory assistance apparatus of claim 2 wherein said graphical user interface displays an information strip on the monitor, said information strip having text provided therein that lists all of the available choices corresponding to said one of said options that is outlined.

4. The compensatory assistance apparatus of claim 3 wherein said graphical user interface displays information, including time, date and season and the user's name at all times.

5. The compensatory assistance apparatus of claim 2 wherein one of said options comprises a school-related option.

6. The compensatory assistance apparatus of claim 5 wherein when said user selects said school-related option, a plurality of class options is provided for selection therefrom.

7. The compensatory assistance apparatus of claim 6 wherein when said user selects one of said plurality of said class options, a plurality of class functions is provided for selection therefrom, said class functions being modular to permit the removal or installation of at least one of said class functions without affecting other class functions.

8. The compensatory assistance apparatus of claim 7 wherein one of said plurality of class functions comprises a notes function, said notes function comprising an application having a predetermined number of queries that have been entered previously by a teacher while permitting the user to enter a response adjacent a respective query within that application.

9. The compensatory assistance apparatus of claim 7 wherein one of said plurality of class functions comprises a homework function, said homework function comprising means for partitioning a homework project into steps and allowing the assignment of due dates in the future only to each of said steps, said homework function permitting the status of said steps to be indicated by a color corresponding to step completion or lateness.

10. The compensatory assistance apparatus of claim 9 wherein said homework function comprises a calendar subfunction that displays weeks wherein the dates corresponding to Saturday and Sunday are adjacent each other at the end of a particular week to illustrate the weekend as a visual unit to said user.

11. The compensatory assistance apparatus of claim 7 wherein one of said plurality of class functions comprises a vocabulary function, said vocabulary function comprising an application that permits the user to establish a vocabulary list specifically for said one of said plurality of class functions.

12. The compensatory assistance apparatus of claim 11 wherein said vocabulary function further comprises means for generating a single vocabulary list from said plurality of class functions.

13. The compensatory assistance apparatus of claim 7 wherein one of said plurality of class functions comprises a rules function, said rules function comprising an application that permits the user to enter rules regarding classroom behavior and any other classroom activity related specifically to the selected one of said class options.

14. The compensatory assistance apparatus of claim 7 wherein one of said plurality of class functions comprises a writer function, said writer function providing the user with a text writer for preparing any document related to class work, said document having memo field reserved for a title created by the user which is used by said graphical user interface to automatically save said document upon exit by said user.

15. The compensatory assistance apparatus of claim 2 wherein one of said options comprises a plurality of journal options.

16. The compensatory assistance apparatus of claim 15 wherein one of said journal options includes a school journal, said school journal allowing the user to enter or read text regarding school activities for dates only in the present or past.

17. The compensatory assistance apparatus of claim 16 wherein said school journal further comprises a calendar subfunction that displays weeks wherein the dates corresponding to Saturday and Sunday are adjacent each other at the end of a particular week to illustrate the weekend as a visual unit to said user.

18. The compensatory assistance apparatus of claim 17 wherein said calendar subfunction automatically indicates the exact time of entry into said application for logging text.

19. The compensatory assistance apparatus of claim 18 wherein one of said journal options includes a personal journal function, said personal journal comprising code entry means for allowing only the primary user to enter text or read text regarding personal notes for dates only in the past or present, said personal journal comprising an application that automatically indicates the exact time of entry into said application for logging text.

20. The compensatory assistance apparatus of claim 15 wherein one of said journal options comprises a vocational journal.

21. The compensatory assistance apparatus of claim 15 wherein one of said journal options comprises a medicine/health journal.

22. The compensatory system of claim 2 wherein one of said options comprises a tools option, said tools option comprising a back-up application that instructs the user to back-up said files and entries to a second computer at a remote location.

23. The compensatory assistance apparatus of claim 22 wherein said back-up application further comprises means for indicating to the user that the user has not backed-up said files and entries to said second computer for at least seven days.

24. The compensatory assistance apparatus of claim 22 wherein said tools option further comprises a service application, said service application instructing the user to prepare said first computer for connection to said second computer.

25. The compensatory assistance apparatus of claim 1 wherein said guidance icon has a contour whose appearance is similar to the input means.

26. The compensatory assistance apparatus of claim 1 wherein said input means comprises a keyboard.

27. The compensatory assistance apparatus of claim 1 wherein said input means comprises a track ball.

28. The compensatory assistance apparatus of claim 1 wherein said input means comprises a touch pad.

29. The compensatory assistance apparatus of claim 1 wherein said input means comprises a mouse having at least one button depressable by the user.

30. The compensatory assistance apparatus of claim 29 wherein said graphical user interface restricts the mouse button to one click in selecting an option displayed on said monitor.

31. The compensatory assistance apparatus of claim 1 wherein said input means comprises a touch screen monitor.

32. The compensatory assistance apparatus of claim 1 wherein said input means comprises a joystick.

33. The compensatory assistance apparatus of claim 1 wherein said input means comprises a sip puff.

34. The compensating assistance apparatus of claim 1 wherein said input means comprises a second computer at a remote location.

35. The compensatory assistance apparatus of claim 1 wherein said output means comprises a printer.

36. The compensatory assistance apparatus of claim 1 wherein said output means comprises a monitor.

37. The compensatory assistance apparatus of claim 1 wherein said output means comprises a second computer at a remote location.

38. The compensatory assistance apparatus of claim 1 wherein said graphical user interface is configurable to position all working information in a particular location within the monitor while maintaining the entire monitor in a lighted condition for use by a user having a neglect disability that forces said user to focus only at said particular location.

39. The compensatory assistance apparatus of claim 1 wherein said graphical user interface displays on the monitor a maintenance menu for use by a secondary user, said maintenance menu being inaccessible to the user with cognitive impairment.

40. The compensatory assistance apparatus of claim 39 wherein said maintenance menu comprises means for configuring said graphical user interface to accommodate a particular user with cognitive impairment.

41. The compensatory assistance apparatus of claim 40 wherein said maintenance menu further comprises means for monitoring use of said graphical user interface.

42. The compensatory assistance apparatus of claim 41 wherein a second computer coupled to said first computer via a modem line can provide input to said first computer using said means for configuring said graphical user interface.

* * * * *